(12) United States Patent
Clow et al.

(10) Patent No.: US 11,656,906 B2
(45) Date of Patent: May 23, 2023

(54) METHOD AND SYSTEM FOR COORDINATED SERVICE PLACEMENT IN MULTIPLE CLOUDS

(71) Applicant: EMBOTICS CORPORATION, Ottawa (CA)

(72) Inventors: Brian Andrew Clow, Ottawa (CA); Mark Ian Jamensky, Ottawa (CA)

(73) Assignee: Snow Software Inc., Austin, TX (US)

( * ) Notice: Subject to any disclaimer, the term of this patent is extended or adjusted under 35 U.S.C. 154(b) by 48 days.

(21) Appl. No.: 16/798,408

(22) Filed: Feb. 23, 2020

(65) Prior Publication Data

US 2020/0192714 A1 Jun. 18, 2020

Related U.S. Application Data

(63) Continuation-in-part of application No. 16/550,835, filed on Aug. 26, 2019.

(60) Provisional application No. 62/722,587, filed on Aug. 24, 2018.

(51) Int. Cl.
*G06F 9/50* (2006.01)
*H04L 67/1008* (2022.01)

(52) U.S. Cl.
CPC .......... *G06F 9/5011* (2013.01); *G06F 9/5066* (2013.01); *G06F 9/5072* (2013.01); *H04L 67/1008* (2013.01)

(58) Field of Classification Search
CPC .................. G06F 9/50–5072; H04L 67/1008
See application file for complete search history.

(56) References Cited

U.S. PATENT DOCUMENTS

| | | | |
|---|---|---|---|
| 6,571,215 B1 * | 5/2003 | Mahapatro | G06Q 10/0631 707/999.01 |
| 9,846,595 B2 | 12/2017 | Cao et al. | |
| 9,871,745 B2 | 1/2018 | Steinder et al. | |
| 10,009,238 B2 | 6/2018 | Iyer et al. | |
| 10,547,520 B2 | 1/2020 | Cimprich et al. | |
| 10,552,191 B2 | 2/2020 | Chang et al. | |
| 10,574,545 B2 | 2/2020 | Feller et al. | |

(Continued)

OTHER PUBLICATIONS

A Multiple QoS Constrained Scheduling Strategy of Multiple Workflows for Cloud Computing Meng Xu, Lizhen Cui, Haiyang Wang, Yanbing Bi (Year: 2009).*

(Continued)

*Primary Examiner* — Emerson C Puente
*Assistant Examiner* — Paul V Mills
(74) *Attorney, Agent, or Firm* — Traverse Legal, PLC

(57) ABSTRACT

A service partitioned into service components requiring different resources is assigned to at least one cloud of a set of clouds. With interdependent service components, a service-placement engine is configured to coordinate assignments of individual service components. The service-placement engine receives from a client a definition of each service component and indications of components interdependence. Each cloud that satisfies compliance requirements, capability requirements, and resource requirements of a service component is considered eligible to host the service component. Selection of a specific eligible cloud is based on an overall cloud merit which depends on the service-component definition and the location of the client.

11 Claims, 53 Drawing Sheets

(56) References Cited

U.S. PATENT DOCUMENTS

| | | | |
|---|---|---|---|
| 10,574,743 | B1 | 2/2020 | Ntofon et al. |
| 10,698,767 | B1* | 6/2020 | De Kadt ............. G06F 16/2315 |
| 2010/0332262 | A1* | 12/2010 | Horvitz ................. G06Q 30/06 |
| | | | 705/4 |
| 2011/0238515 | A1* | 9/2011 | Diwakar ............... G06F 9/5072 |
| | | | 709/227 |
| 2011/0314082 | A1* | 12/2011 | Koneti .................. G06F 9/5055 |
| | | | 709/226 |
| 2012/0011190 | A1* | 1/2012 | Driesen ................ G06F 9/5044 |
| | | | 709/202 |
| 2013/0262681 | A1* | 10/2013 | Guo ...................... H04L 67/101 |
| | | | 709/226 |
| 2013/0297770 | A1* | 11/2013 | Zhang .................... G06F 9/505 |
| | | | 709/224 |
| 2013/0346543 | A1* | 12/2013 | Benantar ............... G06F 9/5055 |
| | | | 709/217 |
| 2014/0201218 | A1* | 7/2014 | Catalano ............. H04L 41/5045 |
| | | | 707/748 |
| 2014/0229953 | A1* | 8/2014 | Sevastiyanov ........ G06F 9/4881 |
| | | | 718/102 |
| 2016/0094483 | A1* | 3/2016 | Johnston ................. G06F 8/65 |
| | | | 709/226 |
| 2017/0041384 | A1* | 2/2017 | Son ..................... H04L 41/5006 |
| 2018/0115468 | A1* | 4/2018 | Bildhauer ............. G06F 9/5055 |
| 2020/0021537 | A1 | 1/2020 | Oliveira et al. |
| 2020/0159569 | A1* | 5/2020 | Bruun .................. G06F 9/5038 |
| 2020/0218579 | A1* | 7/2020 | D M .................... H04L 41/5054 |

OTHER PUBLICATIONS

CloudWF: A Computational Workflow System for Clouds Based on Hadoop Chen Zhang and Hans De Sterck (Year: 2009).*
Level Based Clustering Approach to Scheduling Workflows in Clouds Tawfiq Alrawashdeh, Zarina Mohamad, Aznida Hayati Zakaria (Year: 2018).*
A Broker-based Framework for Multi-Cloud Workflows Foued Jrad, Jie Tao, Achim Streit (Year: 2013).*
Role of Broker in InterCloud Environment Saswati Mukherjee and Shyamala Loganathan Chapter 5—Continued Rise of the Cloud (Year: 2014).*
QoS Based Cloud Service Selection to Handle Large Volume of Concurrent Requests Jyothi Shetty and Demian Antony D'Mello (Year: 2016).*
DAGwoman: enabling DAGMan-like workflows on non-Condor platforms Heiko H. Schmidt and Thomas Tschager (Year: 2012).*
Scoring Method Based on Criteria Matching for Cloud Computing Provider Ranking and Selection Lucas Borges de Moraes and Adriano Fiorese (Year: 2018).*
Static Scheduling of Tasks in Heterogeneous Computing Environments Pankaj Prabhakar Shroff Chapters 1-3 (Year: 1999).*
A Hybrid Heuristic for DAG Scheduling on Heterogeneous Systems Rizos Sakellariou and Henan Zhao (Year: 2004).*
Data-driven Workflows in Multi-Cloud Marketplaces Javier Diaz-Montes, Mengsong Zou, Rahul Singh, Shu Tao, and Manish Parashar (Year: 2014).*
Scheduling deadline constrained scientific workflows on dynamically provisioned cloud resources Vahid Arabnejad, Kris Bubendorfer, Bryan Ng (Year: 2017).*

\* cited by examiner

|  | Provisioned or allocable resources | | | | | Available resources at a specific time | | | | | |
|---|---|---|---|---|---|---|---|---|---|---|---|
|  | 1210—Resource type | | | | | 1210—Resource type | | | | | |
| Cloud index | (0) | (1) | (2) | (3) | (4) | (0) | (1) | (2) | (3) | (4) | |
| (0) | $R_{0,0}$ | $R_{0,1}$ | $R_{0,2}$ | $R_{0,3}$ | $R_{0,4}$ | $r_{0,0}$ | $r_{0,1}$ | $r_{0,2}$ | $r_{0,3}$ | $r_{0,4}$ | |
| (1) | $R_{1,0}$ | $R_{1,1}$ | $R_{1,2}$ | $R_{1,3}$ | $R_{1,4}$ | $r_{1,0}$ | $r_{1,1}$ | $r_{1,2}$ | $r_{1,3}$ | $r_{1,4}$ | |
| (2) | $R_{2,0}$ | $R_{2,1}$ | $R_{2,2}$ | $R_{2,3}$ | $R_{2,4}$ | $r_{2,0}$ | $r_{2,1}$ | $r_{2,2}$ | $r_{2,3}$ | $r_{2,4}$ | |
| (3) | $R_{3,0}$ | $R_{3,1}$ | $R_{3,2}$ | $R_{3,3}$ | $R_{3,4}$ | $r_{3,0}$ | $r_{3,1}$ | $r_{3,2}$ | $r_{3,3}$ | $r_{3,4}$ | |
| (4) | $R_{4,0}$ | $R_{4,1}$ | $R_{4,2}$ | $R_{4,3}$ | $R_{4,4}$ | $r_{4,0}$ | $r_{4,1}$ | $r_{4,2}$ | $r_{4,3}$ | $r_{4,4}$ | |
| (5) | | | | | | | | | | | |
| (6) | | | | | | $r_{6,0}$ | $r_{6,1}$ | $r_{6,2}$ | $r_{6,3}$ | $r_{6,4}$ | 1240 Current allocation limit |
| (7) | | | | | | | | | | | |
| (8) | | | | | | | | | | | |
| (9) | $R_{9,0}$ | $R_{9,1}$ | $R_{9,2}$ | $R_{9,3}$ | $R_{9,4}$ | | | | | | 1220 Nominal allocation limit |
| (10) | | | | | | | | | | | |
| (11) | | | | | | | | | | | |

730 Resource availability

*FIG. 12*

740 Cloud valuation

1320 Valuation of characteristic of index 8 of all clouds

| Cloud index | 1310 — Cloud characteristic index | | | | | | | | |
|---|---|---|---|---|---|---|---|---|---|
| | (0)* | (1) | (2) | (3) | (4)* | (5)* | (6) | (7)* | (8) |
| (0) | $c_0$ | | $p_0$ | | | $d_0$ | | | $q_0$ |
| (1) | $c_1$ | | $p_1$ | | | $d_1$ | | | $q_1$ |
| (2) | $c_2$ | | $p_2$ | | | $d_2$ | | | $q_2$ |
| (3) | $c_3$ | | $p_3$ | | | $d_3$ | | | $q_3$ |
| (4) | $c_4$ | | $p_4$ | | | $d_4$ | | | $q_4$ |
| (5) | $c_5$ | | $p_5$ | | | $d_5$ | | | $q_5$ |
| (6) | $c_6$ | | $p_6$ | | | $d_6$ | | | $q_6$ |
| (7) | $c_7$ | | $p_7$ | | | $d_7$ | | | $q_7$ |
| (8) | $c_8$ | | $p_8$ | | | $d_8$ | | | $q_8$ |
| (9) | $c_9$ | | $p_9$ | | | $d_9$ | | | $q_9$ |
| (10) | $c_{10}$ | | $p_{10}$ | | | $d_{10}$ | | | $q_{10}$ |
| (11) | $c_{11}$ | | $p_{11}$ | | | $d_{11}$ | | | $q_{11}$ |

FIG. 13

| Cloud index | 1310—Cloud characteristic index | | | | | | | | |
|---|---|---|---|---|---|---|---|---|---|
| | (0)* | (1) | (2) | (3) | (4)* | (5)* | (6) | (7)* | (8) |
| (0) | $\alpha_{0,0}$ | $\alpha_{0,1}$ | $\alpha_{0,2}$ | $\alpha_{0,3}$ | $\alpha_{0,4}$ | $\alpha_{0,5}$ | $\alpha_{0,6}$ | $\alpha_{0,7}$ | $\alpha_{0,8}$ |
| (1) | | | | | | | | | |
| (2) | $\alpha_{2,0}$ | $\alpha_{2,1}$ | $\alpha_{2,2}$ | $\alpha_{2,3}$ | $\alpha_{2,4}$ | $\alpha_{2,5}$ | $\alpha_{2,6}$ | $\alpha_{2,7}$ | $\alpha_{2,8}$ |
| (3) | | | | | | | | | |
| (4) | | | | | | | | | |
| (5) | $\alpha_{5,0}$ | $\alpha_{5,1}$ | $\alpha_{5,2}$ | $\alpha_{5,3}$ | $\alpha_{5,4}$ | $\alpha_{5,5}$ | $\alpha_{5,6}$ | $\alpha_{5,7}$ | $\alpha_{5,8}$ |
| (6) | | | | | | | | | |
| (7) | | | | | | | | | |
| (8) | | | | | | | | | |
| (9) | | | | | | | | | |
| (10) | | | | | | | | | |
| (11) | $\alpha_{11,0}$ | $\alpha_{11,1}$ | $\alpha_{11,2}$ | $\alpha_{11,3}$ | $\alpha_{11,4}$ | $\alpha_{11,5}$ | $\alpha_{11,6}$ | $\alpha_{11,7}$ | $\alpha_{11,8}$ |

1400 Merit vectors
1440a Merit vector of cloud 120(0)
1440b Merit vector of cloud 120(2)
1440c Merit vector of cloud 120(5)
1440d Merit vector of cloud 120(11)

FIG. 14

Table 1710 — 1310 Cloud characteristic index

| Cloud Index ↓ | (0)* | (1) | (2) | (3) | (4)* | (5)* | (6) | (7)* | (8) |
|---|---|---|---|---|---|---|---|---|---|
| (0) | 122.4 | 118.5 | 124.9 | 50.0 | 159.6 | 580.0 | 42.9 | 16.8 | 200.0 |
| (1) | 40.0 | 216.8 | 20.0 | 97.8 | 70.0 | 128.8 | 30.0 | 18.0 | 146.9 |
| (2) | 240.0 | 100.0 | 120.0 | 160.4 | 94.5 | 432.7 | 80.0 | 11.7 | 100.0 |
| (3) | 50.9 | 500.0 | 97.6 | 550.0 | 170.0 | 80.0 | 68.2 | 8.0 | 119.5 |

\* Highest merit corresponds to minimum value of quantified characteristic. Otherwise, highest merit corresponds to maximum value.

Table 1720 — 1310 Cloud characteristic index

| Cloud Index ↓ | (0)* | (1) | (2) | (3) | (4)* | (5)* | (6) | (7)* | (8) |
|---|---|---|---|---|---|---|---|---|---|
| (0) | 0.588 | 0.046 | 0.049 | 0.0 | 0.104 | 0.0 | 0.258 | 0.12 | 1.0 |
| (1) | 1.0 | 0.292 | 0.0 | 0.096 | 1.0 | 0.902 | 0.0 | 0.0 | 0.469 |
| (2) | 0.0 | 0.0 | 1.0 | 0.221 | 0.755 | 0.295 | 1.0 | 0.63 | 0.0 |
| (3) | 0.946 | 1.0 | 0.776 | 1.0 | 0.0 | 1.0 | 0.764 | 1.0 | 0.195 |

1740 (highlighted row in 1710: cloud index 2)
1750 Merit vector of cloud of index (2)

FIG. 17

Significance of characteristics to services

| Service type | Cloud characteristic index | | | | | | | | | |
|---|---|---|---|---|---|---|---|---|---|---|
| | (0) | (1) | (2) | (3) | (4) | (5) | (6) | (7) | (8) | |
| (0) | $\beta_{0,0}$ | $\beta_{0,1}$ | $\beta_{0,2}$ | $\beta_{0,3}$ | $\beta_{0,4}$ | $\beta_{0,5}$ | $\beta_{0,6}$ | $\beta_{0,7}$ | $\beta_{0,8}$ | |
| (1) | | | | | | | | | | |
| (2) | | | | | | | | | $\beta_{2,8}$ | |
| (3) | | | | | | | | | | |
| (4) | | | | | | | | | | |
| (5) | | | | | | | | | | |
| (6) | | | | | | | | | | |
| (7) | | | | | | | | | | |
| (8) | | | | | | | | | | |
| (9) | $\beta_{9,0}$ | $\beta_{9,1}$ | $\beta_{9,2}$ | $\beta_{9,3}$ | $\beta_{9,4}$ | $\beta_{9,5}$ | $\beta_{9,6}$ | $\beta_{9,7}$ | $\beta_{9,8}$ | |

2000 (table)
2040a Significance Vector: service type 0
2020 Significance of characteristic of index 8 to Service of type-2
2040b Significance Vector: service type 9

FIG. 20

| Significance of characteristics to services | | | | | | | | | |
|---|---|---|---|---|---|---|---|---|---|
| 1310 — Cloud characteristic index | | (0) | (1) | (2) | (3) | (4) | (5) | (6) | (7) | (8) |
| | | $\gamma_0$ | $\gamma_1$ | $\gamma_2$ | $\gamma_3$ | $\gamma_4$ | $\gamma_5$ | $\gamma_6$ | $\gamma_7$ | $\gamma_8$ |

2140 Significance vector

2120 Significance of characteristic of index 6

2300 — Client-cloud distance matrix

2310 — Client index

| Cloud index | (0) | (1) | (2) | (3) | ... | (96) | (97) | (98) | (99) |
|---|---|---|---|---|---|---|---|---|---|
| (0) | | $S_{1,0}$ | | | | | | $S_{98,0}$ | |
| (1) | | $S_{1,1}$ | | | | | | $S_{98,1}$ | |
| (2) | | $(S_{1,2})$ | | | | | | $S_{98,2}$ | |
| (3) | | $S_{1,3}$ | | | | | | $S_{98,3}$ | |
| (4) | | $S_{1,4}$ | | | | | | $S_{98,4}$ | |
| (5) | | $S_{1,5}$ | | | | | | $[S_{98,5}]$ | |
| (6) | | $S_{1,6}$ | | | | | | $S_{98,6}$ | |
| (7) | | $S_{1,7}$ | | | | | | $S_{98,7}$ | |
| (8) | | $S_{1,8}$ | | | | | | $S_{98,8}$ | |
| (9) | | $[S_{1,9}]$ | | | | | | $S_{98,9}$ | |
| (10) | | $S_{1,10}$ | | | | | | $(S_{98,10})$ | |
| (11) | | $S_{1,11}$ | | | | | | $S_{98,11}$ | |

2320

2720 Task-specific cloud merit

| 2820 Task index q, $0 \leq q < Q$ | (0) | (1) | (2) | (3) | ... | (K-2) | (K-1) |
|---|---|---|---|---|---|---|---|
| (0) | $\Gamma_{0,0}$ | $\Gamma_{0,1}$ | $\Gamma_{0,2}$ | $\Gamma_{0,3}$ | ... | $\Gamma_{0,(K-2)}$ | $\Gamma_{0,(K-1)}$ |
| (1) | $\Gamma_{1,0}$ | $\Gamma_{1,1}$ | $\Gamma_{1,2}$ | $\Gamma_{1,3}$ | ... | $\Gamma_{1,(K-2)}$ | $\Gamma_{1,(K-1)}$ |
| (2) | $\Gamma_{2,0}$ | $\Gamma_{2,1}$ | $\Gamma_{2,2}$ | $\Gamma_{2,3}$ | ... | $\Gamma_{2,(K-2)}$ | $\Gamma_{2,(K-1)}$ |
| (3) | $\Gamma_{3,0}$ | $\Gamma_{3,1}$ | $\Gamma_{3,2}$ | $\Gamma_{3,3}$ | ... | $\Gamma_{3,(K-2)}$ | $\Gamma_{3,(K-1)}$ |
| ... | | | | | | | |
| (Q-2) | $\Gamma_{(Q-2),0}$ | $\Gamma_{(Q-2),1}$ | $\Gamma_{(Q-2),2}$ | $\Gamma_{(Q-2),3}$ | ... | $\Gamma_{(Q-2),(K-2)}$ | $\Gamma_{(Q-2),(K-1)}$ |
| (Q-1) | $\Gamma_{(Q-1),0}$ | $\Gamma_{(Q-1),1}$ | $\Gamma_{(Q-1),2}$ | $\Gamma_{(Q-1),3}$ | ... | $\Gamma_{(Q-1),(K-2)}$ | $\Gamma_{(Q-1),(K-1)}$ |

2810 Cloud index c, $0 \leq c < K$ 2830 (pointing to $\Gamma_{3,2}$)

FIG. 28

2740 Location-specific cloud merit

| 2920 Location index p, $0 \leq p < P$ ↓ | 2810 Cloud index c, $0 \leq c < K$ → | | | | | | |
|---|---|---|---|---|---|---|---|
| | (0) | (1) | (2) | (3) | ... | (K−2) | (K−1) |
| (0) | $\Lambda_{0,0}$ | $\Lambda_{0,1}$ | $\Lambda_{0,2}$ | $\Lambda_{0,3}$ | ... | $\Lambda_{0,(K-2)}$ | $\Lambda_{0,(K-1)}$ |
| (1) | $\Lambda_{1,0}$ | $\Lambda_{1,1}$ | $\Lambda_{1,2}$ | $\Lambda_{1,3}$ | ... | $\Lambda_{1,(K-2)}$ | $\Lambda_{1,(K-1)}$ |
| (2) | $\Lambda_{2,0}$ | $\Lambda_{2,1}$ | $\Lambda_{2,2}$ | $\Lambda_{2,3}$ | ... | $\Lambda_{2,(K-2)}$ | $\Lambda_{2,(K-1)}$ |
| (3) | $\Lambda_{3,0}$ | $\Lambda_{3,1}$ | $\Lambda_{3,2}$ 2930 | $\Lambda_{3,3}$ | ... | | |
| ... | | | | | | ... | ... |
| (P−2) | $\Lambda_{(Q-2),0}$ | $\Lambda_{(Q-2),1}$ | $\Lambda_{(Q-2),2}$ | $\Lambda_{(Q-2),3}$ | | $\Lambda_{(P-2),(K-2)}$ | $\Lambda_{(P-2),(K-1)}$ |
| (P−1) | $\Lambda_{(Q-1),0}$ | $\Lambda_{(Q-1),1}$ | $\Lambda_{(Q-1),2}$ | $\Lambda_{(Q-1),3}$ | | $\Lambda_{(P-1),(K-2)}$ | $\Lambda_{(P-1),(K-1)}$ |

FIG. 29

METHOD AND SYSTEM FOR COORDINATED SERVICE PLACEMENT IN MULTIPLE CLOUDS

CROSS-REFERENCE TO RELATED APPLICATIONS

The present application is a continuation-in-part of the U.S. patent application Ser. No. 16/550,835, entitled "Method and system for selection of cloud-computing services", filed Aug. 26, 2019, which claims benefit from the U.S. provisional application 62/722,587 filed on Aug. 24, 2018; the entire contents of the above noted applications have been incorporated herein by reference.

FIELD OF THE INVENTION

The present invention is directed towards optimal selection of clouds for placement of services in multiple clouds. In particular, a service comprising multiple components may advantageously be assigned to different clouds.

BACKGROUND

A hybrid cloud has a number of private clouds (based on virtualization techniques) or public clouds that host services required by an organization. Public clouds offer cost-effective computing, storage, and other services such as analytics or content delivery, while private clouds deliver unrivaled control and security to meet business demands. Multiple public cloud providers are often used in a single hybrid cloud, with varying prices and ever-expanding capabilities. Private data centers frequently incorporate many different types of hardware providing a wide variety of capabilities. Different types of public and private clouds require different placement rules. There is no one-to-one mapping between the capabilities of different environments, making their comparison difficult. Deployment environments are often shared among many tenants, leading to an environment that is in constant flux in terms of capability and capacity. Placement of a service must balance out an arbitrary number of factors, such as cost, compatibility, capacity. The needs of different services vary widely, and the types of placement requirements also vary widely from one organization to another.

There is a need, therefore, to explore means for automatically matching clouds to sought services taking into account varying properties of available clouds. Assignments of different components of a service to different clouds need be coordinated to achieve a seamless service-placement function.

SUMMARY

According to one aspect of the invention, there is provided a method of assigning a multitask service to at least one cloud of a plurality of clouds. The method is implemented at a service placement engine employing at least one hardware processor. The method comprises receiving, from a client, a set of service tasks, definition of each service task, and indications of tasks interdependence. A dependency count of each task of the set of service tasks is then determined based on the interdependence of tasks.

Free tasks, i.e., tasks of zero dependency count, are then identified and for each new free task, a procedure of assignment to a compatible cloud is activated. Upon receiving from a cloud confirmation of assignment of an individual task, and determining that at least one task of the set of service tasks has a positive dependency count, succeeding tasks of the individual task are identified and the dependency count of each of the succeeding tasks is reduced by 1. The procedure of assignment of a task is activated when the task becomes free (having a dependency count of zero).

Thus, the service-tasks assignments to respective compatible clouds are coordinated to observe the tasks interdependence. If any task cannot be assigned to any cloud, the multitask service is terminated.

The procedure of task assignment of a task to a cloud comprises: (1) identifying a set of eligible clouds; (2) determining an overall cloud merit vector corresponding to the task and the client; (3) sorting the eligible clouds in descending order according to the overall cloud merit; and (4) sequentially communicating with the eligible clouds to request assignment of the task, starting with the cloud of highest merit, until the task is assigned.

Each cloud that satisfies specified compliance requirements, capability requirements, and resource-availability requirements is an eligible cloud.

The method further comprises processes of: acquiring from each cloud of the plurality of clouds respective cloud information; determining for each task a task-specific cloud merit of each cloud according to respective cloud information and definition of each service task; determining a proximity merit of each cloud according to a known location of the client, and determining the overall cloud merit vector according to the task-specific cloud merit and the proximity merit.

The definition of each service task comprises: metadata; software instructions; and input data.

In the method described above, the set of service tasks may comprise independent tasks.

Alternatively, individual tasks in the set of service tasks may be subject to respective temporal constraints.

The set of service tasks may comprise interdependent tasks.

Yet alternatively, the set of service tasks may comprise interdependent tasks, each task being subject to respective temporal constraints.

According to another aspect of the invention, there is provided, a service-placement engine comprising:

at least one hardware processor for executing processor-readable instructions organized into:
- a cloud-observation module configured to monitor a set of clouds to acquire cloud information;
- a storage medium, coupled to said cloud-observation module, for maintaining acquired cloud information;
- an enhanced cloud-selection module, coupled to said storage medium, for assigning a client-specified service to at least one cloud of a plurality of clouds; and
- a network interface coupled to said cloud-observation module, said enhanced cloud-selection module, and a network for:
  - controlling exchange of data between said client-observation module and any cloud of the plurality of clouds;
  - receiving service definitions from a client of the service-placement engine; and
  - communicating service-assignment information to said client.

In the service-placement engine described above, the enhanced cloud-selection module is configured to perform seamless assignments of individual service components of a service comprising multiple components to at least one cloud of the plurality of clouds.

In the service-placement engine described above, the enhanced cloud-selection module is configured to sort interdependent components of a service into hierarchical sets of tasks.

In the service-placement engine described above, the enhanced cloud-selection module is configured to allocate for each of said hierarchical sets of tasks a respective assignment time window.

According to yet another aspect of the invention, there is provided a system of assigning a multitask service to at least one cloud of a plurality of clouds, comprising: a memory device having computer readable instructions stored thereon, for execution by a processor, causing the processor to:

receive from a client a set of service tasks, definition of each service task, and indications of tasks interdependence;

determine a dependency count of each task of the set of service tasks; designating new free tasks;

start, for each new free task, a procedure of assignment to a compatible cloud;

receive from a cloud confirmation of assignment of an individual task;

while at least one task of the set of service tasks has a positive dependency count:
        identify succeeding tasks of the individual task;
        reduce the dependency count of each succeeding task by 1; and
        repeat said designate, start, receive, identify, and reduce;

thereby, the service tasks assignments to respective compatible clouds are coordinated to observe the tasks interdependence.

In the system described above, the computer readable instructions further cause the processor to terminate assigning the multitask service subject to an indication that said individual task has not been assigned.

In the system described above, the computer readable instructions further cause the processor to:

identify a set of eligible clouds, of the plurality of clouds, each said eligible cloud satisfying specified compliance requirements, capability requirements, and resource-availability requirements;

determine an overall cloud merit vector for said each new free task and said client;

sort the eligible clouds in descending order according to said overall cloud merit; and sequentially communicate with the eligible clouds to request assignment of said each new free task, starting with the cloud of highest merit, until the task is assigned.

In the system described above, the computer readable instructions further cause the processor to:

acquire from each cloud of the plurality of clouds respective cloud information;

determine for said each task a task-specific cloud merit of said each cloud according to said respective cloud information and said definition of each service task;

determine a proximity merit of said each cloud according to a known location of said client, and determine said overall cloud merit vector according to said task-specific cloud merit and said proximity merit.

In the system described above, the definition of each service task comprises: metadata; software instructions; and input data.

In the system described above, the respective cloud information comprises at one of the following:

a compliance vector indicating compliance with individual service standards of a predefined list of standards;

a capability vector indicating support of individual features of a predefined list of features;

a resource-availability vector indicating projected availability of resources; and characterization data relevant to a predefined set of characteristics.

Thus, improved methods and systems for coordinated service placement in multiple clouds have been provided.

BRIEF DESCRIPTION OF THE DRAWINGS

Embodiments of the present invention will be further described with reference to the accompanying exemplary drawings, in which:

FIG. 12 illustrates organization of resource-availability data acquired from cloud-characterization storage medium, in accordance with an embodiment of the present invention;

FIG. 13 illustrates organization of cloud-valuation data acquired from cloud-characterization storage medium;

FIG. 14 illustrates canonicalization of cloud-valuation data, in accordance with an embodiment of the present invention;

FIG. 17 illustrates cloud-characteristics and derived cloud merit vectors according to a first criterion, in accordance with an embodiment of the present invention;

FIG. 20 illustrates organization of significance coefficients of cloud characteristics for each service type for a specific client or a specific client group into vectors of significant coefficients, in accordance with an embodiment of the present invention;

FIG. 21 illustrates a vector of significance coefficients with respect to a specific client independent of service type, in accordance with an embodiment of the present invention;

FIG. 22 illustrates cloud compatibility for each predefined service type;

FIG. 23 illustrates matrix of client-cloud distances/propagation delays, in accordance with an embodiment of the present invention;

FIG. 28 illustrates an exemplary task-specific cloud-merit, in accordance with an embodiment of the present invention;

FIG. 29 illustrates an exemplary client-location-specific cloud-merit, in accordance with an embodiment of the present invention;

TERMINOLOGY

Figure 1:
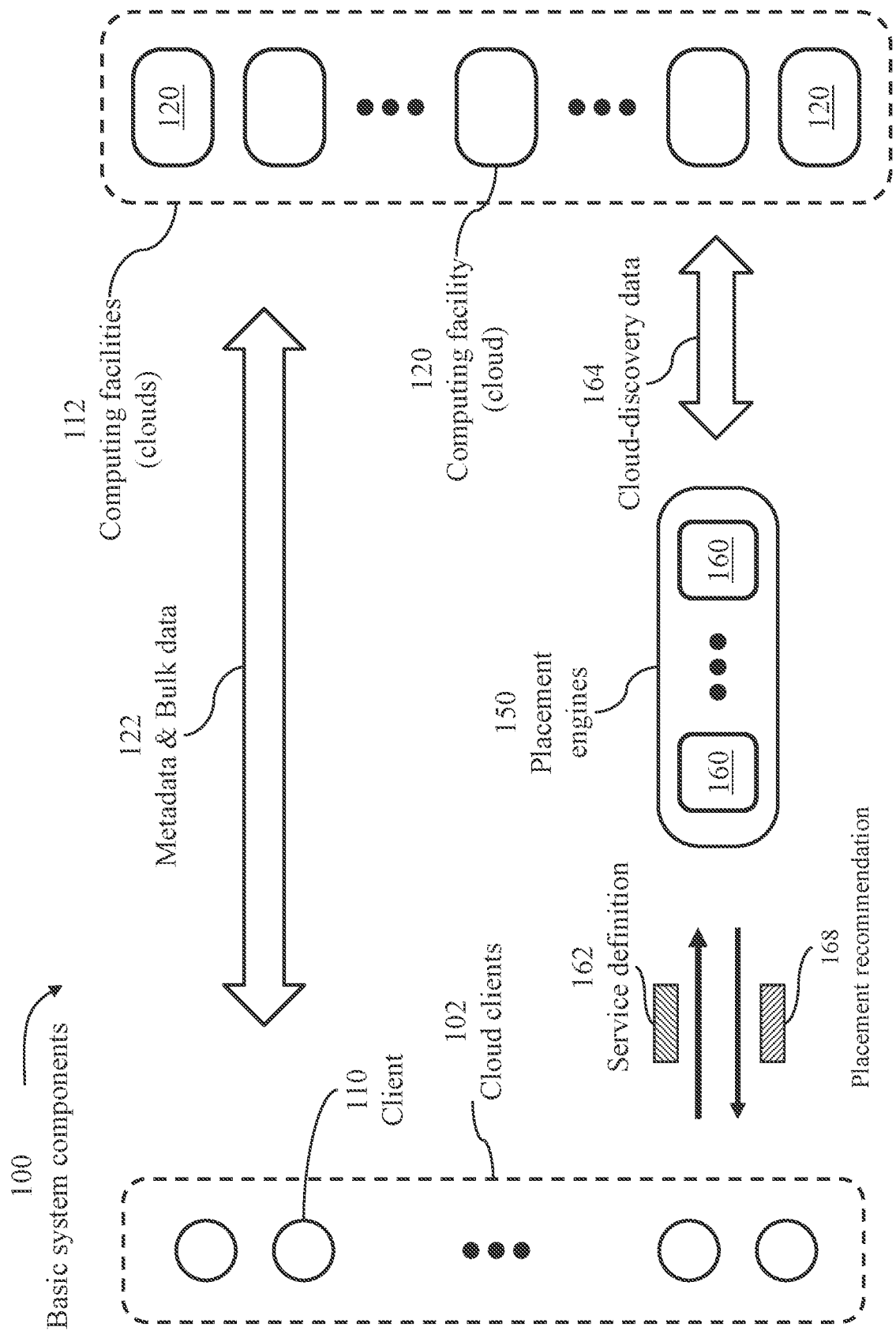
FIG. 1 illustrates a system for expediting and enhancing cloud-computing services based on deployment of placement engines, in accordance with an embodiment of the present invention.

Cloud: A computing facility that provides computing resources on demand is conventionally referenced as a cloud.

Characteristic: The characteristic of a cloud is an attribute of the cloud, such as capacity, or an implication of engaging a cloud, such as cost.

Task: A service may comprise multiple service components. The act of assigning of a service component to a cloud is herein referenced as a "task".

Task assignment: The term refers to placement of a task or scheduling the task.

Cloud observer: A cloud observer monitors a cloud to acquire cloud information including the cloud's characteristics and the cloud's occupancy state.

Valuation: A valuation is a magnitude of a characteristic, in other words, valuation is a (numerical) measure of a characteristic.

Type-1 characteristic: A type-1 characteristic is a characteristic, an increment of valuation of which increases an overall appraisal of a respective cloud. Processing capacity is a type-1 characteristic.

Type-2 characteristic: A type-2 characteristic is a characteristic, a decrement of valuation of which increases an overall appraisal of a respective cloud. Delay is a type-2 characteristic and service cost as a type-2 characteristic.

Canonicalization: Canonicalization is a transformation that combines normalization and rectification of valuation to produce a corresponding canonical merit that is:
(1) bounded within a predefined interval, preferably the closed interval [0.0, 1.0];
(2) dimensionless; and
(3) uniformly oriented (rectified) so that an increment of a merit increases an overall appraisal of a respective cloud whether the merit represents a type-1 characteristic or a type-2 characteristic.

Merit: A canonical merit resulting from canonicalization of valuation od a characteristic is also referenced as "merit" for brevity.

Dot product: The dot product used in the present specification is consistent with the formal definition where the dot product of a first vector $\{x_0, x_1, \ldots, x_{(n-1)}\}$ and a second vector $\{y_0, y_1, \ldots, y_{(n-1)}\}$ is a scalar $[x_0 \times y_0 + x_1 \times y_1 + \ldots + x_{n-1} \times y_{(n-1)}]$, $n>1$.

Processor: The term refers to a hardware device (a physical processing device) which typically accesses at least one memory device storing processor executable instructions.

REFERENCE NUMERALS

100: System for educated automatic selection of cloud computing servers comprising a plurality of placement engines
102: A plurality of clients of a plurality of computing facilities (a plurality of "clouds")
110: An individual client
112: A plurality of clouds
120: An individual cloud
122: Metadata and bulk data exchanged between the plurality of clients and the plurality of clouds
150: A plurality of placement engines
160: An individual placement engine
162: Service definition communicated to a placement engine of a plurality of placement engines
164: Cloud discovery data exchanged between
168: Placement recommendation sent from a placement engine to a client
220: Cloud-observation module
240: Storage medium holding cloud-characterization data
260: Cloud selection) recommendation module
300: Arrangement where multiple cloud-recommendation modules contend for access to a single storage medium 240
600: Distributed system for enabling a plurality of clients to automatically select respective clouds
620: A global network interconnecting clients, clouds 120, storage media 240, placement engines 160, cloud-observation modules 220, and cloud recommendation modules 260.
700: Overview of the functions of a placement engine 160
720: Service definition module
730: Resource availability data
740: Cloud-valuation data
750: Request for cloud service received from a client 110
770: Data identifying required resources
780: Data identifying relevance of requested service to cloud characteristics
800: Example of a cloud selection module 260 communicating with a set of clouds within the distributed system 600 for cloud characteristics acquisition
850: Communication paths through the network connecting a cloud characterization module to a plurality of clouds
900: Example of placement engine 160 communicating with a set of clouds within the distributed system 600 for cloud characteristics acquisition
950: Communication paths through the network connecting a placement engine to a plurality of clouds
1000: Example of interaction of clients 110, a cloud selection module, and a storage medium 240 to determine preferred clouds
1010: Path through a network
1100: Example of interaction of clients 110, a placement engine, and a storage medium 240 to determine preferred clouds
1110: Path through a network
1210: Resource type
1220: Nominal resource-allocation threshold
1240: Current (time-varying) resource-allocation threshold
1310: Cloud characteristic index
1320: Valuation of a specific characteristic of a specific cloud
1400: Merit vectors based on cloud-valuation data of FIG. 13
1440: Merit vector of a specific cloud
1710: Valuation matrix
1720: merit matrix
1740: Exemplary valuations of cloud characteristics
1750: Merit vectors derived from valuations 1740
1820: List of nominal resource requirements for a specific service type
1840: List of current resource requirements for a specific service type
1900: Data used for determining eligible clouds for a specific service
2000: Significance vectors corresponding to service types for a specific client or a specific client group
2020: Significance coefficient of a cloud coefficient with respect to a specific service type for a specific client
2040: A vector of significance coefficients with respect to a specific service type for a specific client or a specific client group
2120: Significance coefficient of a cloud coefficient with respect to a specific client, independent of service type
2140: A vector of significance coefficients with respect to a specific client
2200: Matrix of service-cloud compatibility
2210: A compatible cloud for a specified service
2220: An incompatible cloud for a specified service
2300: Client-cloud distance matrix
2310: Client index
2320: Distance from a client device to a specific cloud
2400: Processes of determining cloud merit vectors
2500: Processes of cloud selection
2600: Criteria for determining cloud eligibility for service placement
2610: Task-specific compliance requirements
2620: Process of compliance verification
2630: Cloud-specific compliance vector
2635: Outcome of compliance verification
2640: Task-specific requisite capabilities
2650: Process of capability verification
2660: Cloud-specific capability vector
2665: Outcome of capability verification
2670: Task-specific workload requirements

2680: Process of resource-availability verification
2690: Cloud-specific resource-availability vector
2695: Outcome of resource-availability verification
2700: Overall location-task-specific cloud-merit vector
2710: Identifiers of client location and task under consideration
2720: Cloud-merit matrix indicating merit of each cloud of a set of clouds with respect to each task of a set of predefined tasks
2730: Overall cloud-merit calculation
2740: Cloud-merit matrix indicating merit of each cloud of a set of clouds with respect to each client location of a set of reference locations
2750: Cloud-merit vector for a specific client location and task under consideration
2810: Cloud index
2820: Task index
2830: Merit of a specific cloud with respect to a specific task
2920: Location index
2930: Merit of a specific cloud with respect to a client location
3000: Enhanced placement engine
3020: Enhanced cloud-selection module
3025: Inter-cloud coordination module
3100: Service-placement system employing an enhanced placement engine 3000
3110: Path for exchange of control data between a client 110 and enhanced placement engine
3120: Path for exchange of control data between enhanced placement engine and a cloud
3130: Path for exchange of control data and content data between a client and a cloud
3200: Multi-task service
3210: Service definition
3212: A task of a multi-task service
3220: Metadata relevant to a specific task
3230: Software instructions relevant to a specific task
3240: Input data relevant to a specific task
3300: Use of multiple cloud-selection modules within an enhanced placement engine
3310: Service request
3320: Input buffer holding definitions of individual tasks of requested service
3330: Distributor of tasks among cloud-selection modules
3340: Array of cloud-selection modules 3350
3350: Cloud-selection module 260 or 3020
3360: Output selector
3370: Output buffer holding task-placement decisions
3400: Allocated time intervals for placement of independent tasks within respective clouds
3500: Allocated time intervals for placement of time-constrained independent tasks within respective clouds
3520: Specified time window
3600: Allocated time intervals for placement of interdependent tasks within respective clouds
3700: Allocated time intervals for placement of interdependent time-constrained tasks within respective clouds
3800: Method of cloud selection for placement of a specific task under temporal constraints
3810: Process of identifying eligible clouds
3820: Process of sorting eligible clouds based on overall cloud merit
3830: Process of selecting an initial target cloud
3840: Process of communicating with a target cloud for task-scheduling
3900: Interaction between a placement engine and multiple clouds for placement of multiple tasks of a service
3910: Processing time at a first cloud
3912: Queueing time at the placing engine of a response from the first cloud
3920: Processing time at a second cloud
3922: Queueing time at the placing engine of a response from the second cloud
3940: Process of sending a request from the placement engine to a cloud
3950: Process of receiving response at the placement engine from a cloud
4000: Exemplary interdependent tasks of a service
4020: Index of a specific task
4030: Indices of preceding tasks of a specific task
4040: Indices of succeeding tasks of a specific task
4100: Method of sequential processing of interdependent tasks
4200: Process of sorting interdependent tasks into hierarchical sets of tasks
4310: Initial task-dependency vector
4314: Count of preceding tasks
4320: Task-dependency vector after first round of placing initial free (unrestricted) tasks
4330: Task-dependency vector after second round of placing initial free tasks
4340: Task-dependency vector after third round of placing initial free tasks
4350: Free task
4360: Dependent task
4400: Hierarchical sets of tasks
4410: Layer-0 (root) set of tasks
4420: Layer-1 set of tasks
4430: Layer-2 set of tasks
4440: Layer-3 set of tasks
4500: Method of concurrent tasks scheduling for predetermined time slices
4510: Process of sorting interdependent tasks into hierarchical sets of tasks
4520: Process of dividing a predefined service-completion interval into time slices having a one-to-one correspondence to the hierarchical sets of tasks
4530: Process of employing multiple cloud-selection modules for concurrent determination of task schedules
4540: Process of receiving a cloud identifier and an allocated time interval for each task
4600: Device for predetermining task schedules based on clouds' environment state
4610: At least one hardware processor
4620: Memory storing a model (software-implemented) of clouds' environment
4630: Memory storing cloud-specific eligibility vectors
4640: Memory storing location-specific cloud-merit matrix
4650: Memory storing round-trip propagation delay between a placement engine and individual clouds
4660: Memory storing task-specific cloud-merit matrix
4670: Tentative schedules of tasks activation at designated clouds
4680: Buffer holding received tasks definitions data
4700: Reference data
4710: Superset of tasks
4720: Task (0)
4730: Task (Q-1)
4740: A set of tasks relevant to service-A
4745: A set of tasks relevant to service-B
4760: Set of reference locations
4770: Reference location (0)
4780: Reference location (P-1)
4790: Approximate location of client-A 4795: Approximate location of client-B
4800: Global service-placement system
4820: Distributed service-placement engine
4830: Cloud observer comprising a cloud-observation module 220 coupled to a respective network interface
4840: A service-placement unit
4870: Processes of exchange of data between clients and service-placement units 4840
4880: Processes of acquisition of cloud information
4900: Distributed cloud monitoring employing multiple cloud observers
5000: Connectivity of an enhanced service-placement module
5020: A transport medium comprising a channel or a set of channels carrying cloud information to a service-placement unit 4840
5100: First exemplary connectivity of cloud-monitoring modules
5110: Network path (channel) from a cloud observer 4830 to a service-placement unit 4840 carrying cloud characterization and state data for a subset of clouds
5200: Second exemplary connectivity of cloud-monitoring modules
5210: Network path (channel) from a cloud observer 4830 to a service-placement unit 4840 carrying cloud characterization and state data from all clouds
5220: Network path (channel) for exchange of cloud-monitoring data among cloud observers 4830
5300: Third exemplary connectivity of cloud-monitoring modules
5310: Network path (channel) from a multicast distributor 5340 to a service-placement unit 4840 carrying cloud characterization and state data from all clouds
5330: Channels carrying cloud characterization and state data from a cloud observer 4830 to a multicast distributor 5340
5340: Multicast distributer

DETAILED DESCRIPTION

A conventional cloud-computing system enables a community of clients to communicate with clouds (computing facilities) to request services requiring web services, data storage, and various levels of data processing. A client may send a request for service to a selected cloud specifying service requirements. The client and the selected cloud exchange data to establish a service session.

Typically, individual clouds have different processing capabilities, storage capacities, and networking features. A client may be an individual user or a business organization. A business organization may request services of different types with varying degrees of resource requirements and service-quality requirements. A client may engage any cloud of a respective designated subset of clouds and initiate service sessions as the need arises. Consequently, any cloud may be actively providing service to several clients concurrently. Naturally, the clients' activities are uncoordinated. Thus, while the combined provisioned resources of client-accessible clouds may exceed the overall resource requirements of the entire community of users, the fluctuating resource occupancies of the individual clouds may lead to several clouds being fully occupied while, concurrently, other clouds have significant resource vacancies. A client may use a cloud-monitoring tool to find a cloud having sufficient free resources for a specific service.

The present invention introduces a placement engine configured to receive service requests from clients and determine, for each service request, an available cloud of highest merit measure.

FIG. 1 illustrates a system 100 for expediting and enhancing cloud services. A plurality 150 of placement engines 160 continuously communicate with individual clouds 120 of a plurality 112 of clouds to acquire cloud-discovery data 164 characterising each cloud. Such cloud-discovery data may cover current free resources, projected free resources, current service-queueing delay, projected service-queueing delay, cost of usage, however defined, etc.

The term "client" is used herein to refer to a communication device configured to communicate with individual clouds 120 and with individual placement engines 160. Generally, a business organization may employ multiple communication devices (multiple clients) to interact with the clouds 120. The plurality 150 of placement engines 160 receive service requests from a plurality 102 of clients 110. Each service request details a service definition 162 indicating resource requirements and service-quality expectation.

Each cloud 120 is a hardware entity. The clouds 120 are naturally geographically distributed. In fact, a single cloud 120 may employ a geographically distributed data center. Likewise, the clients 110 are generally geographically distributed. The task of characterizing the clouds 120 may be divided among the placement engines 160 so that each placement engine communicates with a respective subset of the clouds 120. The characterization information may then be pooled.

A placement engine 160 captures clouds' information and service requirements for educated automatic selection of cloud computing servers. A client sends a service request to a selected placement engine 160. Upon receiving a placement recommendation 168 identifying a preferred cloud for the requested server, the client exchanges data 122 with the preferred cloud; the date bay include metadata as well as bulk data.

Figure 2:
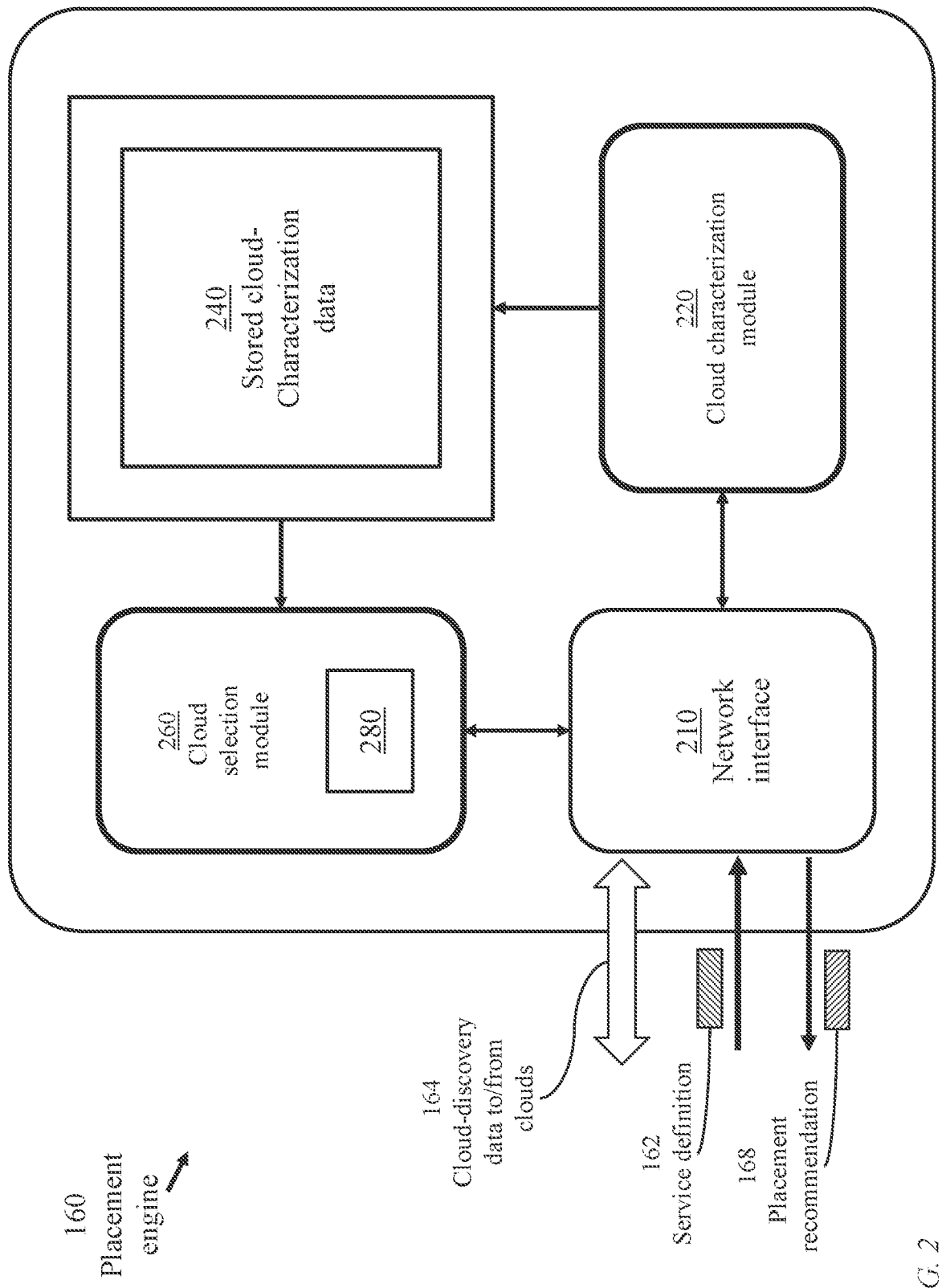
FIG. 2 illustrates a modular placement engine comprising a cloud-characterization module, a storage medium, and a cloud recommendation module.

FIG. 2 illustrates components of a modular placement engine 160. The placement engine essentially comprises a cloud-observation module 220, a storage medium 240, and a cloud-recommendation engine 260. The cloud-characterization module exchanges cloud-discovery data with a designated set of clouds. The acquired cloud-characterization data relates to a predefined set of characteristics. A canonicalization module converts the cloud-characterization data into a set of dimensionless merit vectors each of which corresponding to a respective cloud.

Figure 3:
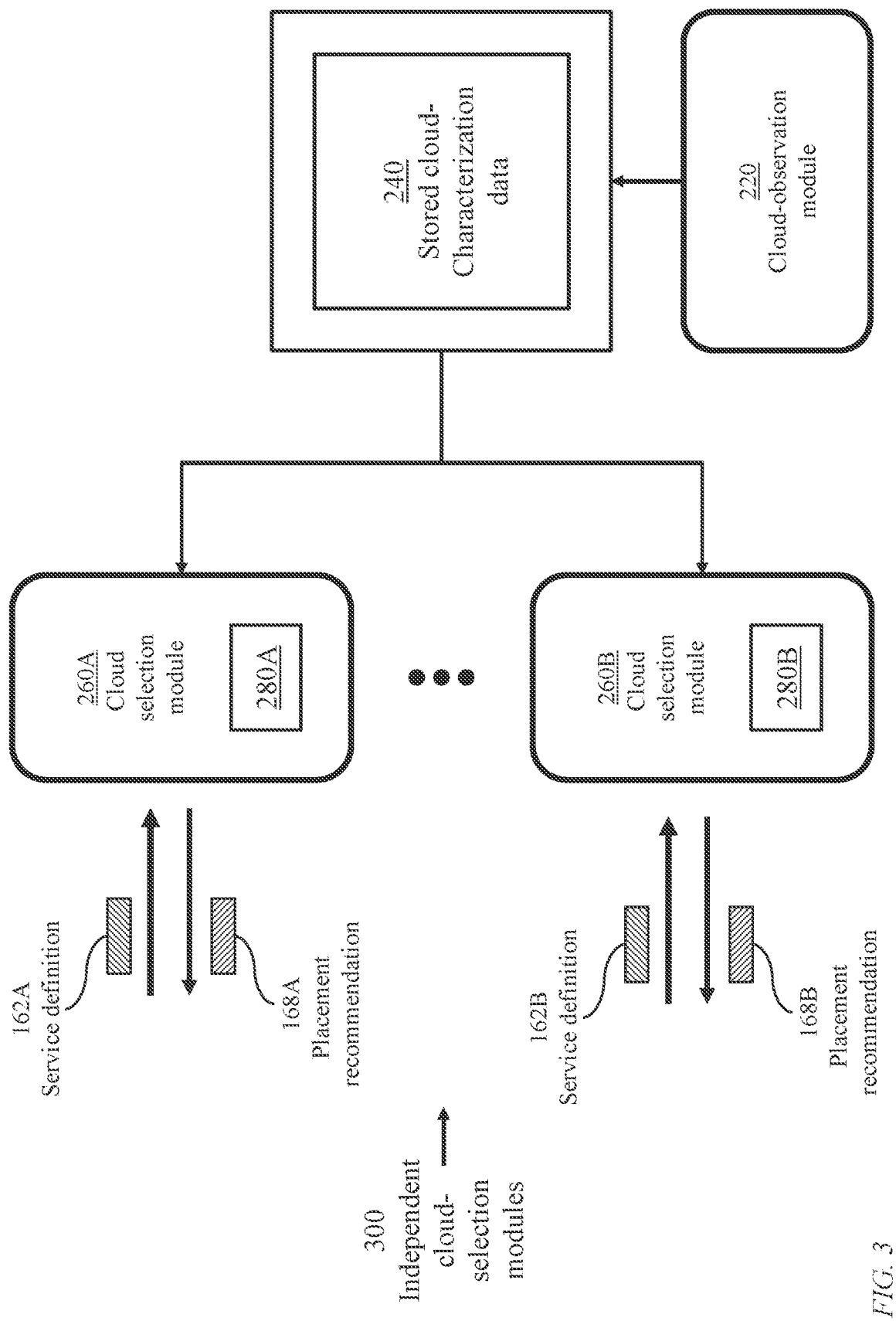
FIG. 3 illustrates a variation of the modular placement engine of FIG. 2.

FIG. 3 illustrates a variation of the modular placement engine of FIG. 2 where two or more cloud recommendation modules 260 may communicate with different sets of clients to receive service requests and return respective recommendations.

Figure 4:
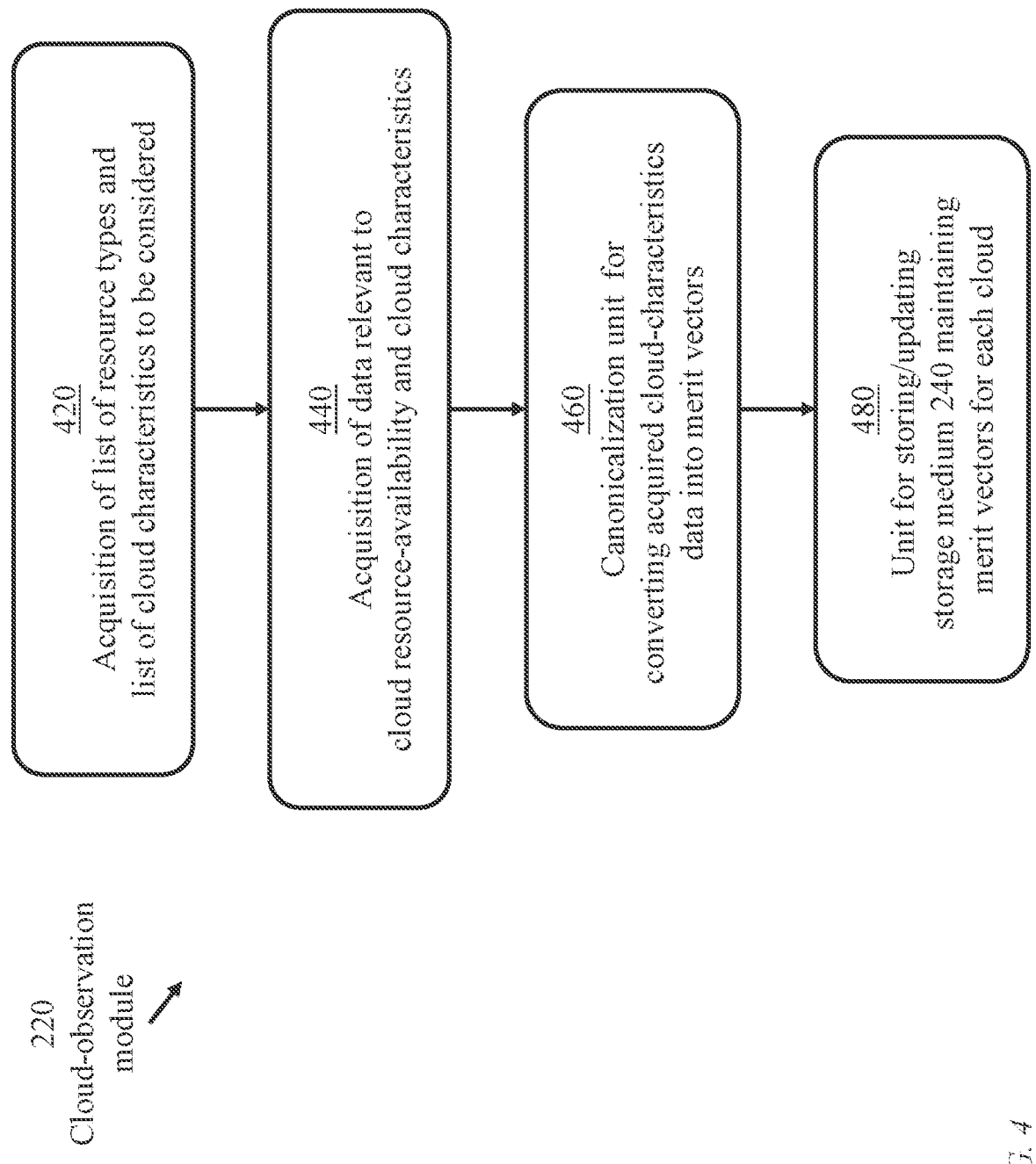
FIG. 4 illustrates organization of a cloud-observation module 220.

FIG. 4 illustrates organization of a cloud-observation module 220. Module 220 may be configured to include units 420, 440, 460, and 480 each of which comprising a memory device, or a respective partition of a memory device, storing processor executable instructions causing at least one processor to perform a respective function.

Unit 420 is configured to acquire a list of encoded definitions of resource types and a list of encoded definitions of cloud characteristics of interest.

Unit 440 is configured to monitor the plurality 112 of clouds 120 to acquire information relevant to provisioned resources and time-varying resource availability of each cloud 120, as well as data characterizing the clouds individually.

Unit 460 is configured to convert the acquired cloud characterization data into a canonical form where a characteristic of a cloud is expressed as a dimensionless "merit" having a value bounded between predefined limits. The predefined limits are preferable 0.0 and 1.0. The merits corresponding to different characteristics may be defined to: consistently trend towards a sought optimum value as the magnitude of a merit increases; or consistently trend towards a sought optimum value as the magnitude of a merit decreases. Without loss of generality, the former is used throughout the description below. For example, the cost of service and speed of processors may be selected as two of the characteristics of clouds. A high cost is a disadvantage while a high processing speed is an advantage. Using cost as the sole criterion for selecting a preferred cloud 120 of the plurality of clouds, the cloud corresponding to minimum cost would be selected. Using processing speed as the sole criterion, the cloud corresponding to highest processing speed would be selected. Since both low cost and high processing speeds are desirable characteristics, but a cloud providing the lowest cost may not provide the highest processing speed of all clouds that are available for a specific service, the clouds 120 of the plurality 112 of clouds may be individually appraised according to a weighted sum of respective cloud valuations with respect to service cost and processing speed.

With an arbitrary number of predefined characteristics, with some characteristics, such as cost and delay, trend towards optimality as their respective values decrease, while other characteristics, such as processing speed, memory speed, and memory capacity, trend towards optimality as their respective values increase, a canonical representation of the characteristics need be explored. The sought canonical representation would also circumvent the difficulty of comparing clouds arising from characteristics' measurement units of differing dimensions and widely differing quantifications.

As mentioned above, service cost may be selected as one of the clouds characteristics. A service, however, may comprise multiple service facets with the service cost itemized for allocation of each facet. To facilitate cloud valuation based on cost, according to an embodiment of the present invention, a "service basket" or a "service bundle" is used a service unit for costing purposes. The service unit is a predefined list of service items of predefined proportions to be used for evaluating the cost of service of a specific cloud.

Unit 460 structures the merits of each cloud with respect to each characteristic to form merit vectors. Each merit vector corresponds to a respective cloud and comprises a merit value (a scalar) for each characteristic according to a predefined order.

Unit 480 is configured to organize storage medium 240 to facilitate insertion and retrieval of the resource availability data acquired in unit 440 and merit vectors generated in unit 460.

Figure 5:
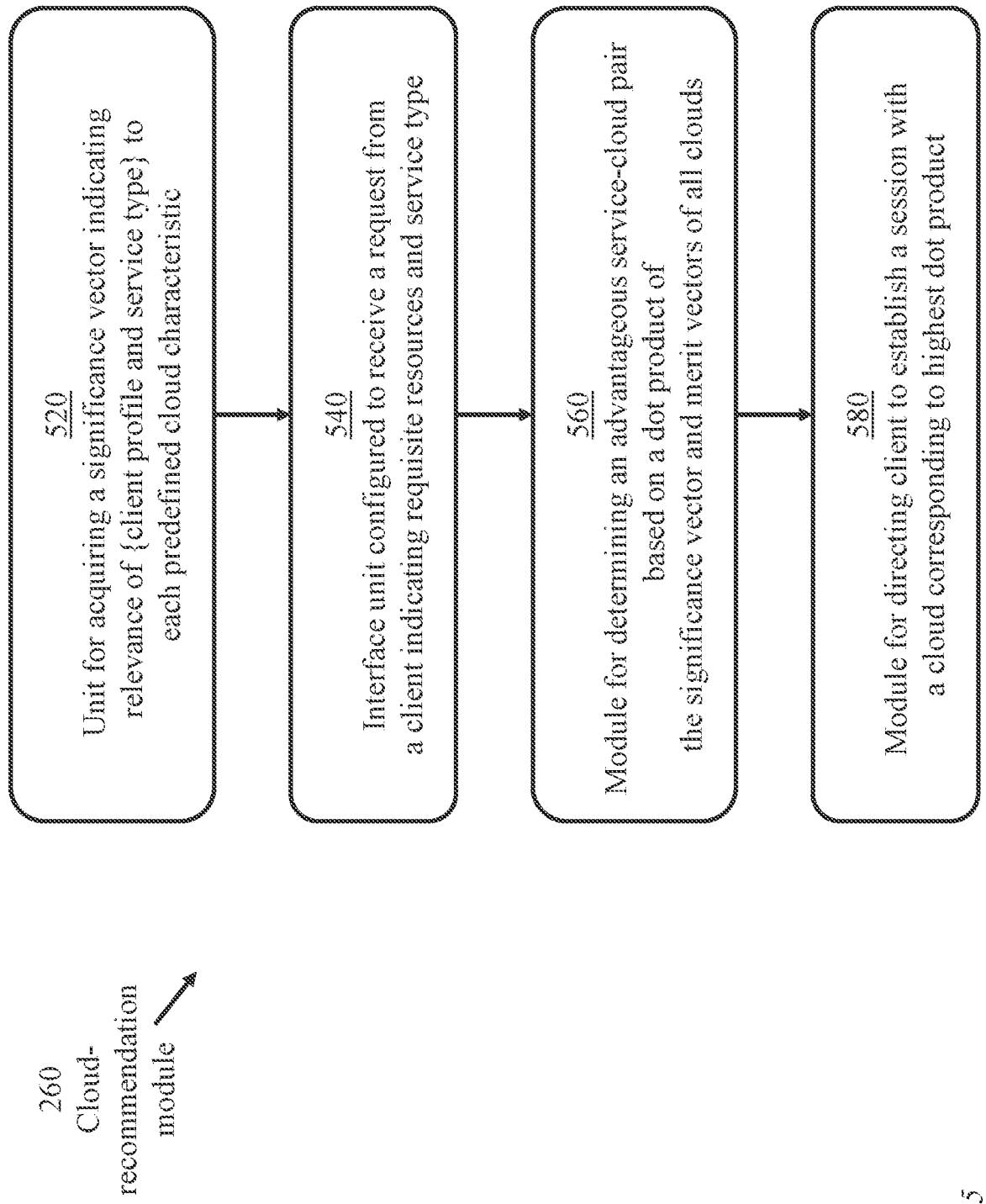
FIG. 5 illustrates organization of a cloud recommendation module 260.

FIG. 5 illustrates organization of a cloud-recommendation module 260. Module 260 may be configured to include units 520, 540, 560, and 580 each of which comprising a respective memory device, or a respective partition of a memory device, storing processor executable instructions causing at least one processor to perform a respective function.

Unit 520 is configured to acquire for each registered client (i.e., a client that has previously engaged the cloud-recommendation module) a respective significance vector indicating significance of each cloud characteristic, based on the list of encoded definitions of cloud characteristics of interest, to each service type of a predefined list of service types. Unit 520 assembles the information in a suitable data structure to facilitate insertion, update, and retrieval of the significance indicators. The table of FIG. 20, to be described below, indicates significance of each characteristic of the predefined set of cloud characteristics of interest to each service type of a plurality of predefined service types for a specific client. The significance level\ of a cloud characteristic to a service type may vary from one client to another. Thus, the significance levels may be determined for each registered client separately. However, the clients may be grouped into a number of categories according to some measure of similarity and a table (generally a suitable data structure) of significance levels may be created for each client category. The characteristics' significance indicators, whether determined for individual clients or for client categories, are stored in a memory device 280 (FIG. 2). The characteristic's significance indicators are structured into significance vectors. Each significance vector corresponds to a respective {service-client} pair or {service-client category} pair and comprises a significance indicator (a scalar) for each characteristic according to a predefined order. The significance indicator is preferably normalized to be within the interval 0 to 1.0.

Unit 540 is configured to receive a service request from a client where the request indicates a service type and requisite resources of a predefined list of resource types. If the client is a registered client, information specific to the client of significance of individual cloud characteristics to the service type may be retrieved from memory device 280. Otherwise, the received service request may explicitly define relevance of the service to each cloud characteristic based on the list of encoded definitions of cloud characteristics of interest. Such information is then added to the characteristics' significance data (memory 280).

Unit 550 is configured to compare the requisite resources with the available resources, which generally vary with time) of each cloud 120 of the plurality 112 of clouds. A set of eligible clouds, each of which having sufficient available resources, is considered for placing the sought service.

Unit 560 is configured to determine a dot product of a significance vector of a specific service and a merit vector of a specific cloud. The value of the dot product (a scalar) of the two vectors is a measure of service advantage of engaging the specific cloud to provide the sought service. Thus, for the received service, unit 560 determines a significance vector. Unit 560 then accesses storage medium 240 to retrieve a merit vector for each cloud of the set of eligible clouds, and computes a dot product of the significance vector and each retrieved merit vector.

Unit 580 communicates with the requesting client to recommend installing the service at the cloud corresponding to the highest dot product.

Figure 6:
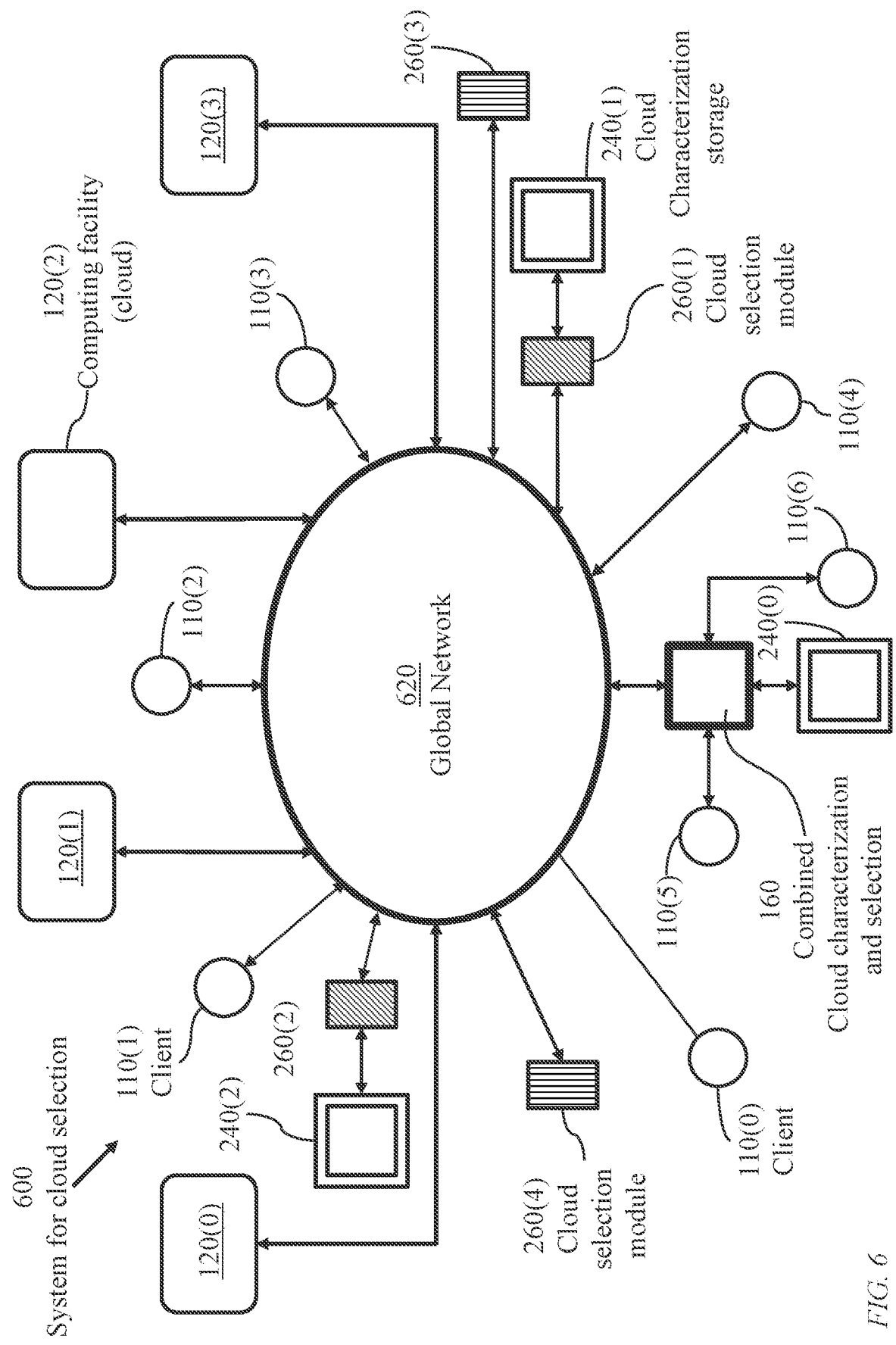
FIG. 6 illustrates an arrangement of the system of FIG. 1 where a client of plurality of clients communicates with any placement engine of a plurality of placement engines through a network, in accordance with an embodiment of the present invention.

FIG. 6 illustrates an arrangement of the system of FIG. 1 where a placement engine 160 and four stand-alone cloud recommendation modules 260(1), 260(2), 260(3), and 260(4) connect to a plurality of clients 110 and to a plurality of clouds 120 through a network 620. Each of stand-alone cloud-recommendation modules 260(1) and 260(2) is coupled to a respective satellite storage medium; 240(1) and 240(2), respectively. The content of each of satellite storage medium 240(1) and satellite-storage medium 240(2) is an up-to-date copy of the content of master storage medium 240(0) which is directly coupled to the placement engine 160 and is frequently updated according to information acquired through continuous monitoring of the plurality of clouds. Each of stand-alone cloud-recommendation modules 260(3) and 260(4) acquires cloud resource-availability data, as well as cloud merit vectors, from master storage-medium 240(0) or a satellite storage medium 240(1) or 240(2), through network 620. Satellite storage media 240(1) and 240(2) are frequently updated, through network 620, according to content changes of mater storage medium 240(0). A client 110 communicates with the placement engine or any of the stand-alone recommendation modules 260(1) to 260 (4).

Figure 7:
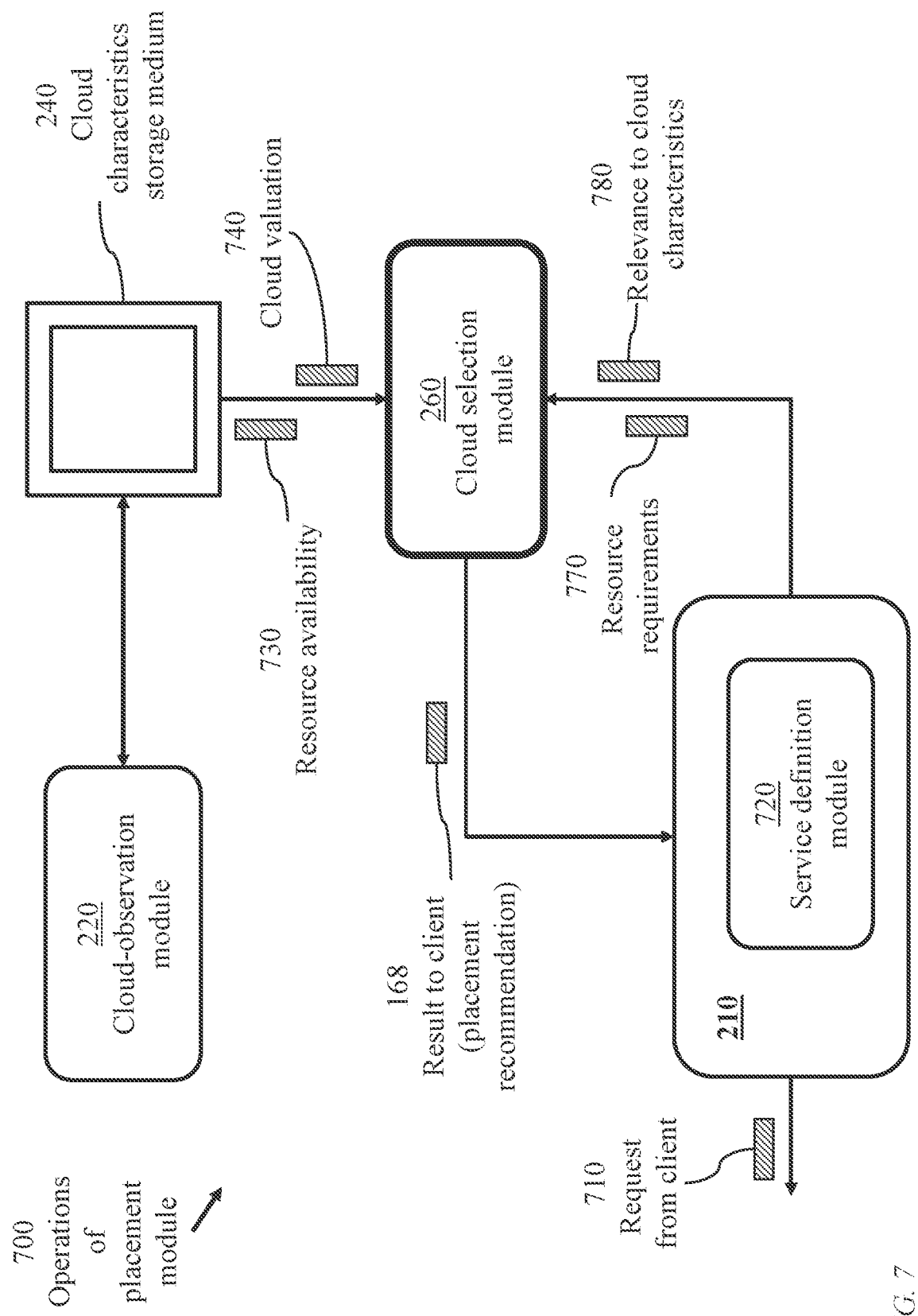
FIG. 7 illustrates operation of a placement engine, in accordance with an embodiment of the present invention.

FIG. 7 illustrates operations 700 of a placement engine 160. The components of the placement engine are illustrated as interface module 210, cloud-observation module 220, cloud-characteristics storage medium 240, and cloud selection (cloud recommendation) module 260. The components may be collocated to intercommunicate directly. The components 220, 240, and 260 may be spatially distributed where they intercommunicate through any network, in which case each would require a respective network interface.

The cloud-observation module 220 performs the functions of:
(1) acquiring cloud information relevant to resource availability and cloud-characteristic valuation;
(2) updating the content of cloud-characteristics storage medium 240 as the need arises;
(3) computing new merit vectors; and
(4) updating existing merit vectors.

The cloud-observation module 220 stores the resource availability data, the cloud-characteristic valuation data, and the merit vectors in cloud-characteristics storage medium 240.

The cloud-selection module 260 acquires resource-availability data 730 as well as cloud valuation data 740 from storage medium 240.

The network interface 210 comprises a service-definition module 720 which receives clients' service requests 750 and formulates, for each request, service-definition data which includes data 770 identifying required resources, and data 780 identifying relevance of requested service to cloud characteristics.

Figure 8:
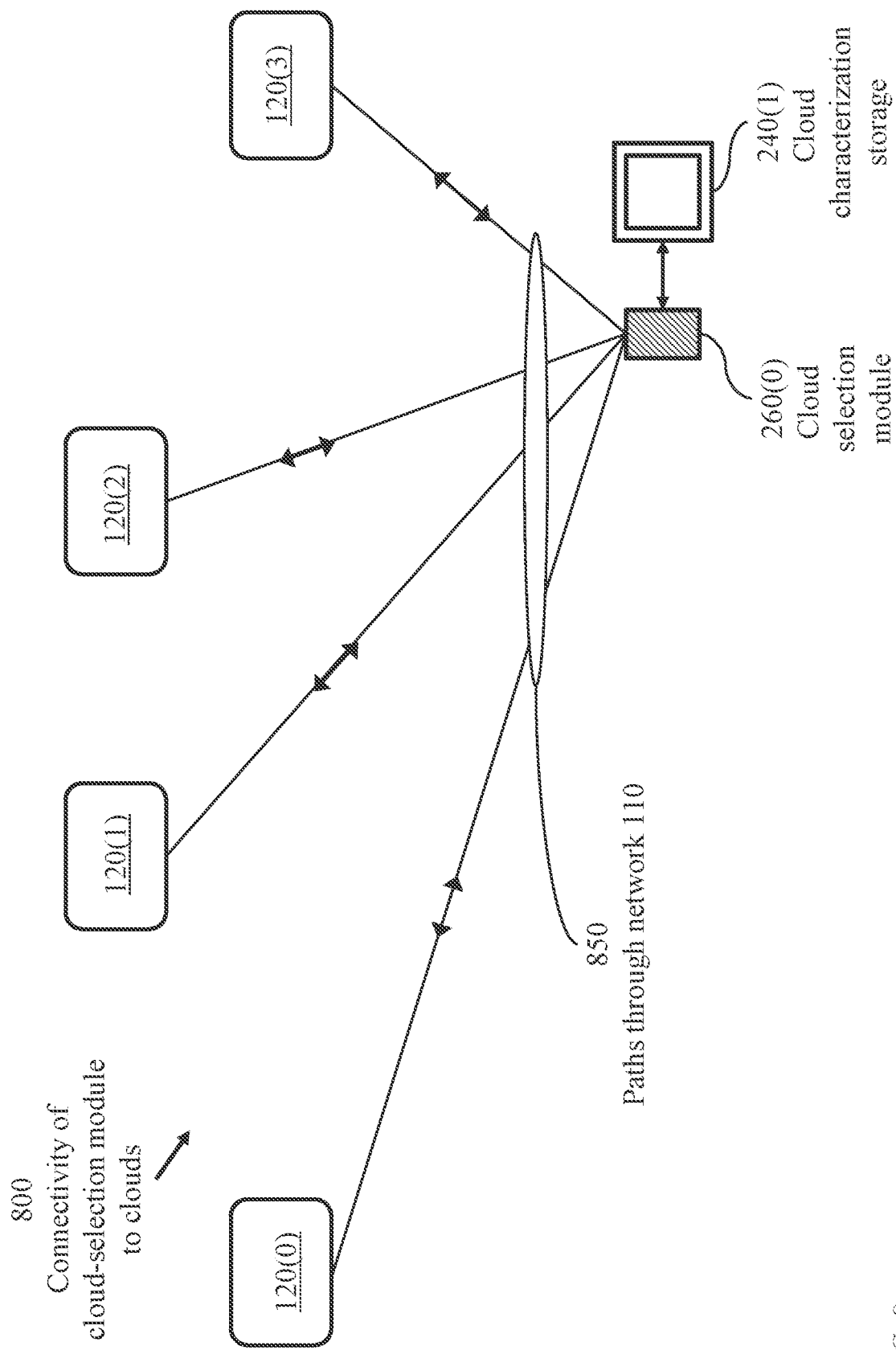
FIG. 8 illustrates interaction of a cloud characterization module of a placement engine with a set of clouds through the network of FIG. 6 for acquisition of cloud characteristics.

FIG. 8 illustrates connectivity 800 of cloud selection module 260(1) of the system of FIG. 6 to clouds 120(0), 120(1), 120(2), and 120(3) through communication paths 850 within network 620 for acquisition of cloud characteristics.

Figure 9:
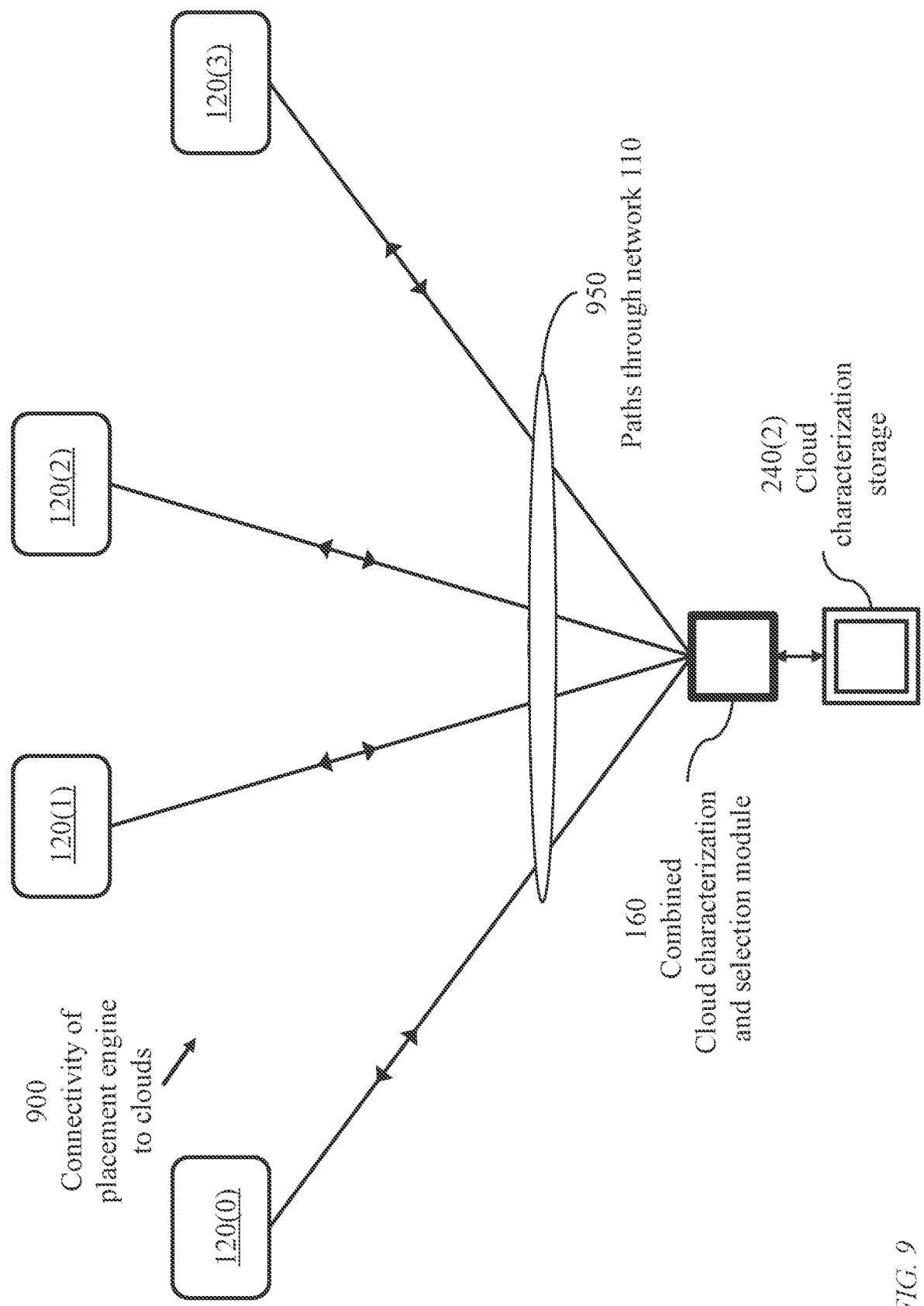
FIG. 9 illustrates interaction of an integrated placement engine with a set of clouds through the network of FIG. 6 for acquisition of cloud characteristics.

FIG. 9 illustrates connectivity 900 of the integrated placement engine 240 of the system of FIG. 6 to clouds 120(0), 120(1), 120(2), and 120(3) through communication paths 950 acquisition of cloud characteristics.

Figure 10:
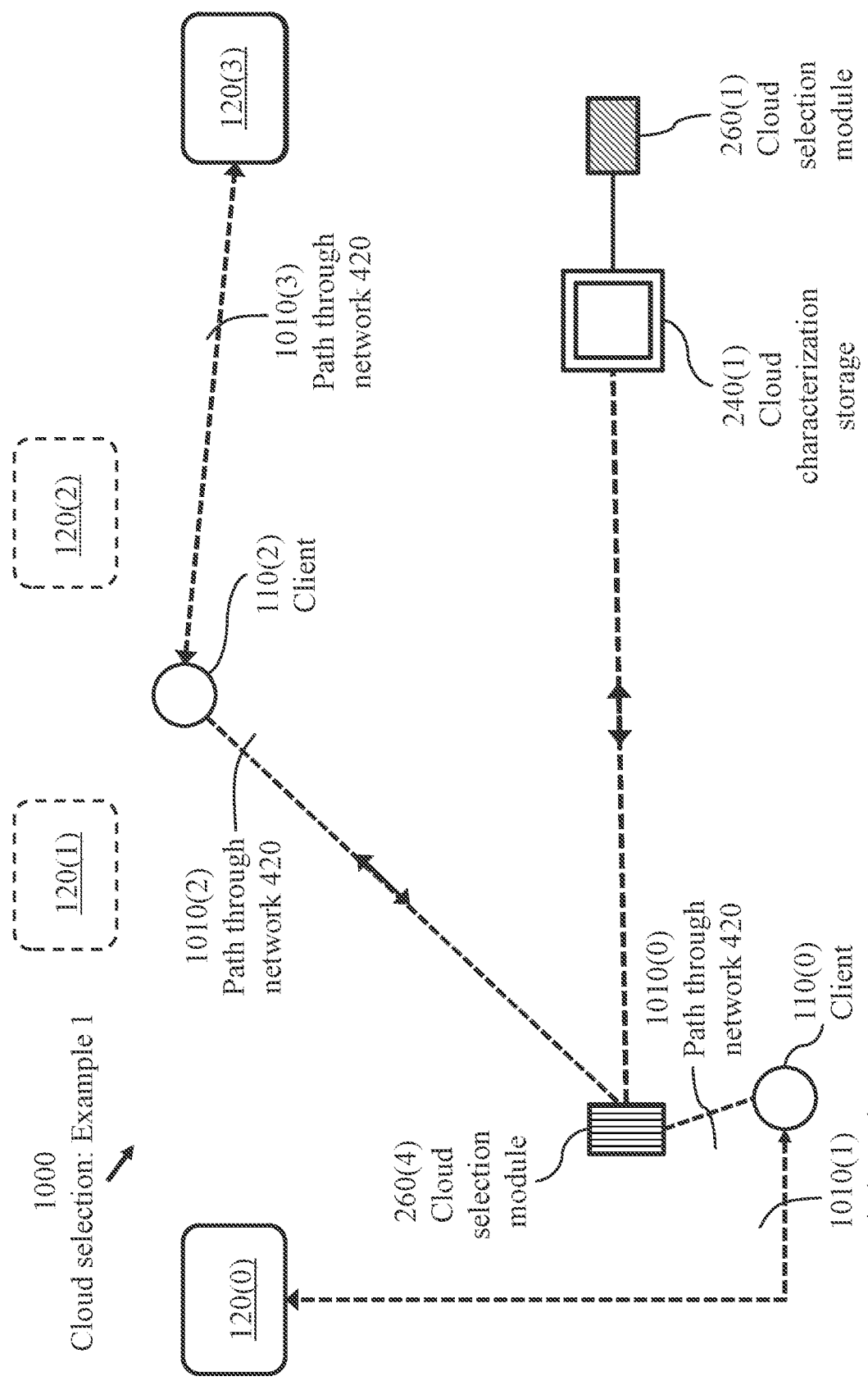
FIG. 10 illustrates interaction of clients 110 with a cloud selection module to determine preferred clouds, in accordance with an embodiment of the present invention.

FIG. 10 illustrates an example, 1000, of interaction of clients 110 with cloud selection module to determine preferred clouds. Client 110(0) communicates a service request to stand-alone cloud selection module 260(4) which recommends cloud 120(0). Client 110(0) then establishes a dual path 1010(0) through network 620. Another client 110(2) also communicates a service request to stand-alone cloud-selection module 2640(4) which recommends cloud 120(3). Stand-alone cloud-selection module 260(4) selected satellite cloud-characterization storage medium 240(1) for acquisition of cloud-related data.

Figure 11:
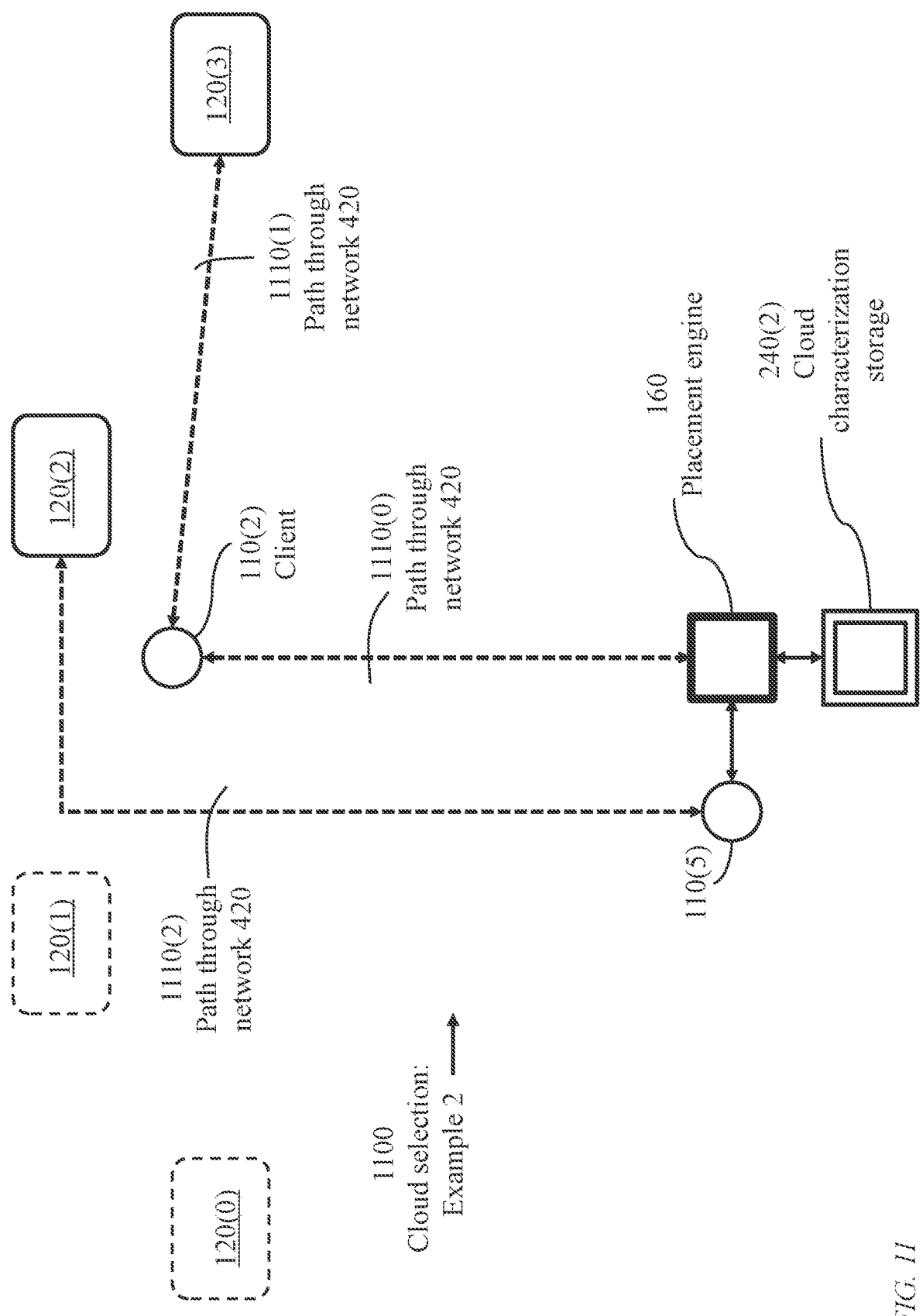
FIG. 11 illustrates interaction of clients 110 with a placement engine to determine preferred clouds, in accordance with an embodiment of the present invention.

FIG. 11 illustrates an example, 1100, of interaction of clients 110 with placement engine 240 of the system of FIG. 6 to determine preferred clouds. Client 110(2) communicates a service request to placement engine 240 which recommends cloud 120(2). Client 110(5) then establishes a dual path 1110(2) through network 620 to cloud 120(2). Client 110(2) communicates a service request to placement engine 240 which recommends cloud 120(3). Client 110(5) then establishes a dual path 1110(1) through network 620 to cloud 120(3).

FIG. 12 illustrates organization of resource-related data 730 stored in cloud-characterization storage medium 240. As described above, cloud-observation module 220 monitors the plurality 112 of clouds 120 to acquire information relevant to provisioned or allocable resources and time-varying resource availability of each cloud 120. A cloud-computing provider may limit the amount of resources, of the entire provisioned resources, that may be accessible to a single client. The allocable resources to a particular client may be determined according to a service-level agreement. The occupancy of a cloud, i.e., the proportion of the cloud's resources that are active or assigned to clients, fluctuates with time. Thus, the cloud-observation module 220 frequently updates the content of the cloud-characterization medium 240.

As illustrated in FIG. 12, for each cloud k, $0 \leq k < K$, K being the total number of clouds under consideration, potential allocable resources 1220, denoted $R_{k,h}$, $0 \leq h < H$, as well as currently available resources 1240, denoted $r_{k,h}$, H being the number of resource types under consideration, are maintained in storage medium 240.

FIG. 13 illustrates exemplary organization of cloud-valuation data 740 stored in cloud-characterization storage medium 240. Indices 1310 identify the cloud characteristics of a list of relevant cloud characteristics. A valuation 1320 of each cloud characteristic of a list of relevant cloud characteristics is determined for each cloud of the K clouds.

The characteristic of index 0 represents service cost, denoted c. The valuations c for the 12 clouds (K=12) are denoted $c_0, c_1, \ldots, c_{11}$. The valuations are canonicalized to produce corresponding merits denoted $\alpha_{0,0}, \alpha_{1,0}, \ldots, \alpha_{11,0}$, as indicated in FIG. 14.

The characteristic of index 2 represents available processing capacity, denoted p. The valuations of p for the 12 clouds (K=12) are denoted $p_0, p_1, \ldots, p_{11}$. The valuations are canonicalized to produce corresponding merits denoted $\alpha_{0,2}, \alpha_{1,2}, \ldots, \alpha_{11,2}$.

The characteristic of index 5 represents service delay, denoted d. The valuations of the service delay for the 12 clouds (K=12) are denoted $d_0, d_1, \ldots, d_{11}$. The valuations are canonicalized to produce corresponding merits denoted $\alpha_{0,5}, \alpha_{1,5}, \ldots, \alpha_{11,5}$.

The characteristic of index 8 represents available storage capacity, denoted q. The valuations of q for the 12 clouds (K=12) are denoted $q_0, q_1, \ldots, q_{11}$. The valuations are canonicalized to produce corresponding merits denoted $\alpha_{0,8}, \alpha_{1,8}, \ldots, \alpha_{11,8}$.

Characteristics c and d (columns 0 and 5 of the matrix of FIG. 12) are type-2 characteristics. An increment of $c_k$ (service cost of cloud k) decreases the overall merit of cloud k, $0 \leq k < K$. Likewise, an increment of $d_k$ (service delay of cloud k) decreases the overall merit of cloud k, $0 \leq k < K$.

Characteristics p and q (columns 2 and 8 of the matrix of FIG. 12) are type-1 characteristics. An increment of $p_k$ (processing capacity of cloud k) increases the overall merit of cloud k, $0 \leq k < K$. Likewise, an increment of $q_k$ (service delay of cloud k) increases the overall merit of cloud k, $0 \leq k < K$.

FIG. 14 illustrates a set 1400 of metric vectors 1440 of the clouds. The elements of a metric vector of a cloud k are canonicalized cloud-valuation data corresponding to each of the characteristics of indices (0) to (8) based on cloud-valuation data of FIG. 13.

Merit vector 1440a appraises the cloud of index 0. The elements $\{\alpha_{0,0}, \alpha_{0,1}, \alpha_{0,2}, \alpha_{0,3}, \alpha_{0,4}, \alpha_{0,5}, \alpha_{0,6}, \alpha_{0,7}, \alpha_{0,8}\}$ are canonicalized values of corresponding valuations of row 0 (cloud of index 0) of FIG. 13. Metrics $\alpha_{0,0}, \alpha_{0,2}, \alpha_{0,5}$, and $\alpha_{0,5}$ correspond to valuations $c_0, p_0, d_0$, and $q_0$.

The elements $\{\alpha_w\}, \alpha_{11,1}, \alpha_{11,2}, \alpha_{11,3}, \alpha_{11,4}, \alpha_{11,5}, \alpha_{11,6}, \alpha_{11,7}, \alpha_{11,8}\}$ are canonicalized values of corresponding valuations of row 11 (cloud of index 11) of FIG. 13. Metrics $\alpha_{11,0}, \alpha_{11,2}$, and $\alpha_{11,8}$ correspond to valuations $c_{11}, p_{11}, d_{11}$, and $q_{11}$.

Canonicalization of Characteristics Valuations

As described above, with reference to FIG. 4, the cloud-observation module 220 converts acquired cloud characterization data into a canonical form where a characteristic of a cloud is expressed as a dimensionless merit having a value bounded between predefined limits; preferably 0.0 and 1.0. The merits corresponding to different characteristics consistently trend towards a sought optimum value as the magnitude of a merit increases. Thus, as valuation of a characteristic such as service cost decreases, the corresponding merit increases and as valuation of a characteristic such as processing capacity increases, the corresponding merit increases.

A valuation, x, of a cloud characteristic may vary significantly between clouds 120. Depending on the characteristic type, the overall advantage of the cloud may increase as x increases or as x decreases. To facilitate consideration of multiple characteristics of different types, the valuation x is canonicalized, where x is converted into a merit $\mu_x$ which consistently trend towards a sought optimum value. Several implementations of such canonicalization may be considered.

Figure 15:
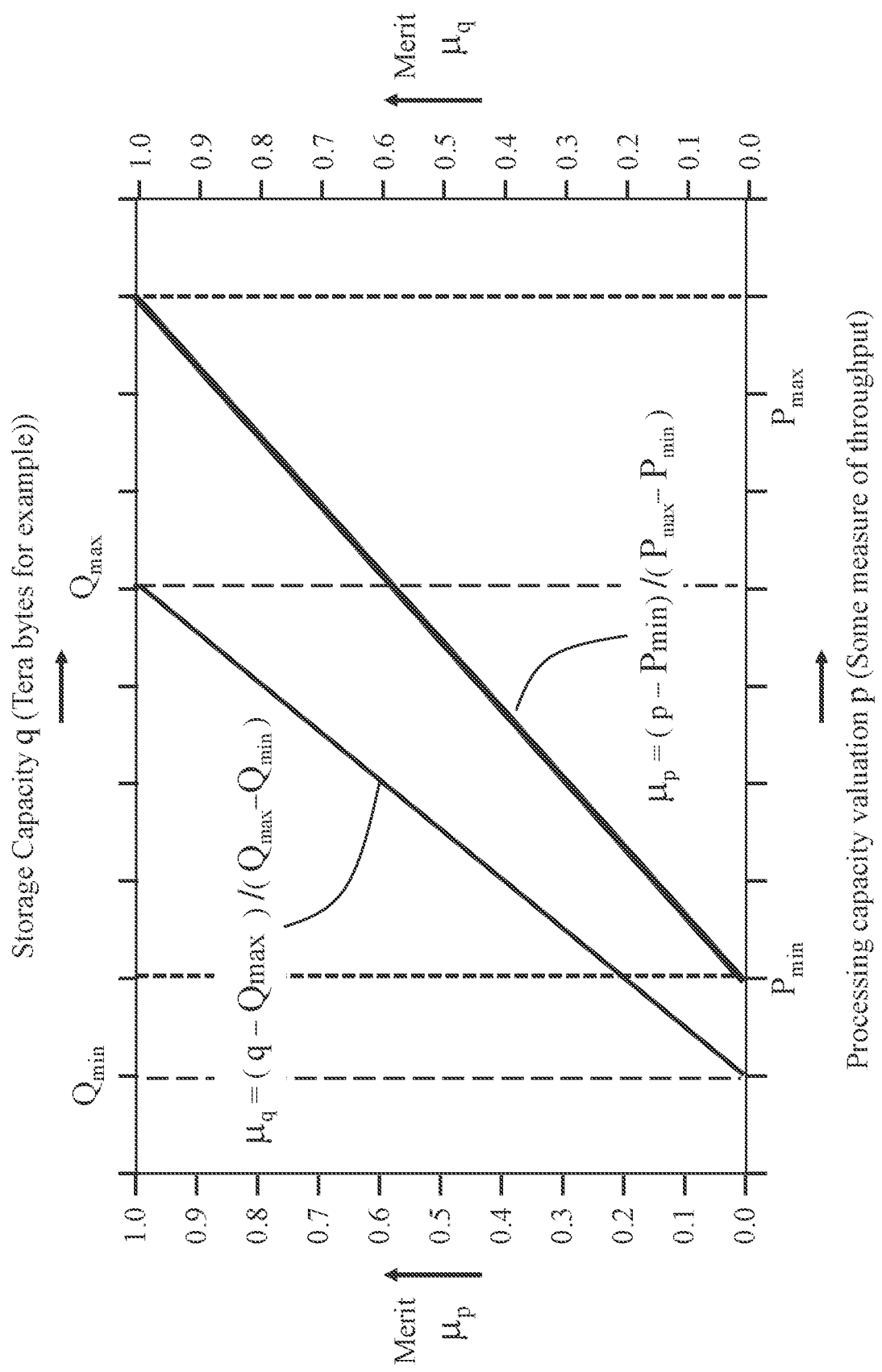
FIG. 15 illustrates canonicalization of type-1 characteristics valuation where the valuation trends towards optimality as the valuation increases.
Figure 16:
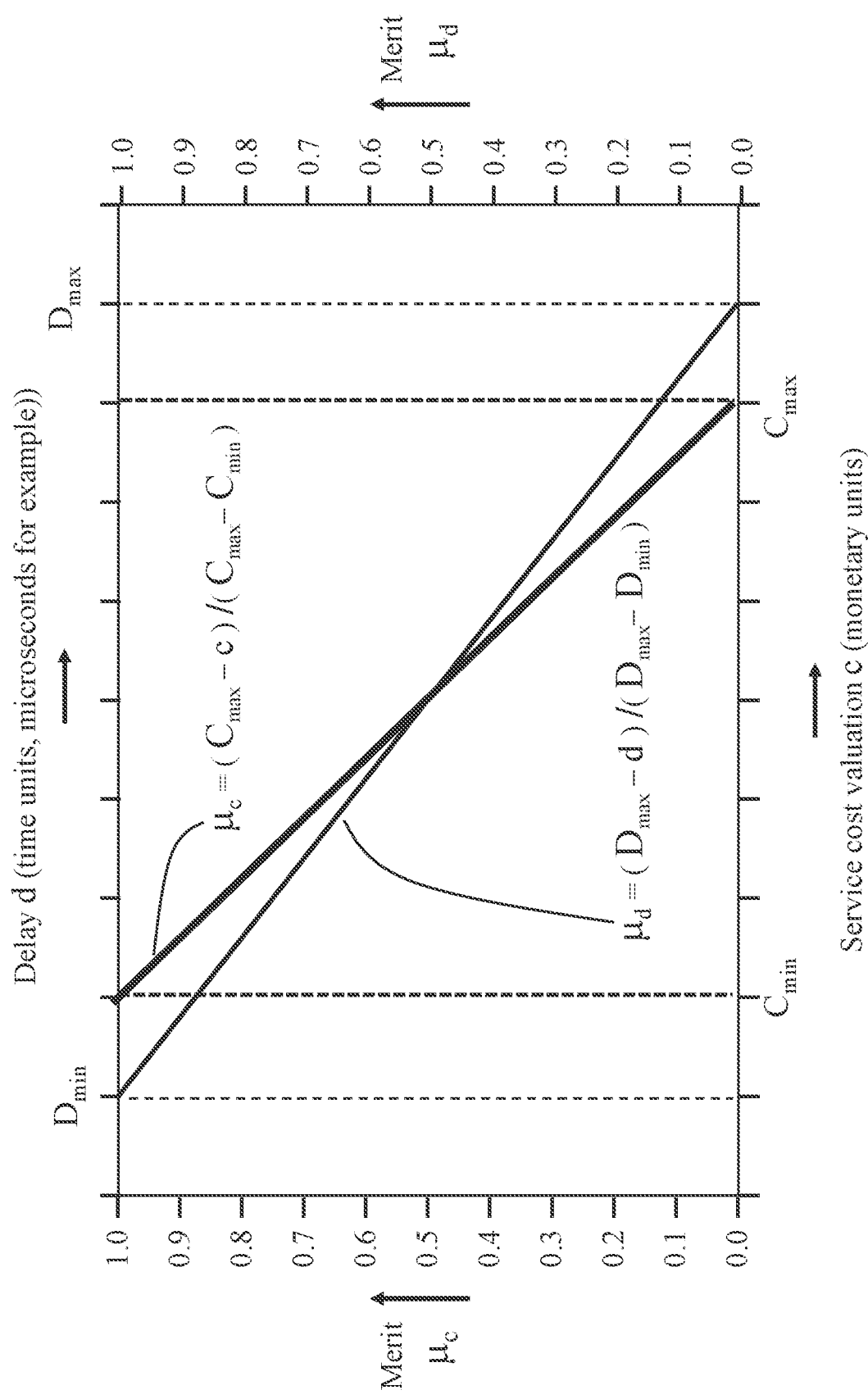
FIG. 16 illustrates canonicalization of type-2 characteristics valuations where the valuation trends towards optimality as the valuation decreases.

According to one embodiment of the canonicalization process, illustrated in FIG. 15 and FIG. 16, the merit is determined based on extreme values $X_{min}$ and $X_{max}$ of x; $X_{min}$ denoting the minimum value of x and $X_{max}$ denoting the maximum value of x.

According to a first implementation of the canonicalization process, the characteristics are considered one at a time, and for each characteristic, corresponding valuations for all of the clouds are examined to determine a respective minimum valuation $X_{min}$ and a respective maximum valuation $X_{max}$ for each characteristic under consideration.

The set of predefined characteristics may comprise at least one type-1 characteristic where increasing a respective valuation increases a respective cloud appraisal. For a specific type-1 characteristic, of a specific cloud, the characteristic having a valuation x, a corresponding merit is determined as:

$\mu_x=(x-X_{min})/(X_{max}-X_{min})$.

The set of predefined characteristics may comprise at least one type-2 characteristic where decreasing a respective valuation increases a respective cloud appraisal. For a specific type-2 characteristic, of a specific cloud, the characteristic having a valuation x, a corresponding merit is determined as:

$\mu_X(X_{max}-x)/(X_{max}-X_{min})$.

FIG. 15 illustrates canonicalization 1500 of two cloud characteristics: processing capacity and storage capacity (type-1 characteristics).

The processing-capacity valuation, denoted p, for the plurality 112 of clouds, varies between $P_{min}$ and $P_{max}$. A processing-capacity merit, $\mu_p$, is defined as:

$\mu_p=(p-P_{min})/(P_{max}-P_{min})$.

Thus, a cloud having a processing-capacity valuation p equal to $P_{min}$, is given a merit of 0.0 while a cloud having a processing-capacity valuation of Pmax is given a merit of 1.

Likewise, the storage-capacity valuation, denoted q, for the plurality 112 of clouds, varies between $Q_{min}$ and $Q_{max}$. A storage-capacity merit, $\mu_q$, is defined as:

$\mu_g=(q-Q_{min})/(Q_{max}-Q_{min})$.

Thus, a cloud having a storage-capacity valuation q equal to $Q_{min}$, is given a merit of 0.0 while a cloud having a processing-capacity valuation of Qmax is given a merit of 1.

For each of the two characteristics, the valuation trends towards optimality (increasing the overall advantage of a respective cloud) as the valuation increases.

FIG. 16 illustrates canonicalization 1600 of two cloud characteristics: service cost and service delay (type-2 characteristics).

The service-cost valuation, denoted c, for the plurality 112 of clouds, varies between $C_{min}$ and $C_{max}$. A service-cost merit, $\mu_c$, is defined as:

$\mu_c=(C_{max}-c)/(C_{max}-C_{min})$.

Thus, a cloud having a service-cost valuation c equal to Cmin, is given a merit of 1.0 while a cloud having a cost valuation of Cmax is given a merit of 0.

Likewise, the estimated service-delay valuation, denoted d, for the plurality 112 of clouds, varies between $D_{min}$ and $D_{max}$. A service-delay merit, $\mu_d$, is defined as:

$\mu_d=(D_{max}-d)/(D_{max}-D_{min})$.

Thus, a cloud having a service-delay valuation d equal to Dmin, is given a merit of 1.0 while a cloud having a cost valuation of Dmax is given a merit of 0.

For each of the two characteristics, the valuation trends towards optimality (increasing the overall advantage of a respective cloud) as the valuation decreases.

According to a variation of the method illustrated in FIG. 15 and FIG. 16, the extreme values $X_{min}$ and $X_{max}$ of x may be replaced with a lower bound of x and an upper bound of x, respectively, corresponding to predefined values $a_1$ and $a_2$, $0.0<a_1<a_2<1.0$, (for example 0.04 and 0.96, respectively) of a cumulative distribution of x over all clouds.

Thus, for each characteristic, a cumulative distribution of valuations over all of the clouds of the plurality of clouds is generated. A valuation lower bound $V_{min}$ of a specific characteristic corresponds to a predefined value $a_1$ of the cumulative distribution. A valuation upper bound $V_{max}$ of the specific characteristic corresponds to a predefined value $a_2$ of the cumulative distribution, $0.0<a_1<a_2<1.0$.

A set of predefined characteristics may comprise at least one type-1 characteristic where increasing a respective valuation increases a respective cloud appraisal. A merit corresponding to a specific type-1 characteristic for a specific cloud having a valuation x is then determined as:

$\mu_x=0.0$ for $x<V_{min}$;

$\mu_x=(x=V_{min})/(V_{max}-V_{min})$, for $V_{min}\le x\le V_{max}$ $\mu_x=1.0$ for $x>V_{max}$.

The set of predefined characteristics may comprise at least one type-2 characteristic where decreasing a respective valuation increases a respective cloud appraisal. A merit corresponding to a specific type-2 characteristic for a specific cloud having a valuation x is determined as:

$\mu_x = 1.0$ for $x < V_{min}$;

$\mu_x = (V_{max} - x)/(V_{max} - V_{min})$, for $V_{min} \le x \le V_{max}$ $\mu_x = 0.0$ for $x > V_{max}$.

According to another embodiment of the canonicalization process, the merit is determined based on a predefined reference valuation of a characteristic. For valuation, x, of a specific cloud characteristic of reference valuation $X_{ref}$, the merit is determined according to the transformation:

$\mu_x = x/(x + X_{ref})$ for a type-1 characteristic where increasing x increases the overall advantage of a respective cloud, or $\mu_x = X_{ref}/(x + X_{ref})$ for a type-2 characteristic where decreasing x increases the overall advantage of the respective cloud.

In either case, $\mu_x$ has asymptotic values of 0.0 and 1.0:
(i) for a type-1 characteristic, $\mu_x$ tends to 0.0 as x tends to 0.0 and tends to 1.0 as x tends to infinity; and
(ii) for a type-2 characteristic, $\mu_x$ tends to 1.0 as x tends to 0.0 and tends to 0.0 as x tends to infinity.

Xref=64.0 units, type-1 characteristic

| x | 5.0 | 16.0 | 42.0 | 62.0 | 89.0 | 190.0 | 328.0 |
|---|---|---|---|---|---|---|---|
| $\mu_x$ | 0.072 | 0.20 | 0.396 | 0.492 | 0.582 | 0.748 | 0.837 |

Xref=80.0 units, type-2 characteristic

| x | 9.0 | 20.0 | 82.0 | 120.0 | 280.0 | 314.0 | 564.0 |
|---|---|---|---|---|---|---|---|
| $\mu_x$ | 0.899 | 0.80 | 0.494 | 0.400 | 0.778 | 0.203 | 0.124 |

FIG. 17 illustrates exemplary valuations 1740 of cloud characteristics and derived cloud merit vectors 1750 for the case of only four clouds (K=4), indexed as κ, 1, 2, and 3. The individual characterisation-specific valuations 1740 of the clouds are indicated in matrix 1710. Corresponding canonicalized metrics, determined according to the method depicted in FIG. 15 and FIG. 16, are indicated in matrix 1720. The indices 1310 of type-2 characteristics are distinguished with the superscript "*". Thus, the characteristics of indices 0, 4, 5, and 7 are type-2 characteristics. The remaining characteristics are type-1 characteristics.

The valuations of the four clouds according to the characteristic of index (0), which is a type-2 characteristic, are determined to be 122.4, 40.0, 240.0, and 50.9, respectively. The minimum and maximum values are 40.0 and 240.0, respectively. Thus, the corresponding canonicalized metrics are determined as (FIG. 16):
{(240.0−122.4)/(240.0−40.0)},
{(240.0−40.0)/(240.0−40.0)},
{(240.0−240.0)/(240.0−40.0)}, and
{(240.0−50.9)/(240.0−40.0)}.

The results, 0.588, 1.0, 0.0, and 0.946 are indicated in the column of index (0) of matrix 1720.

The valuations of the four clouds according to the characteristic of index (6), which is a type-1 characteristic, are determined to be 42.9, 30.0, 80.0, and 68.2, respectively. The minimum and maximum values are 30.0 and 80.0, respectively. Thus, the corresponding canonicalized metrics are determined as (FIG. 15):
{(42.9−30.0)/(80.0−30.0)},
{(30.0−30.0)/(80.0−30.0)},
{(80.0−30.0)/(80.0−30.0)}, and
{(68.2−30.0)/(80.0−30.0)}.

The results, 0.258, 0.0, 1.0, and 0.764 are indicated in the column of index (6) of matrix 1720.

Figure 18:
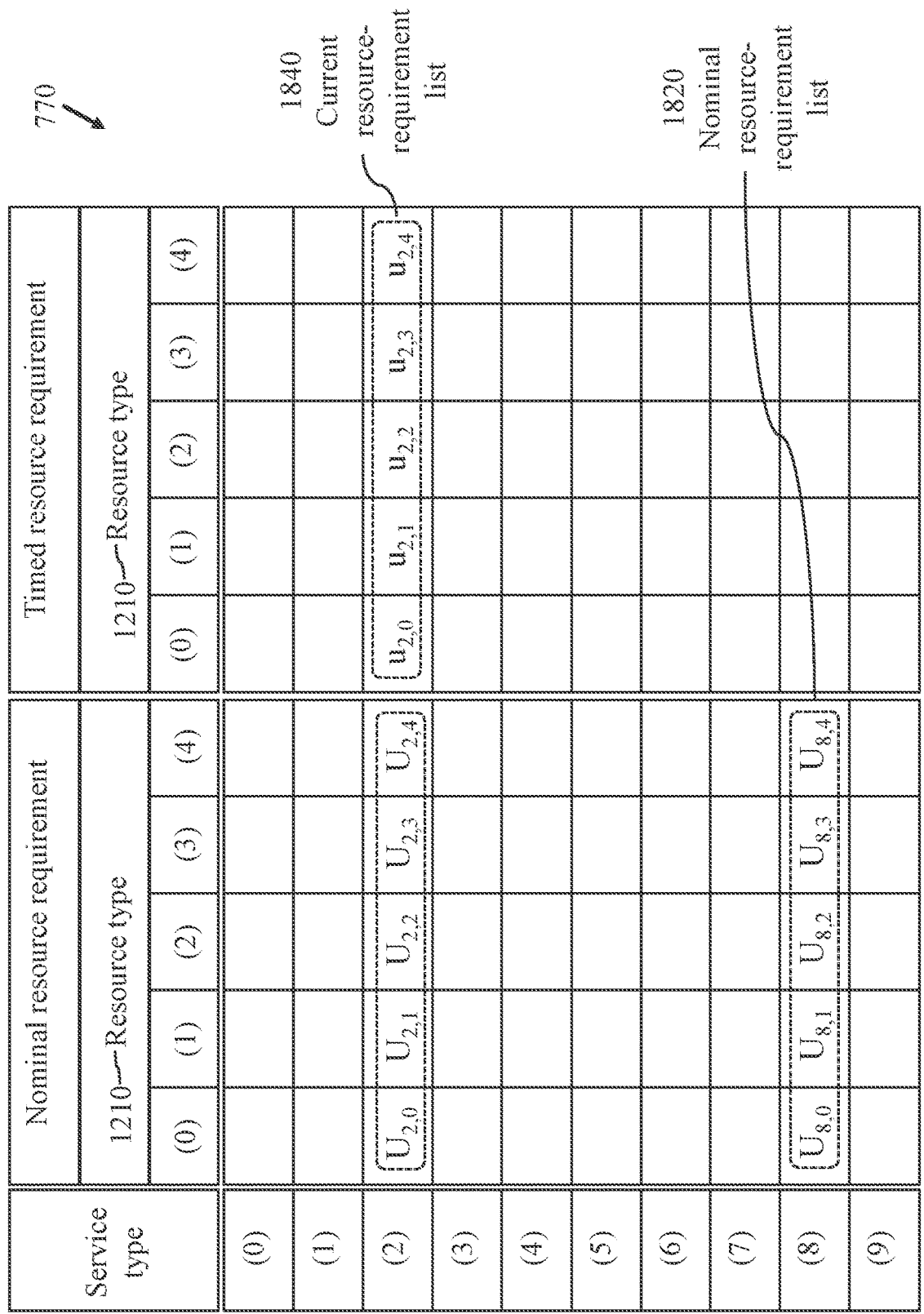
FIG. 18 illustrates organization of resource-requirement data for different service types, in accordance with an embodiment of the present invention.

FIG. 18 illustrates organization of resource-requirement data 770 (FIG. 7) for different service types for a specific client or a specific client group. For each service type, a list 1820 of nominal resource requirements and a list 1840 of current resource requirements are acquired.

Figure 19:
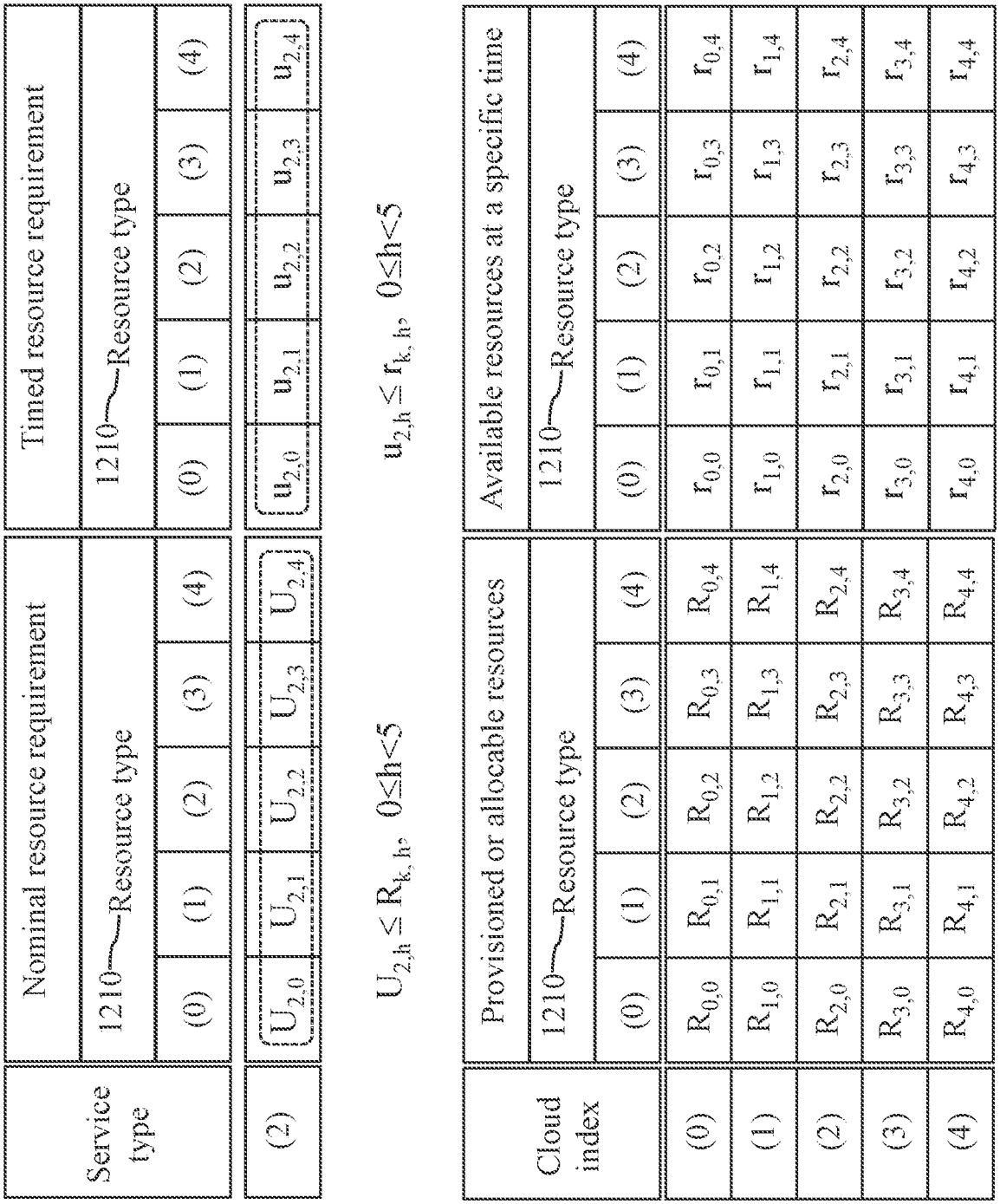
FIG. 19 illustrates data used for determining eligible clouds from among a target set of clouds.

FIG. 19 illustrates data 1900 used for determining eligible clouds from among a target set of five clouds indexed as (0) to (4), for a specific service. Resource requirement data 1820 and 1840 and resource-availability data 1220 and 1240 are compared to determine cloud compatibility for a specified service.

For a service type under consideration, the service type of index (2) for example, the nominal resource requirements are denoted $U_{2,h}$, $0 \le h < H$, and the current resource requirements are denoted $u_{2,h}$, $0 \le h < H$, the total number H of resource types being 5 in the example of FIG. 19.

As illustrated in FIG. 12, for each cloud k, $0 \le k < K$, K being the total number of clouds under consideration, potential allocable resources 1220, denoted $R_{k,h}$, $0 \le h < H$, as well as currently available resources 1240, denoted $r_{k,h}$, are maintained in storage medium 240.

To fulfil the current requirements, a cloud of index k is qualified as a candidate cloud for the requested service if $u_{2,h} \le r_{k,h}$, for each value of h.

To fulfil requirements relevant to some contractual agreements, a cloud is qualified if $U_{2,h} \le R_{k,h}$, for each value of h.

FIG. 20 illustrates organization 2000 of significance coefficients 2020 of cloud characteristics for each service type for a specific client or a specific client group into vectors 2040 of significant coefficients. Significance coefficients 2020 of cloud characteristics with respect to a specific service type for a specific client or a specific client group are determined a priori. The significance coefficient of a characteristic of index j for a service type of index s, $0 \le j < J$, $0 \le s < S$, J being the total number of cloud characteristics under consideration and S being the total number of service types, is denoted $\beta_{s,j}$. The significance coefficients are preferably organized into a matrix structure as illustrated in FIG. 20. A vector 2040 of significance coefficients with respect to a specific service type for a specific client is used in determining an overall merit (an overall appraisal) of individual clouds.

FIG. 21 illustrates a significance vector 2140 each element 2120 of which, denoted $\gamma_j$, represents a significance coefficient of a cloud characteristic of index j, $0 \le j < J$, J being the total number of cloud characteristics. The significance coefficient corresponds to a specific client, or a specific group of clients, and is independent of service type. Significance vector 2140 may be used instead of the service-type-specific significance vector 2040.

Figure 22:
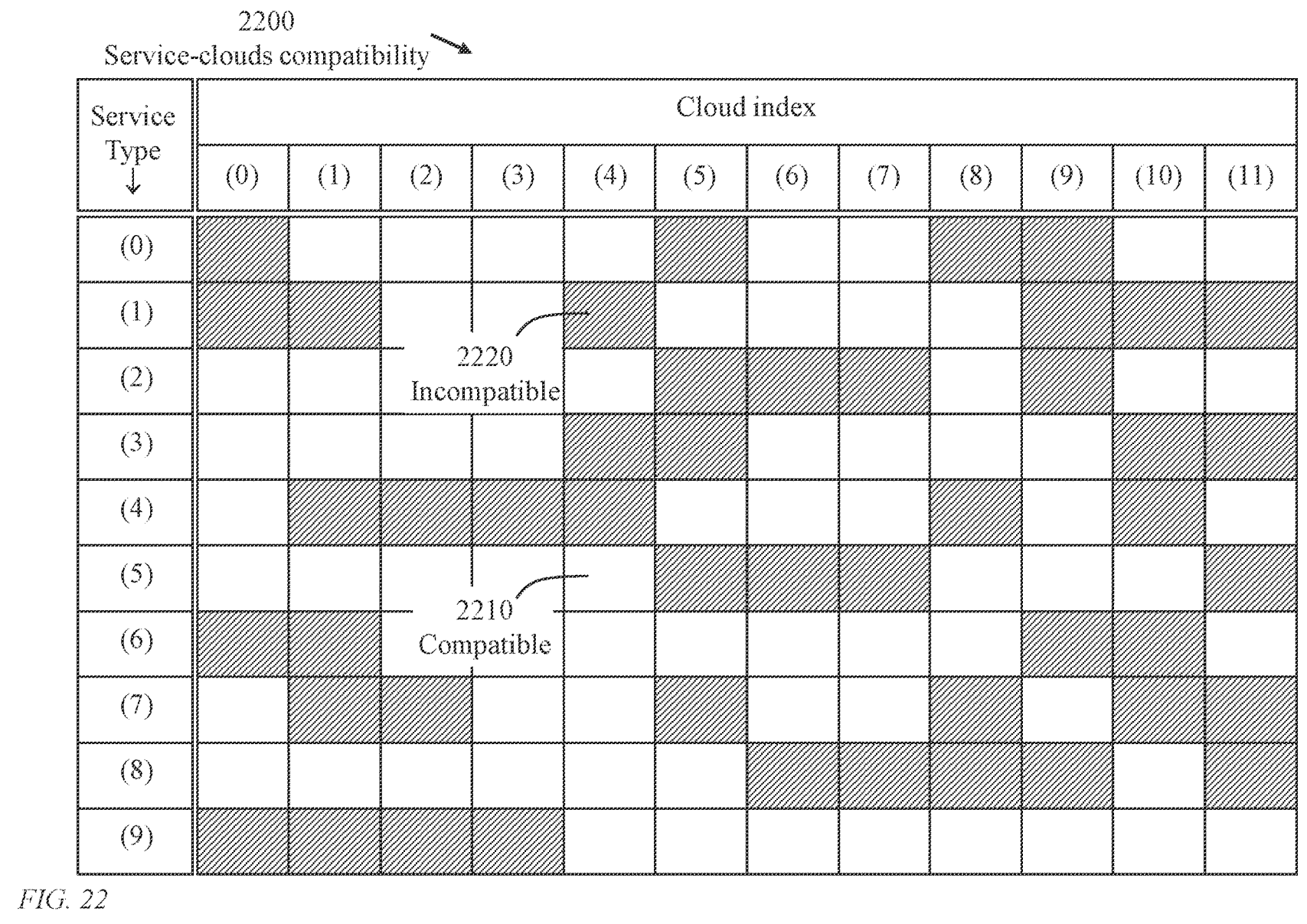

FIG. 22 illustrates a matrix 2200 representing cloud compatibility for each predefined service type. Compatibility of a cloud for a specific service is determined according to the process of FIG. 19. A compatible cloud 2210 for a specified service is a candidate for providing the specified. An incompatible cloud 2220 for the specified service is not considered for the specified service but may be selected for other services.

The merit vectors 1440 (FIG. 14) are based on intrinsic characteristics of individual clouds. However, the process of selecting a cloud for a specific client, may take into account the physical distance (hence the ensuing propagation delay) between the specific client and each of the candidate clouds.

FIG. 23 illustrates matrix 2300 of client-cloud distances (or propagation delays). With a number of clients (100 in the example of FIG. 23 indexed as 0 to 99) seeking cloud services through network 620 (FIG. 6), a cloud-selection module 260 may store distances (or propagation delays) from each registered client to each cloud of the plurality 112 of clouds as indicated in the matrix of FIG. 23. A column of the matrix corresponding to a client index 2310 stores distances 2320 $S_{g,k}$ (one way or round trip) to each cloud site $0 \le g < G$, $0 \le k < K$, G being the number of clients (100 in the example of FIG. 23) and K being the number of clouds (12 in the example of FIG. 23). Although FIG. 23 illustrates one row of the matrix for each cloud, a specific cloud (belonging to a specific provider) may have multiple geographically distributed access sites) for which the distances to a client may be stored.

The entries of matrix 2300 may be determined from known longitude-latitude coordinates of client premises and cloud premises. However, it may be feasible to acquire round-trip propagation delays between a client and each cloud site.

To take the distances (or propagation delays) into account, the distance (or propagation delay) may be canonicalized to determine respective merit values and a predetermined fraction of the distance merit (propagation-delay merit) may be added to the dot product of respective merit vector 1440 (FIG. 14) and significance vectors 2040 (FIG. 20) for the purpose of selecting a preferred cloud. The distance (or propagation delay) is a type-2 characteristic and would be canonicalized as such.

Figure 24:
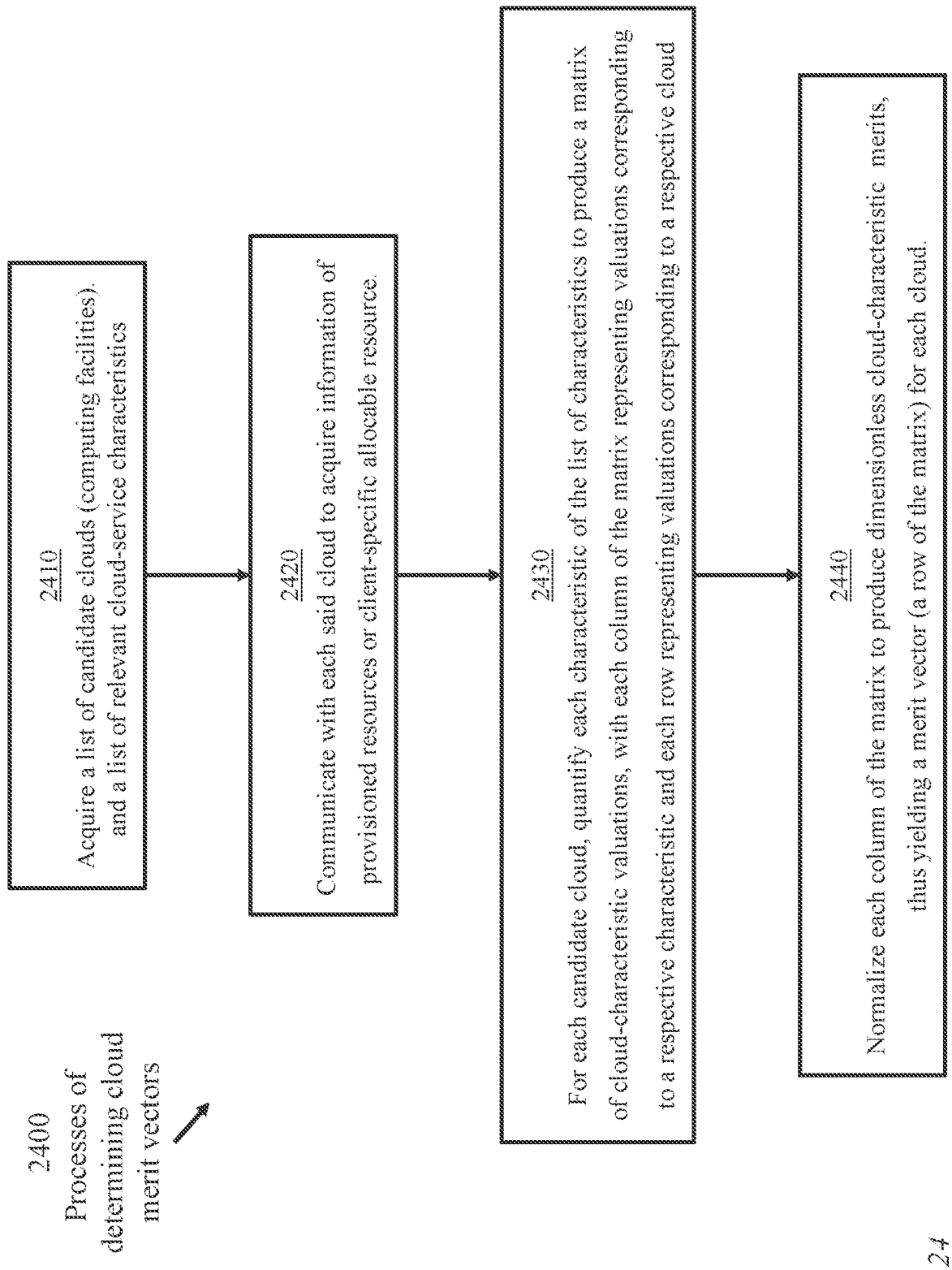
FIG. 24 illustrates processes of determining cloud merit vectors, in accordance with an embodiment of the present invention.

FIG. 24 illustrates processes 2400 of determining cloud merit vectors implemented at cloud-observation module 220 (FIG. 2, FIG. 4). A hardware processor of module 220 acquires a list of clouds 120 of the plurality 112 of clouds and a list of relevant cloud characteristics (process 2410). At least one hardware processor of module 220 communicates with individual clouds to acquire information of provisioned resources, client-specific allocable resources, and current resource availability (process 2420).

In process 2430, the at least one hardware processor quantifies, for each cloud 120 each characteristic of the list of relevant cloud characteristics to produce a characteristic valuation for each cloud-characteristic pair. The valuations are organized into a respective data structure. For ease of illustration, the characteristics valuations are organized into a matrix structure (FIG. 13) with each column of the matrix representing valuations corresponding to a respective characteristic and each row representing valuations corresponding to a respective cloud.

In process 2440, the at least one hardware processor, canonicalizes each column of the matrix to produce dimensionless cloud-characteristics merits. In accordance with an embodiment, each merit is bounded within a predefined dimensionless interval; preferable the interval [0.0, 1.0]. As described above, with reference to FIG. 4, merits corresponding to different characteristics may be defined to either consistently trend towards a sought optimum value as the magnitude of a merit increases or consistently trend towards a sought optimum as the magnitude of a merit decreases.

Figure 25:
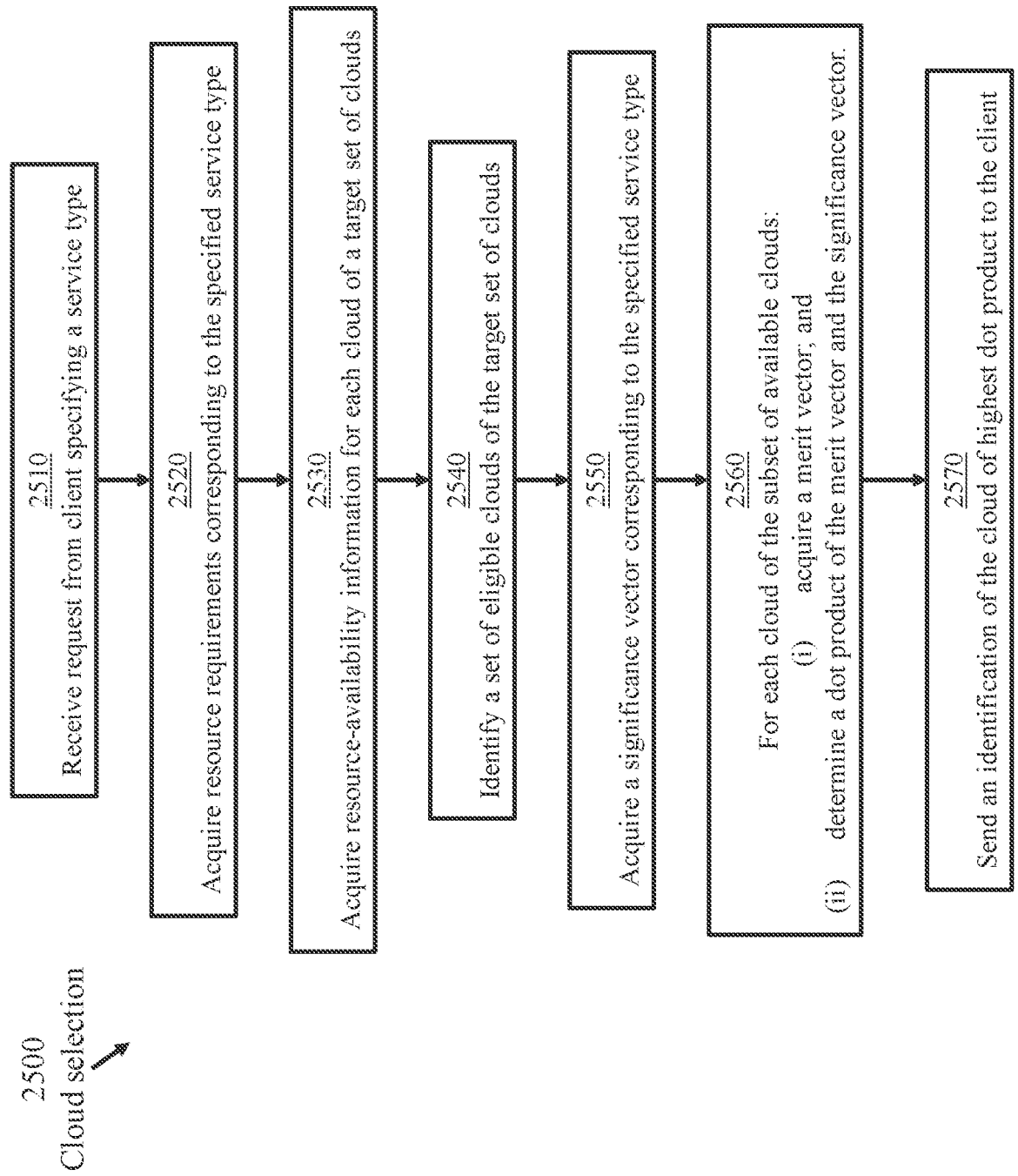
FIG. 25 illustrates processes of cloud selection.

FIG. 25 illustrates cloud-selection processes 2500 implemented a cloud-recommendation module 260 (FIG. 2, FIG. 5). At least one hardware processor executes software instructions configured to perform processes 2510 to 2570.

Process 2510 receives a service request from a client 110, the request specifies a service type of a list of predefined service types.

Process 2520 acquires resource requirements corresponding to the requested service.

Process 2530 acquires data indicating resource availability for each cloud 120 of the plurality 112 of clouds. The data would be retrieved from storage medium 240 which maintains time-varying resource availability data for each cloud 120 of the plurality 112 of clouds.

Process 2540 identifies a set of eligible clouds of the plurality 112 of clouds, where each eligible cloud has sufficient free resources to handle the requested service.

Process 2550 acquires a significance vector corresponding to the specified service.

Process 2560 determines a dot product of the significance vector and a merit vector of each eligible cloud. The merit vectors may be read from storage medium 240.

Process 2570 recommends the eligible cloud corresponding to the highest dot product to the client.

A merit of a cloud k with respect to a cloud characteristic j is denoted $\alpha_{k,j}$. A significance coefficient of a characteristic of index j for a service type of index s, $0 \le j < J$, $0 \le s < S$, is denoted $\beta_{s,j}$. K being the total number of clouds 120 of the plurality of clouds 120, J being the total number of cloud characteristics under consideration, and S being the total number of service types, A merit vector of a cloud k comprises elements:

$$\{\alpha_{k,0}, \alpha_{k,1}, \alpha_{k,2}, \ldots \alpha_{k,J-2}, \alpha_{k,J-1}\}.$$

A significance vector of a service s (for a specific client or a specific client group) comprises elements:

$$\{\beta_{k,0}, \alpha_{k,1}, \alpha_{k,2}, \ldots \alpha_{k,J-2}, \alpha_{k,J-1}\}.$$

The dot product of a merit vector of a cloud k and a significance vector of a service s, i.e., the appraisal of candidate cloud k for a service s is determined as:

$$\alpha_{k,0} \times \beta_{s,0} + \alpha_{k,1} \times \beta_{s,1} + \alpha_{k,2} \times \beta_{s,2} \ldots + \alpha_{k,J-2} \times \beta_{s,J-2} + \alpha_{k,J-1} \times \beta_{s,J-1}.$$

A service may comprise multiple components that may be directed to a single cloud or more than one cloud. Upon receiving a request for service, the placement engine may identify all clouds that can handle the requirements of the multiple components together and select a cloud of highest merit. Alternatively, the placement engine may treat the components separately and identify for each component specific clouds that can handle respective requirements and select a cloud of highest merit. Thus, the components may be treated as separate services except in the case of temporal constraints where activation of the component has to take place concurrently or within a specified time window. In this case, after ensuring concurrent availability of resources in multiple clouds, the differing propagation delays between the client's device and the individual clouds as well as the differing queueing delays at the clouds may have to be taken into consideration.

Selecting a cloud for a specific task entails identifying a number of eligible clouds for the specific task then determining merits of individual eligible clouds.

Figure 26:
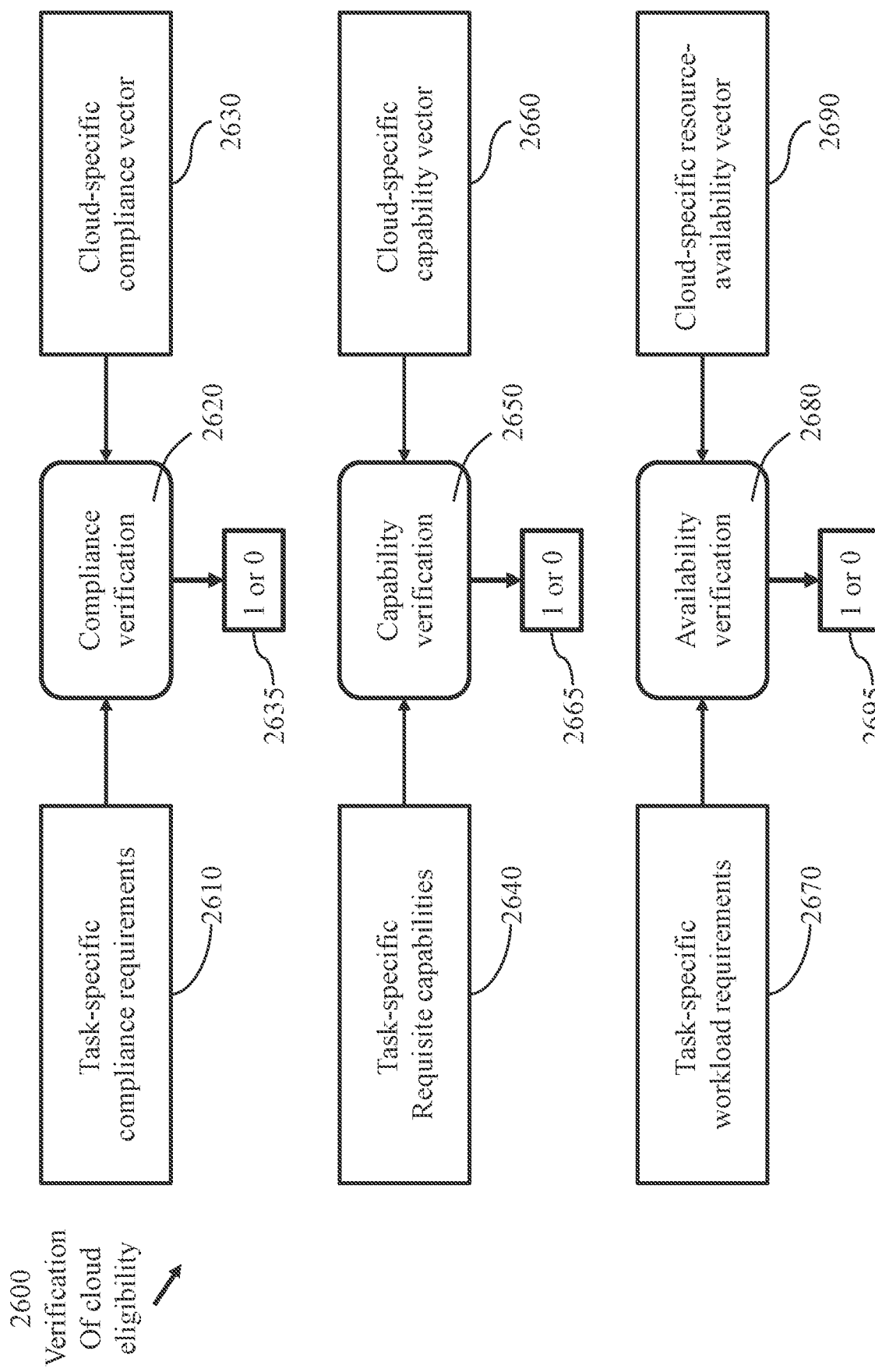
FIG. 26 illustrates conditions for eligibility of a cloud for a specific task, in accordance with an embodiment of the present invention.

FIG. 26 illustrates conditions for eligibility of a cloud for a specific task. Eligibility of a cloud for task placement is determined according to specific criteria 2600 which include compliance with relevant standards, capability, and resource availability.

With respect to compliance, a compliance vector 2630 associated with each cloud 120 indicates the cloud's compliance, or otherwise, with each service standard of a predefined list of standards. To be considered a candidate for placement of a task, a cloud is required to be compliant with specific standards applicable to the task based on task-specific compliance requirements 2610.

With respect to capability, a capability vector 2660 associated with each cloud 120 indicates the cloud's support, or otherwise, of a predefined list of features. A cloud may be considered a candidate for placement of a task if the cloud supports specific features applicable to the task based on task-specific requisite capabilities 2640

With respect to availability, a resource-availability vector 2690 associated with each cloud 120 indicates projected availability of requisite resources over a predefined scheduling period. A cloud may be considered a candidate for placement of a task if the projected available resources satisfy workload requirements 2670 at a specified task-placement instant of time.

Process 2620 of compliance verification determines whether a cloud satisfies all of the compliance requirements 2610 with an outcome 2635 of "1" if all compliance requirements are met or "0" if any of the compliance requirements is not met.

Process 2650 of capability verification determines whether a cloud supports all of the features applicable to the task with an outcome 2665 of "1" if all applicable features are supported or "0" if any of the applicable features is not supported.

Process 2680 of verification
2695: Outcome of resource-availability verification Process 2680 of resource-availability verification determines whether a cloud's projected available resources satisfy all of the workload requirements with an outcome 2695 of "1" or "0", respectively indicating availability or otherwise.

A cloud is considered eligible to handle a task under consideration only if all outcomes 2635, 2665, and 2695 are in the affirmative.

Figure 27:
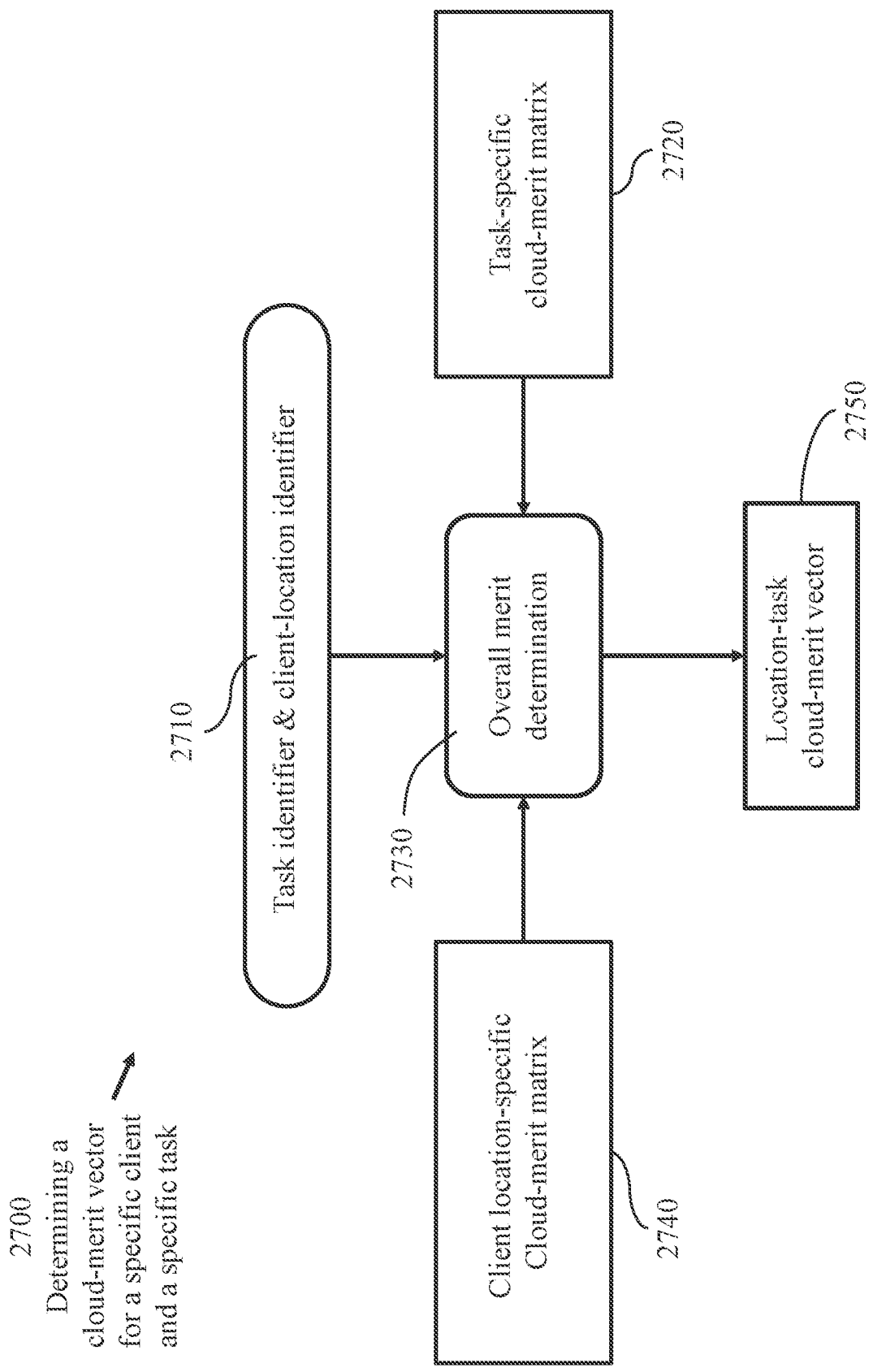
FIG. 27 illustrates determining task-specific overall merits of a plurality of clouds, in accordance with an embodiment of the present invention.

FIG. 27 illustrates a process 2700 of determining a cloud-merit vector indicating the overall merits of a plurality of clouds for a specific task and a specific client. An overall merit determination module 2730 uses a predetermined task-based cloud-merit-matrix 2720 (FIG. 28) and a predetermined location-based cloud-merit-matrix 2740 (FIG. 29) to determine a cloud-merit vector 2750 which quantifies a merit of each cloud vis-à-vis an identified specific task for a specific client (input 2710).

FIG. 28 illustrates an exemplary task-based cloud-merit matrix for a placement system of K clouds supporting placement of any of Q tasks, K>1, Q>1. Each column of the matrix corresponds to a cloud index 2810 and each row corresponds to a task index 2820. The matrix indicates for each task-cloud pair {q, c} a respective merit 2830, denoted $\Gamma_{q,c}$, where q is a task index and c is a cloud index, $0 \leq q < Q$, $0 \leq c < K$. The merit $\Gamma_{q,c}$ is determined based on a significance vector of task "c" and a characteristics vector of cloud "c".

FIG. 29 illustrates an exemplary client-location-based cloud-merit matrix for a placement system of K clouds supporting placement for any of P client locations, K>1, P>1. Each column of the client-location-matrix corresponds to a cloud index 2810 and each row corresponds to a location index 2920. The matrix indicates for each location-cloud pair {q, c} a respective location-cloud merit 2930, denoted $\Lambda_{p,c}$, where p is a client index and c is a cloud index, $0 \leq p < P$, $0 \leq c < K$. The merit $\Lambda_{p,c}$ is determined based on a distance vector of client-location "p" representing a distance of a cloud location to each cloud.

With h denoting a distance of a specific client location of index p to a cloud of index c, $h_{min}$ denoting the distance from the client location to the nearest cloud, and $h_{max}$ denoting the distance from the cloud location to the furthest cloud, the canonicalized location-cloud merit is determined as:

$$\Lambda p, c(h_{max}-h)/(h_{max}-h_{min}).$$

The table below illustrates exemplary location-cloud merits for a client location of index p.

| Cloud index "c" | (0) | (1) | (2) | (3) | (4) | (5) | (6) | (7) | (8) |
|---|---|---|---|---|---|---|---|---|---|
| Distance "h" to cloud (arbitrary units) | 816 | 106 | 90 | 1000 | 2006 | 200 | 6 | 1696 | 520 |
| Distance-based cloud merit $\Lambda p, c$ | 0.595 | 0.950 | 0.958 | 0.503 | 0.0 | 0.903 | 1.0 | 0.155 | 0.743 |

Figure 30:
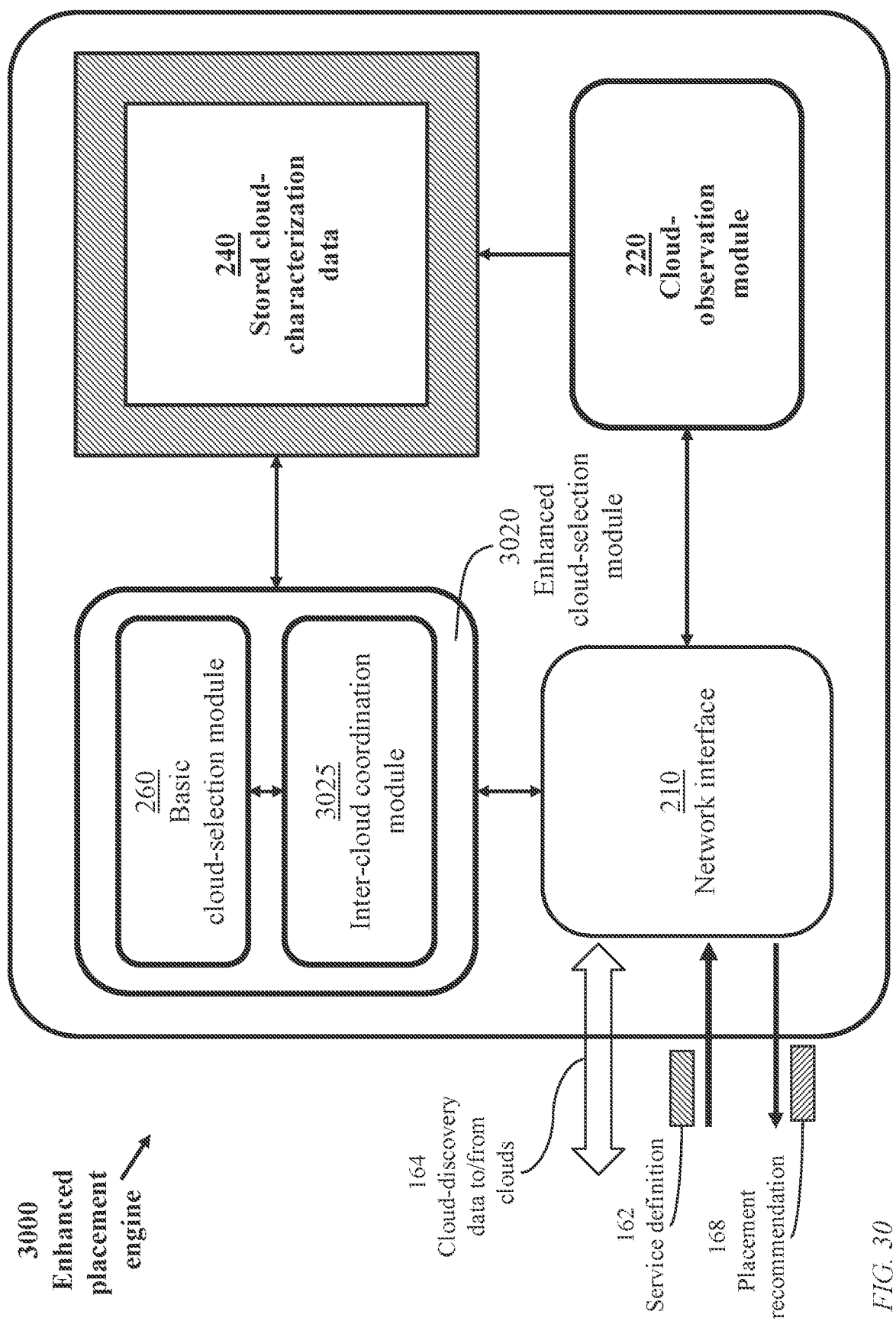
FIG. 30 illustrates an enhanced service-placement engine comprising an inter-cloud coordination module, in accordance with an embodiment of the present invention.

FIG. 30 illustrates an enhanced service-placement engine 3000 similar to the basic service-placement engine 160 of FIG. 2 with the basic cloud-selection module 260 complemented with an inter-cloud coordination module 3025 to form an enhanced cloud-selection module 3020. The inter-cloud coordination module performs processes related to implementation of service tasks using multiple clouds as described below with reference to FIG. 32 to FIG. 46

Figure 31:
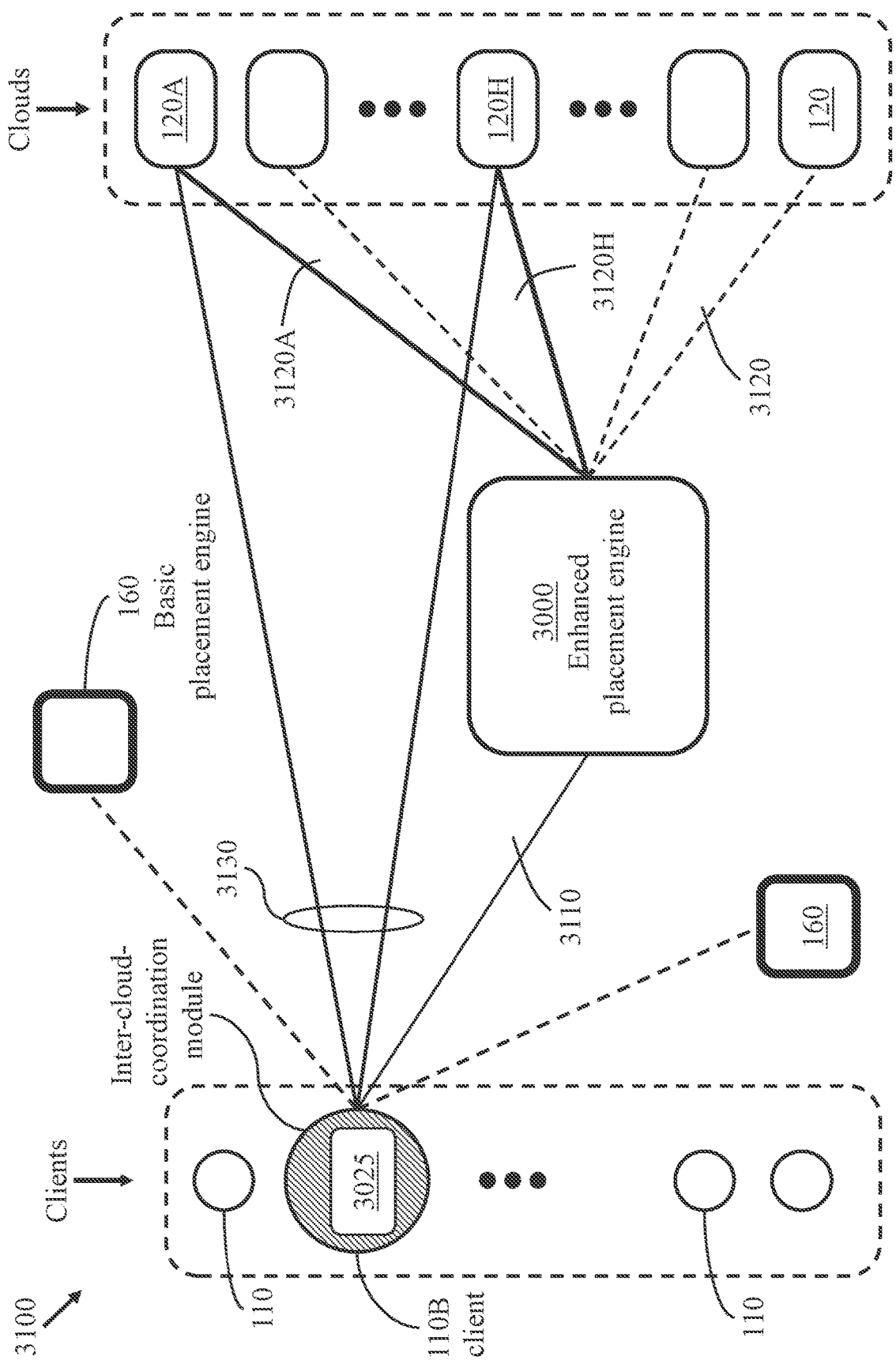
FIG. 31 illustrates deployment of the enhanced service-placement engine.

FIG. 31 illustrates a service-placement system 3100 employing an enhanced placement engine 3000 in addition to basic placement engines. Optionally, the inter-cloud coordination module 3025 may also be installed in a client device to perform some of the functions of inter-cloud coordination as is the case for client 110B. The enhanced placement engine 3000 exchanges control data with a client 110 through a path 3110 and exchanges control data with multiple clouds through paths 3120. A client device exchanges both control data and content data with selected clouds through paths 3130. Any of the paths 3110, 3120, or 3130 may be a dedicated path or a switched path established through a network.

Figure 32:
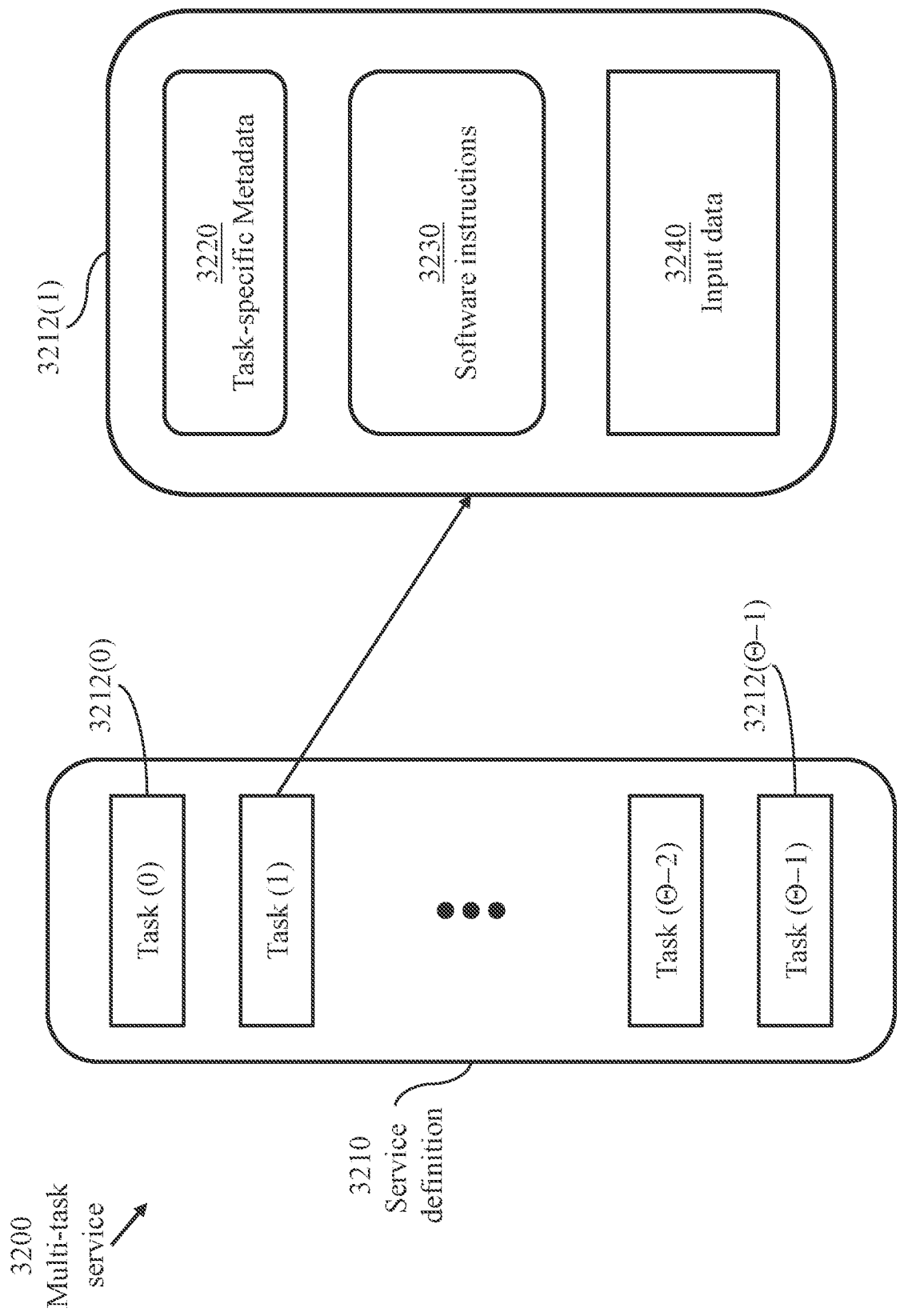
FIG. 32 illustrates a service requiring implementation of multiple tasks and an exemplary description of a task.

FIG. 32 illustrates a service 3200 requiring implementation of multiple tasks. An enhanced placement engine 3000 receives a service definition 3210 from a client specifying a number Θ of tasks 3212 which may be selected from the global set of Q tasks (FIG. 28). A task may be expressed in terms of metadata 3220, software instructions 3230, and input data 3240 as illustrated in the exemplary description of task 3213(1). Other forms of defining a task may be based on standardized task descriptions with respective standardized templates.

Figure 33:
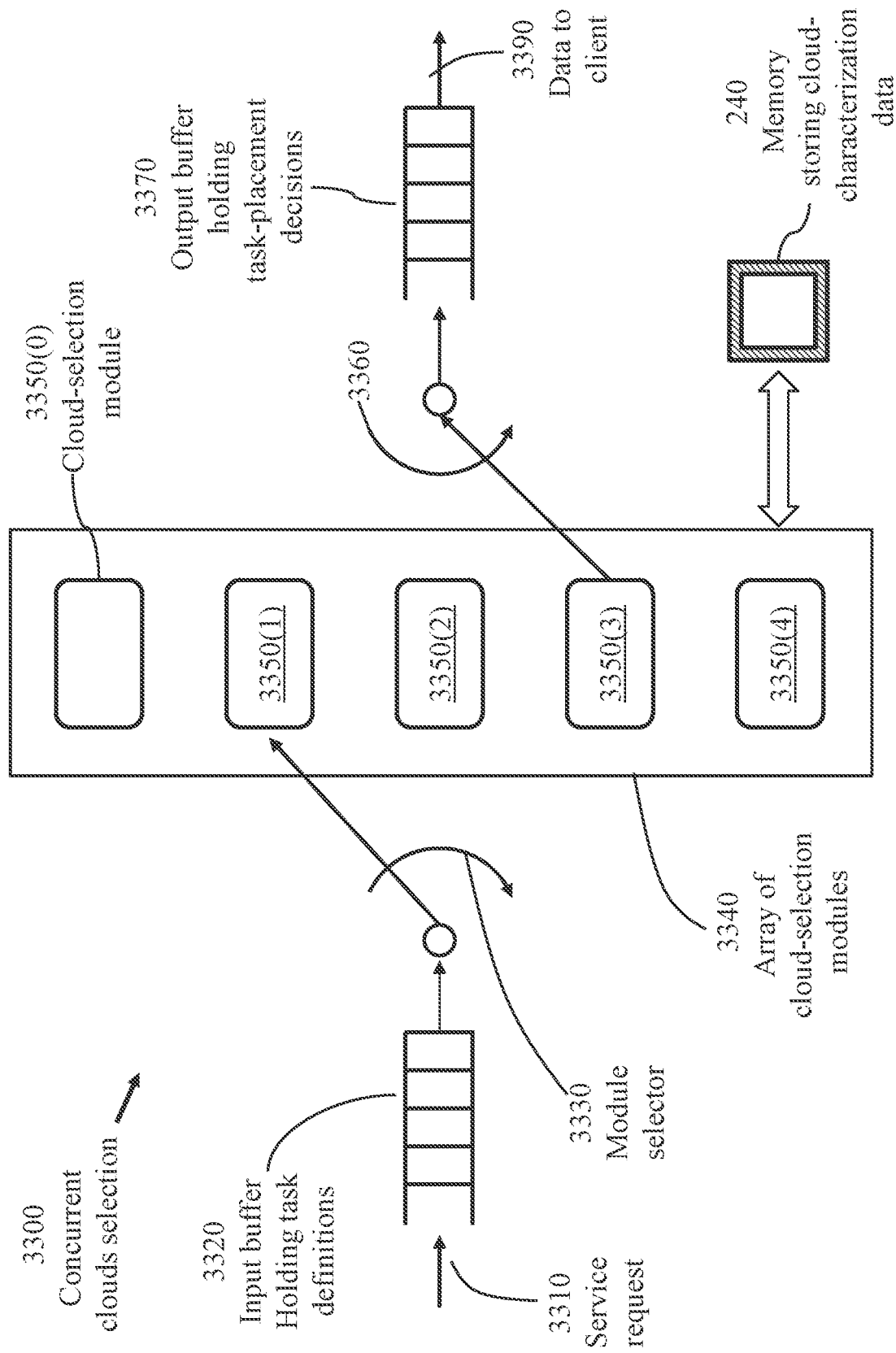
FIG. 33 illustrates use of multiple basic and enhanced cloud-selection modules for realizing a high throughput of a placement engine, in accordance with an embodiment of the present invention.

FIG. 33 illustrates a scheme 3300 of using an array 3340 of cloud-selection modules 3350 for concurrent cloud selection to realize a high throughput of an enhanced placement engine. All cloud-selection modules 3350 are communicatively coupled to a storage medium 240 holding cloud-characterization data. The cloud-selection modules 3350 may include basic cloud-selection modules 260 and enhanced cloud-selection modules 3020. Service requests 3310 are directed to an input buffer 3320 which holds definitions of individual tasks of each requested service.

A distributor 3330 directs individual tasks to cloud-selection modules 3350 according to a scheme of realizing load balancing. An Output selector 3360 directs task-placement decisions to an output buffer 3370. The output-buffer contents are directed to respective clients either directly or after further processing.

Figure 34:
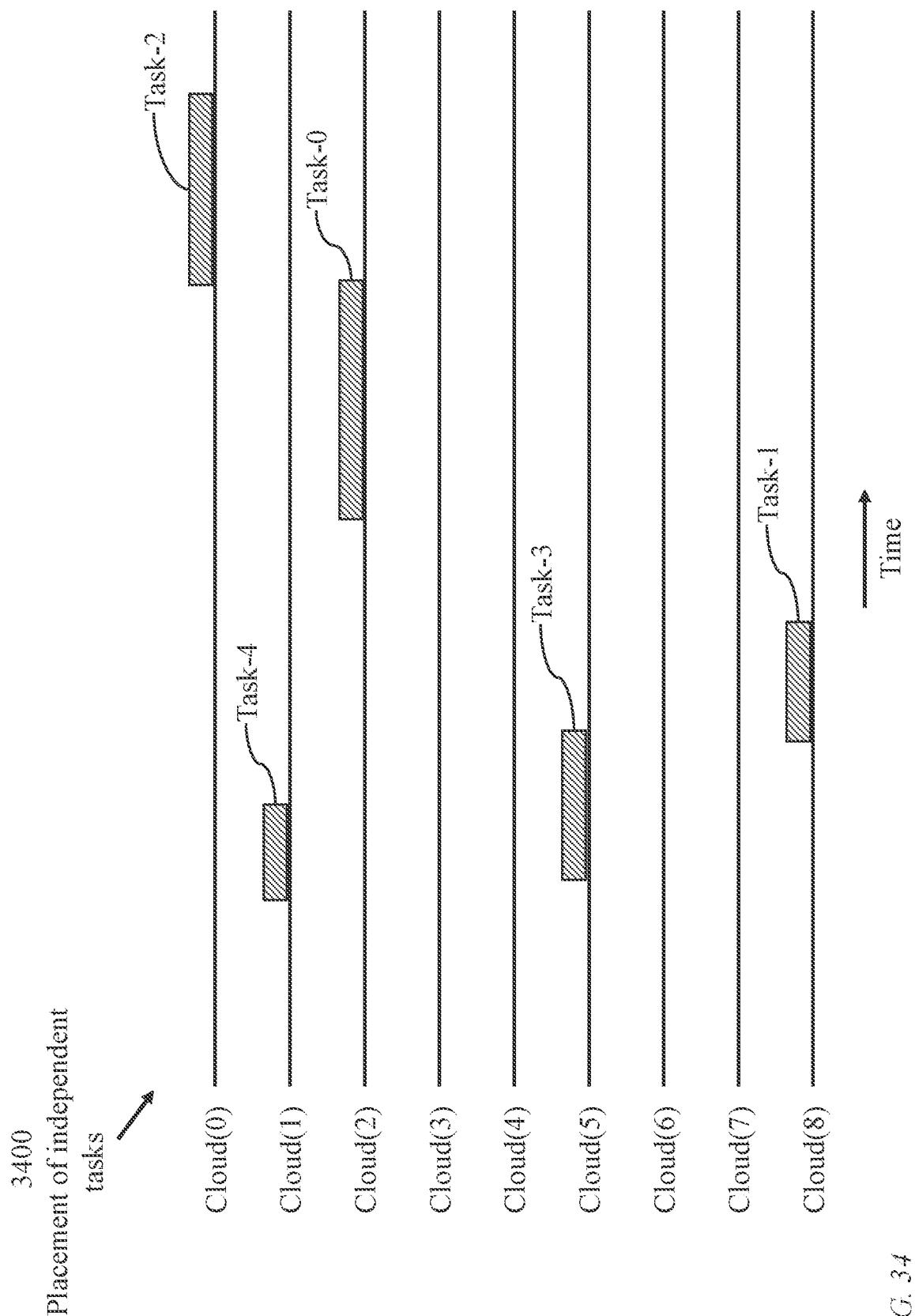
FIG. 34 illustrates placement of a service specifying multiple independent tasks.

FIG. 34 illustrates a schedule 3400 for placement of a service specifying multiple independent tasks, labeled task (0) to task (4), in a service-placement system of nine clouds labeled cloud (0) to cloud (8). The tasks are independent of each other. Thus, the placement engine separately seeks for each task an eligible cloud of highest merit. The tasks of indices 0 to 4 are assigned to the clouds of indices 2, 8, 0, 5, and 1 during the time intervals indicated.

Figure 35:
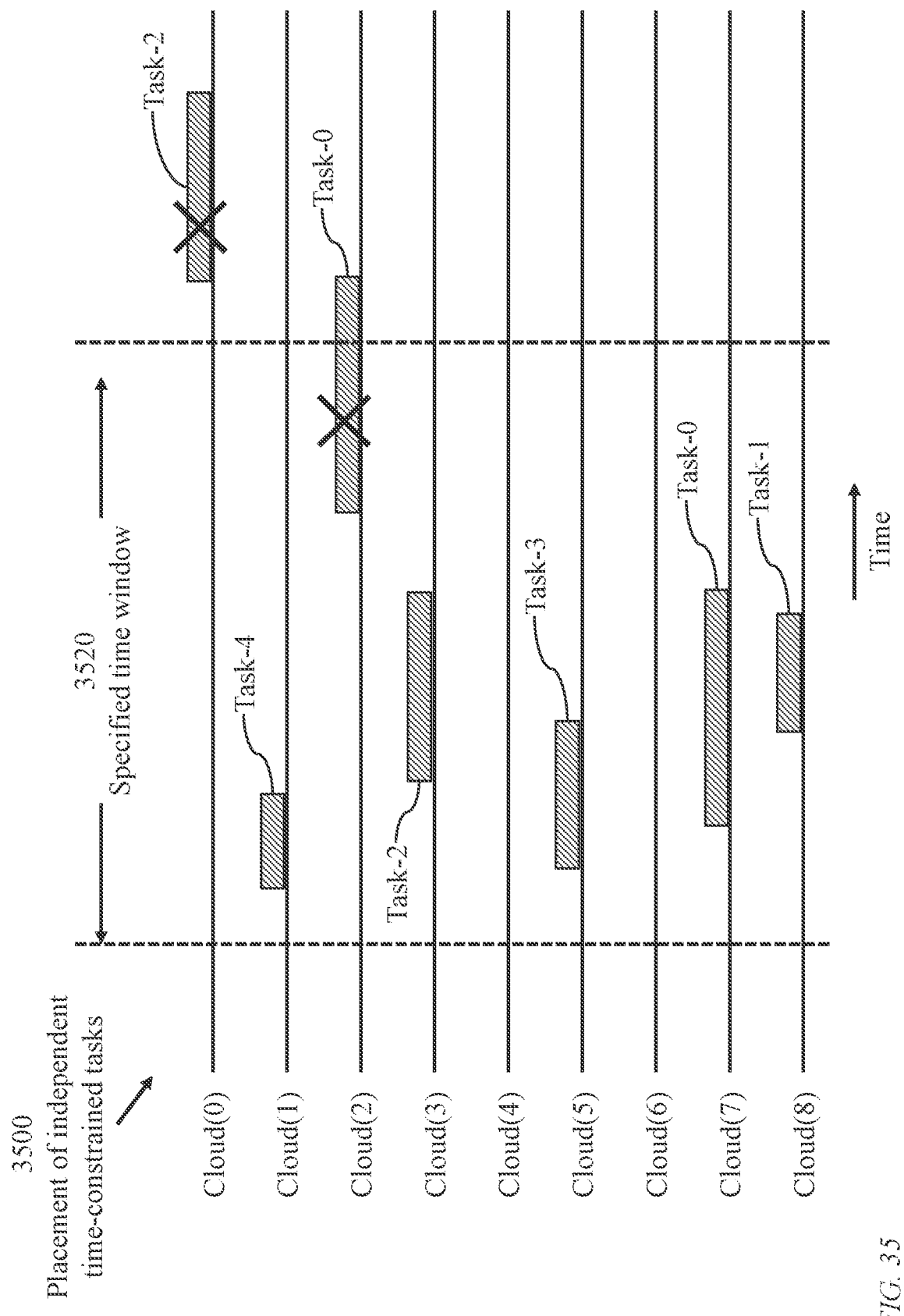
FIG. 35 illustrates placement of a service specifying multiple independent tasks under temporal constraints, in accordance with an embodiment of the present invention.

FIG. 35 illustrates a schedule 3500 for placement of a service specifying the same independent tasks of FIG. 34, in the same service-placement system. However, the service is to be completed within a specified time window 3520. The placement engine separately seeks for each task an eligible cloud of highest merit provided the task is completed within the time window 3520. The tasks of indices 0, 1, and 3 are optimally assigned to the clouds of indices 7, 8, and 5, respectively, as in the case of FIG. 34 since the allocated time slots are within the time window.

An unconstrained Task (0) would be optimally assigned to cloud (2). However, the available time interval crosses a boundary of the time window. The time constrained Task (0) is optimally assigned to cloud (7) within the time window. Likewise, an unconstrained Task (2) would be optimally assigned to cloud (0). However, the available time interval is outside the time window. The time constrained Task (2) is optimally assigned to cloud (3) within the time window. The changes of task allocations due to the temporal constraint are indicated in FIG. 35. Tasks (0) to (4) are therefore assigned to the clouds of indices 7, 8, 3, 5, and 1 during the time intervals indicated.

Figure 36:
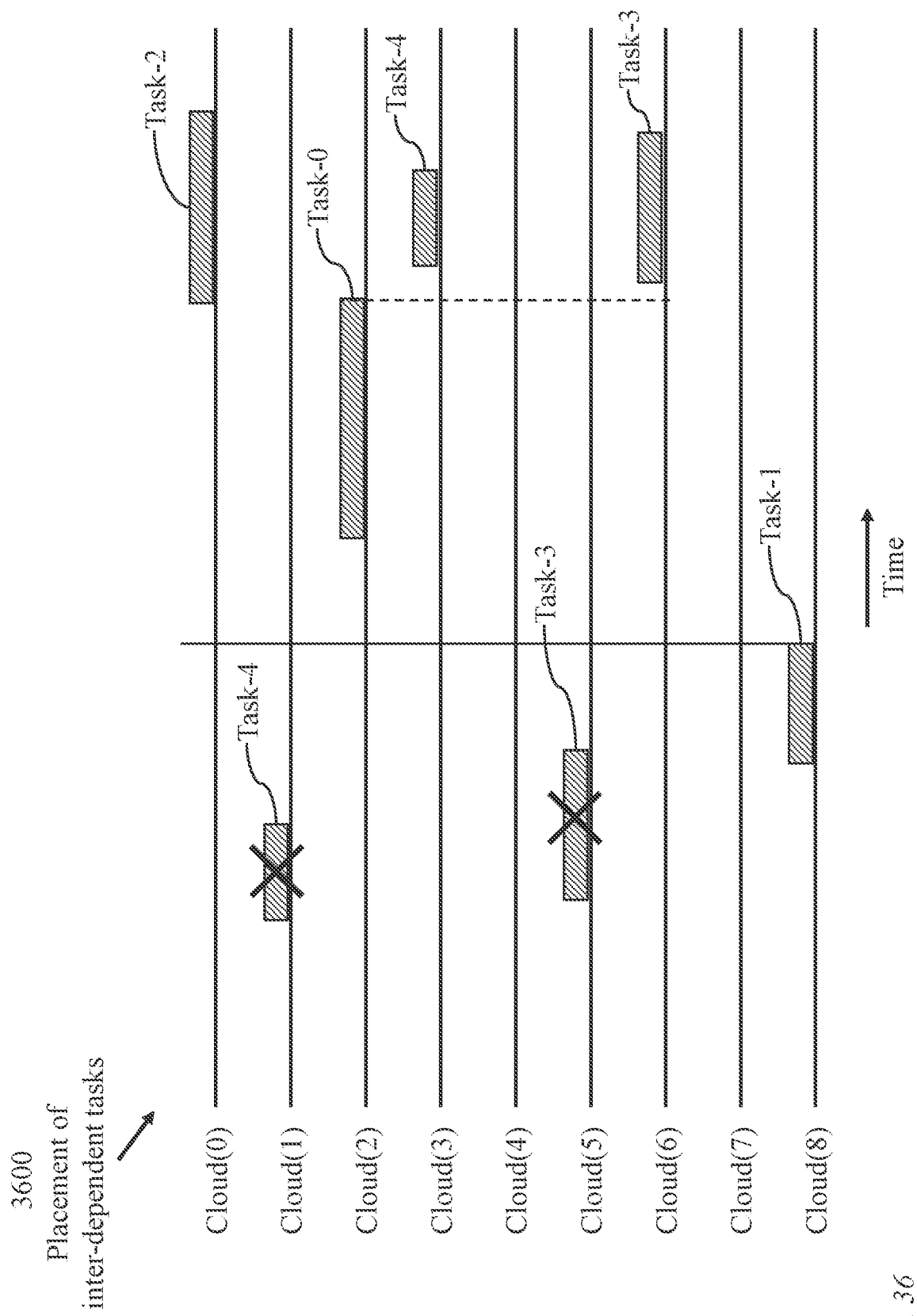
FIG. 36 illustrates placement of a service specifying multiple interdependent tasks, in accordance with an embodiment of the present invention.

FIG. 36 illustrates a schedule 3600 for placement of a service specifying the same independent tasks of FIG. 34, in the same service-placement system. However, the tasks are interdependent where Task (0) depends on Task (1), Task (2) depends on Task (1), Task (3) depends on Task (0), and Task (4) depends on Task (0). The placement engine seeks an eligible cloud of highest merit for task (1), which is the only independent (free) task. As in the case of FIG. 34, task (1) is optimally assigned to cloud (8) during the same time interval. Since Task (1) is allocated, both task (0) and task (2), which depend on an outcome of task (1) become ready for allocation. The tasks of indices 0 and 2, if unconstrained, would be optimally assigned to the clouds of indices 2 and 0, respectively, as in the case of FIG. 34, within the indicated time intervals. Coincidentally, the time intervals follow the time interval allocated to task (1). Hence, the allocations of task (1), task (0), and task (2) remain unchanged from the unconstrained-allocation case.

Both task (3) and task (4) depend on an outcome of task (0). An independent task (3) would be optimally assigned to cloud (5). However, the available time interval begins before the completion time of task (0). Likewise, an independent task (3) would be optimally assigned to cloud (1). However, the available time interval begins before the completion time of task (0). In the example of FIG. 36, the optimal allocation of task (3) that follows the completion of task (0) is in cloud (6) and the optimal allocation of task (4) that follows the completion of task (0) is in cloud (3). The changes of task allocations due to the interdependence of tasks are indicated in FIG. 36. Tasks (0) to (4) are therefore assigned to the clouds of indices 2, 8, 0, 6, and 3.

Figure 37:
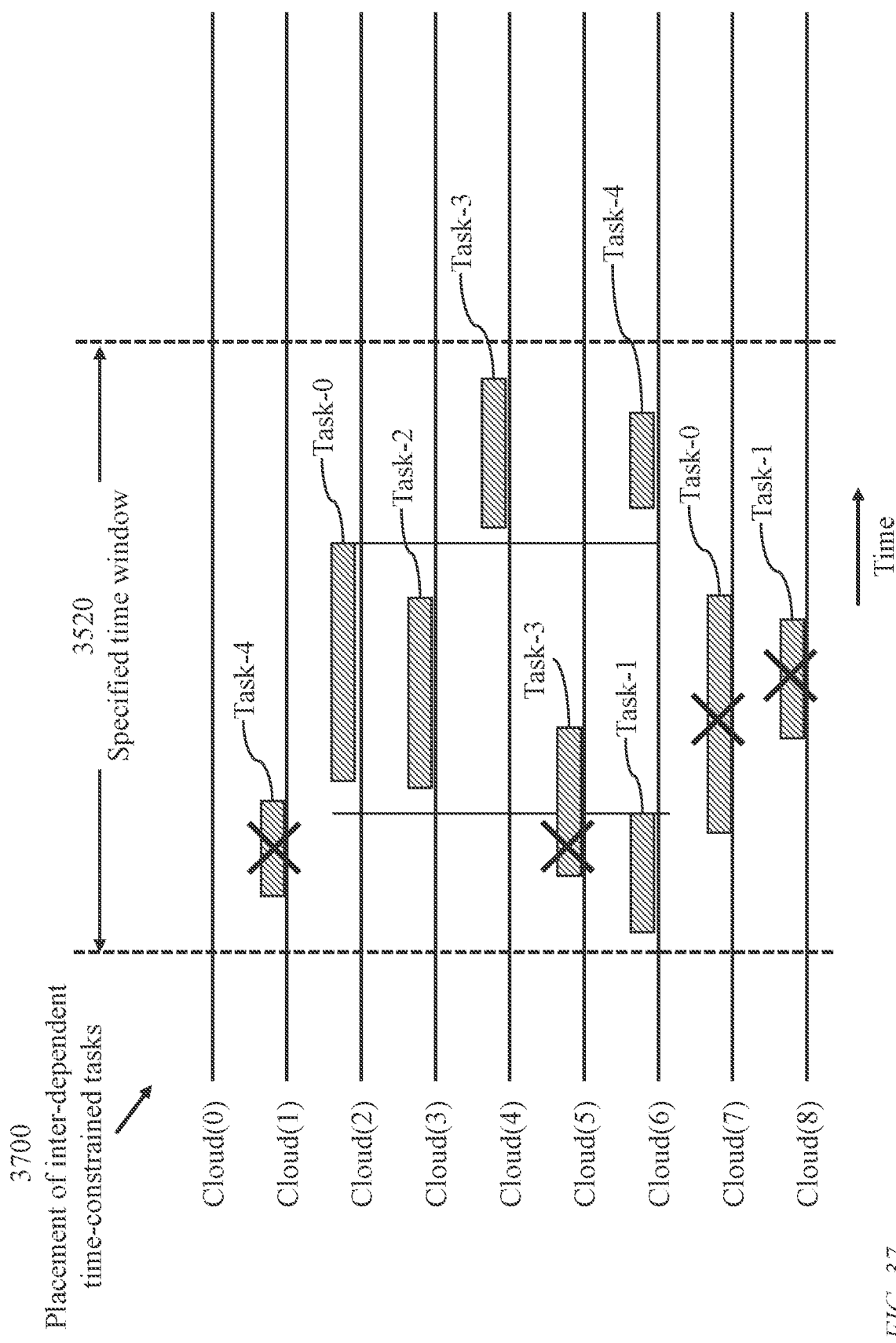
FIG. 37 illustrates placement of a service specifying multiple interdependent tasks under temporal constraints, in accordance with an embodiment of the present invention.

FIG. 37 illustrates a schedule 3700 for placement of a service specifying the same independent tasks of FIG. 34, in the same service-placement system. However, the tasks are interdependent where task (0) depends on Task (1), task (2) depends on task (1), task (3) depends on task (0), and task (4) depends on Task (0). Additionally, the entire service is to be completed within the specified time window 3520.

Comparing with the schedule of FIG. 35 where the service is completed within the specified time window 3520, it is seen that task (0), task (2), task (3) and task (4) start before the completion of task (1) which would be unrealizable under the specified tasks interdependence. To enable completion of all tasks within the time window 3520 under the interdependence constraints, the unconstrained task (1) is performed as close to the start of the time window as possible. In the example of FIG. 37, cloud (6) offered the earliest scheduling time within the time window 3520. Task (0), task (2), task (3), and task (4) are then assigned to cloud (2), cloud (3), cloud (4), and cloud (6), respectively to be implemented within the time window.

Figure 38:
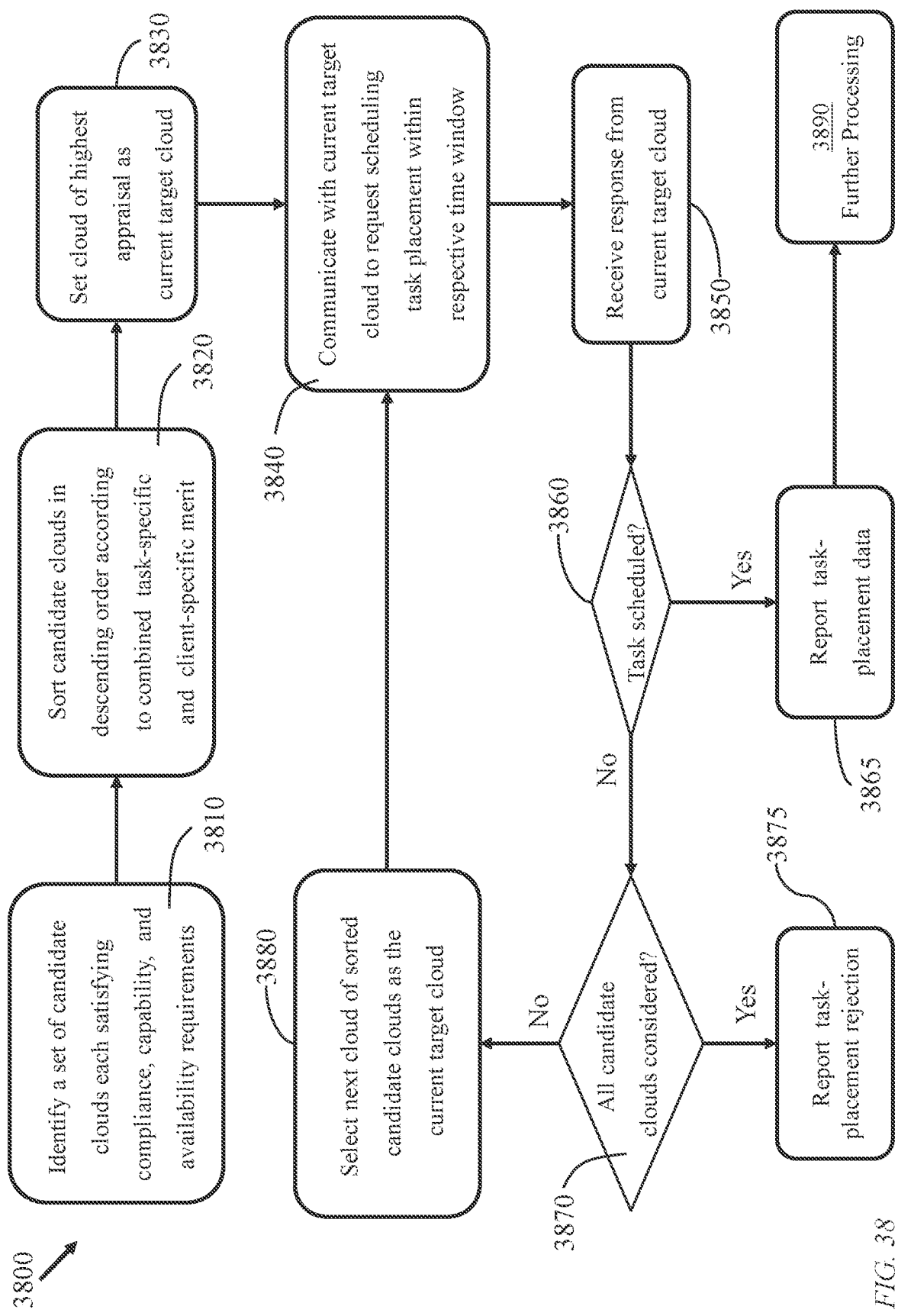
FIG. 38 illustrates selecting a cloud for placement of a specific task under temporal constraints, in accordance with an embodiment of the present invention.

FIG. 38 illustrates a method 3800 of selecting a cloud for placement of a specific task under temporal constraints. To start, process 3810 identifies a set of eligible clouds each of which satisfying compliance requirements, capability requirements, and resource-availability at the designated time for the specific task as described above with reference to FIG. 26.

Process 3820 sorts the eligible clouds in descending order according to overall cloud merit. The overall cloud merit combines the task-specific cloud merit (FIG. 28) and client-location-specific cloud merit (FIG. 29). Process 3830 selects an initial target cloud as the cloud of highest overall merit.

Process 3840 communicates with the target cloud to request task placement. Process 3850 receives a response from the target cloud indicating assignment, or otherwise, of the task. If the task is assigned, process 3860 activates process 3865 which reports relevant task-placement data to the client. Process 3890 then performs further processes such as updating dependency data). If the task is not assigned and all eligible clouds have been considered, process 3875 reports task-placement rejection. Otherwise, process 3860 activates process 3870 which activates process 3880 to select another eligible cloud and revisit process 3840.

Figure 39:
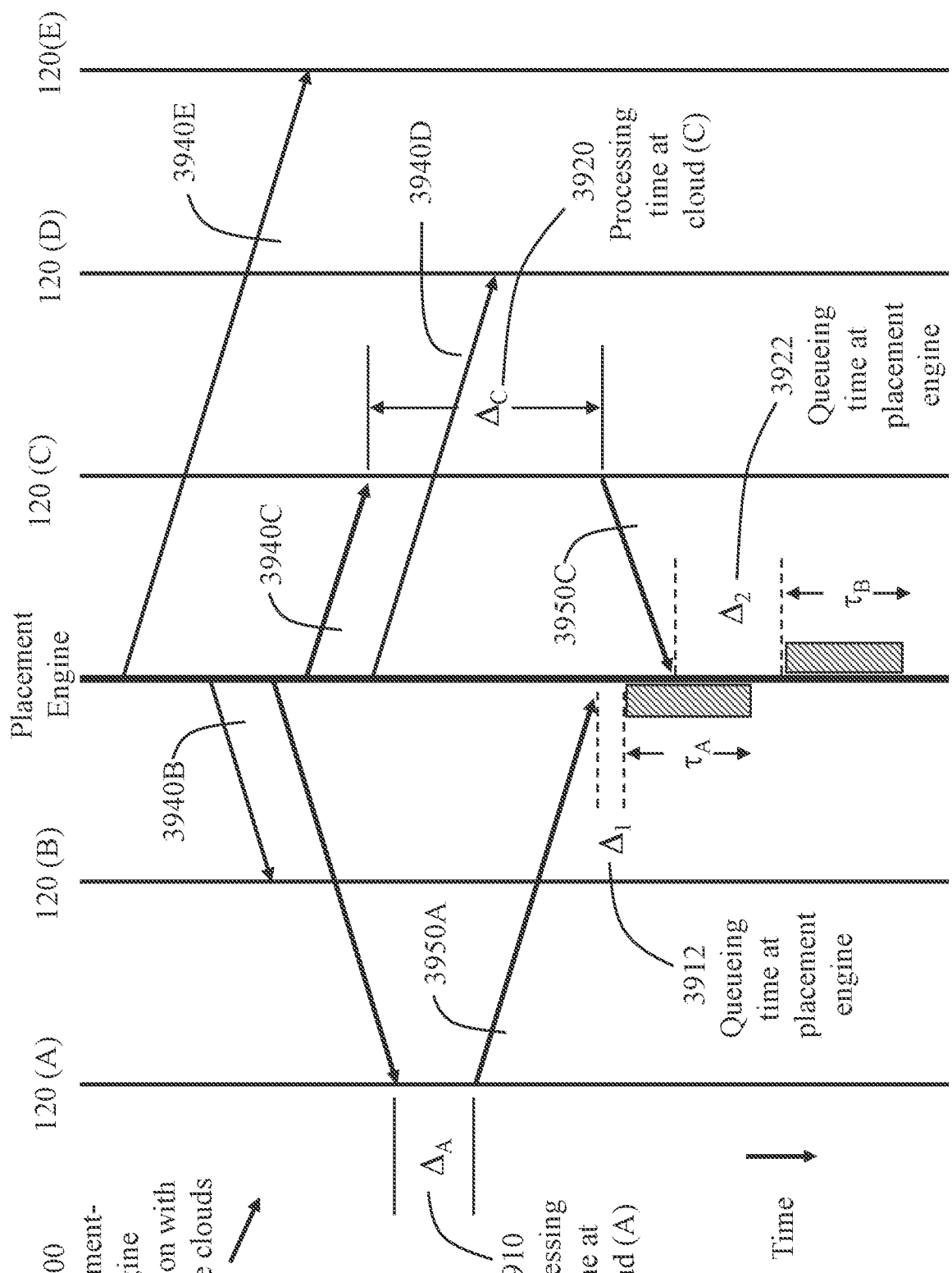
FIG. 39 illustrates communication between a placement engine and multiple clouds for placement of a multi-task service, in accordance with an embodiment of the present invention.

FIG. 39 illustrates an example of placement engine interactions 3900 with multiple clouds for placement of multiple tasks of a service. A request 3940A to schedule a first task is sent to a cloud 120(A), a request 3940B to schedule a second task is sent to cloud 120(B), a request 3940C to schedule a third task is sent to cloud 120(C), a request 3940D to schedule a fourth task is sent to cloud 120(D), and a request 3940E to schedule a fifth task is sent to cloud 120(E). Responses received from the clouds are queued at the placement engine for further processing. The processing time intervals at cloud 120(A) and 120C are indicated as $\Delta_A$ and $\Delta_c$ (references 3910 and 3920). A response 3950A received from cloud 120(A) is dequeued after a delay of $\Delta_1$ (reference 3912) then processed during a time interval $\tau_A$. A response 3950C received from cloud 120(C) is dequeued after a delay of $\Delta_2$ (reference 3922) then processed during a time interval $\tau_c$.

If the five tasks are independent of each other, the placement or scheduling requests can be sent independently. If any task depends on the outcome of any other task, scheduling requests may be sent independently specifying for each task a respective time slice determined to permit communicating requisite results to dependent tasks.

Figure 40:
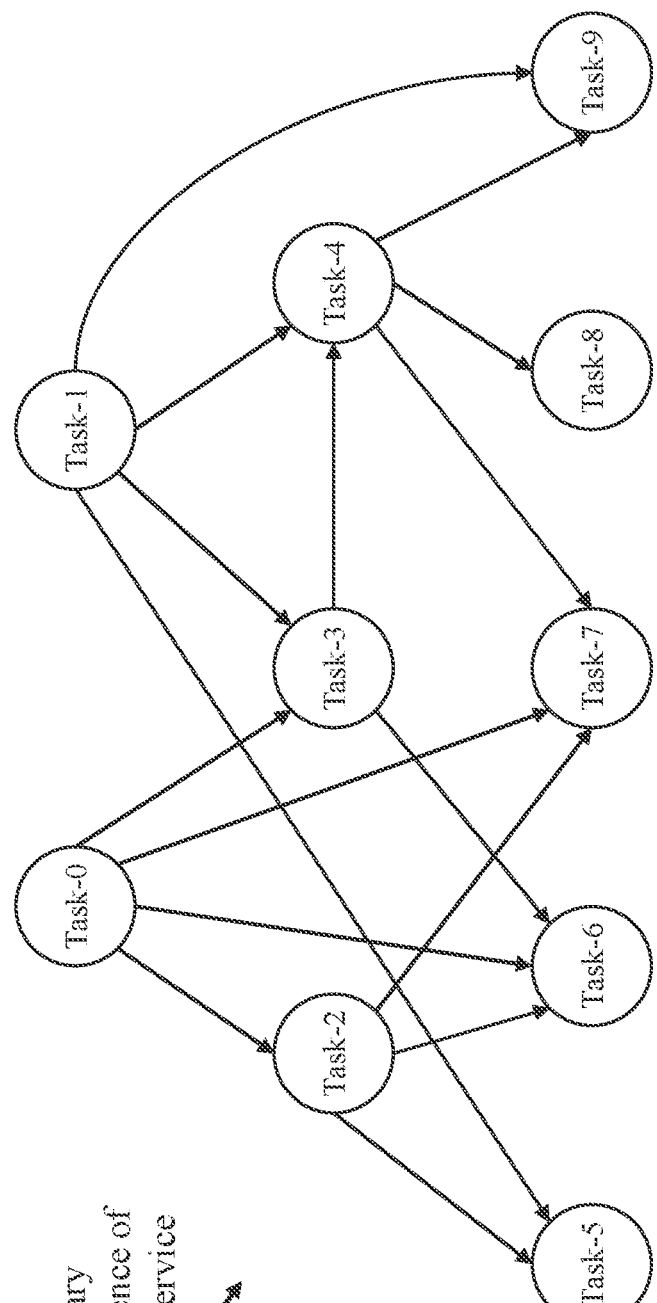
FIG. 40 illustrates interdependence of tasks of a service for use in an embodiment of the present invention.

FIG. 40 is a graph 4000 indicating interdependence of tasks of a service. Ten tasks indexed as (0) to (9) (reference 4020) are illustrated with indications of tasks interdependence where:

each of tasks (0) and (1) is free, i.e., does not depend on any other task;
task (2) depends on task (0);
task (3) depends on task (0) and task (1);
task (4) depends on task (1) and task (3);
task (5) depends on task (1) and task (2);
task (6) depends on task (0), task (2), and task (3);
task (7) depends on task (0), task (2), and task (4);
task (8) depends on task (4); and
task (9) depends on task (1) and task (4).

Based on the above interdependence indications, the preceding tasks, the dependency count 4030 and records 4040 of succeeding tasks of each of tasks (0) to (9) are determined as indicated below:

| Task | (0) | (1) | (2) | (3) | (4) | (5) | (6) | (7) | (8) | (9) |
|---|---|---|---|---|---|---|---|---|---|---|
| Preceding tasks | None | | 0 | 0, 1 | 1, 3 | 1, 2 | 0, 2, 3 | 0, 2, 4 | 4 | 1, 4 |
| Dependency count | 0 | 0 | 1 | 2 | 2 | 2 | 3 | 3 | 1 | 2 |
| Succeeding tasks | 2, 3, 6, 7 | 3, 4, 5, 9 | 5, 6, 7 | 4, 6 | 7, 8, 9 | | | None | | |

Figure 41:
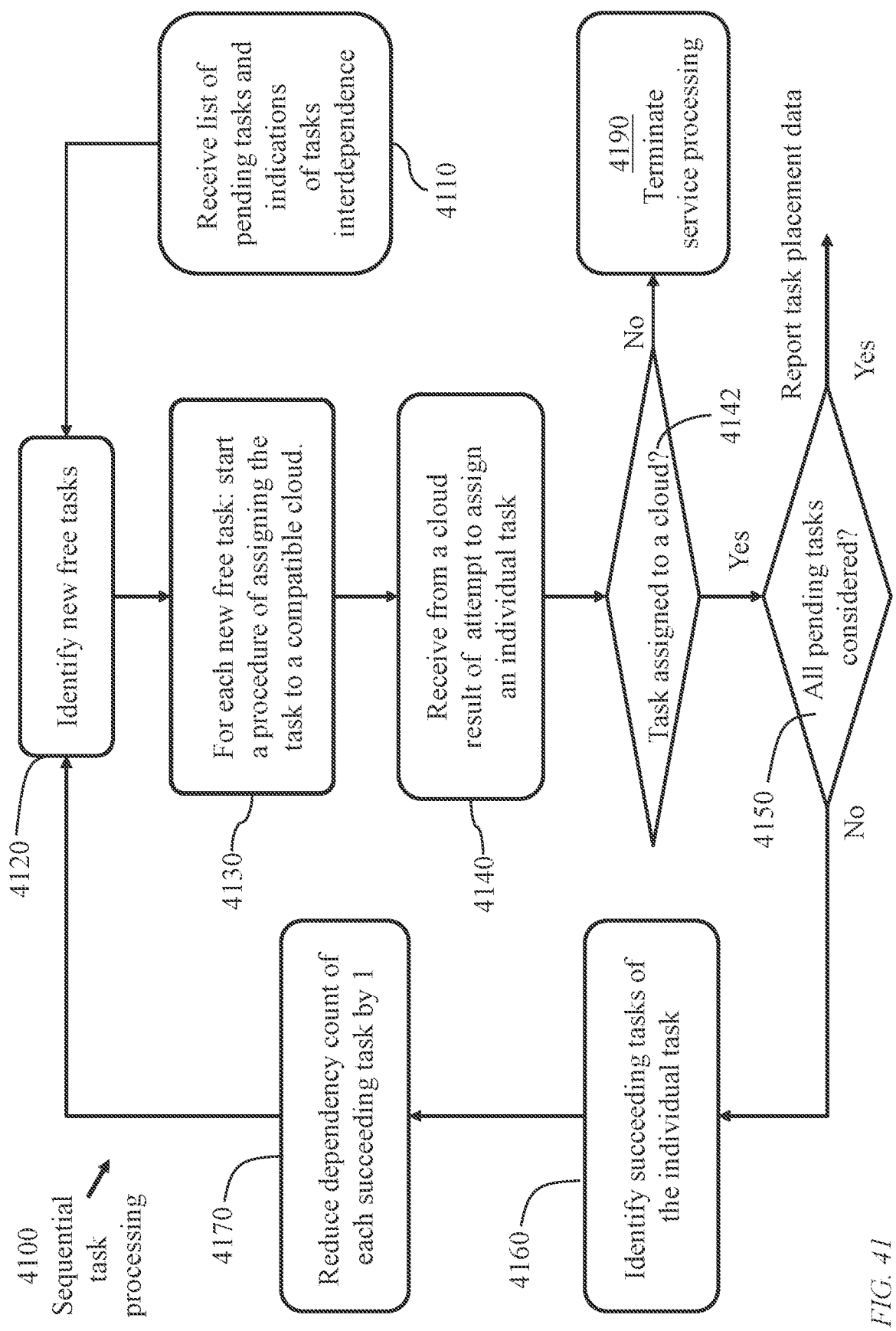
FIG. 41 illustrates sequential processing of interdependent tasks, in accordance with an embodiment of the present invention.

FIG. 41 illustrates a method 4100 of sequential processing of interdependent tasks of a specific service. Upon receiving a list of pending tasks and indications of tasks interdependence (process 4110), process 4120 identifies current free tasks; a free task is a task that is not waiting for completion of another task. Process 4130 starts, for each free task, a procedure of assigning the task to a compatible cloud. According to the table above, task (0) and task (1) are free tasks since neither has a preceding task. Process 4140 receives from already engaged clouds (at this point, the cloud(s) handling task (0) or task (1)) results of assignment (placement or scheduling) attempt of a specific task under consideration. If the specific task is not assigned (process 4142), process 4190 terminates processing the specific service. If the specific task is assigned (process 4142) and all pending tasks have been considered as determined in process 4150, successful placement of all tasks is reported to a respective client. If the specific task is assigned and at least one pending task has not been considered, process 4160 identifies succeeding tasks of the specific task then process 4170 reduces the dependency count of each succeeding task by 1 and process 4120 is revisited.

Figure 42:
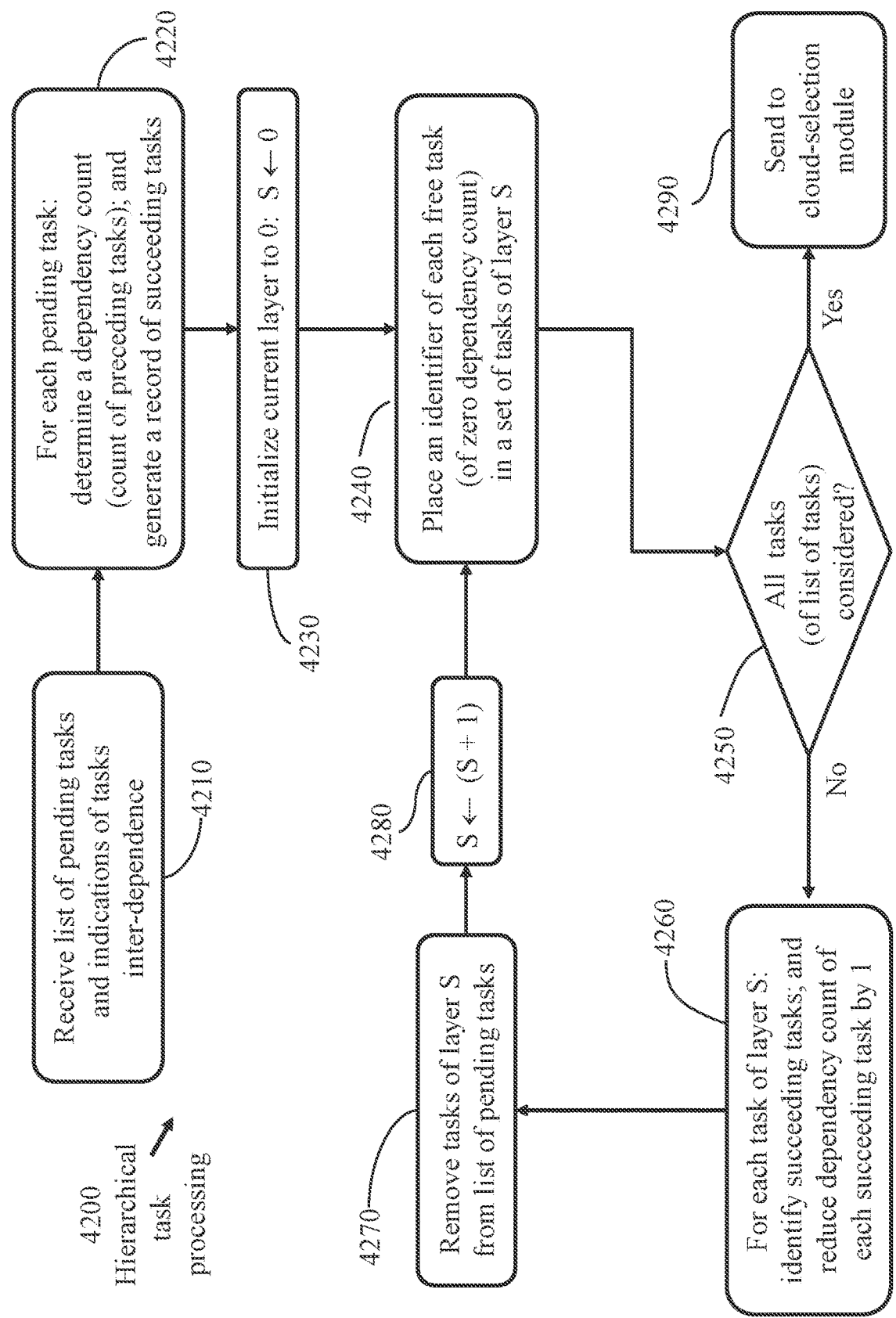
FIG. 42 illustrates a process of sorting tasks into hierarchical sets of tasks, in accordance with an embodiment of the present invention.
Figure 43:
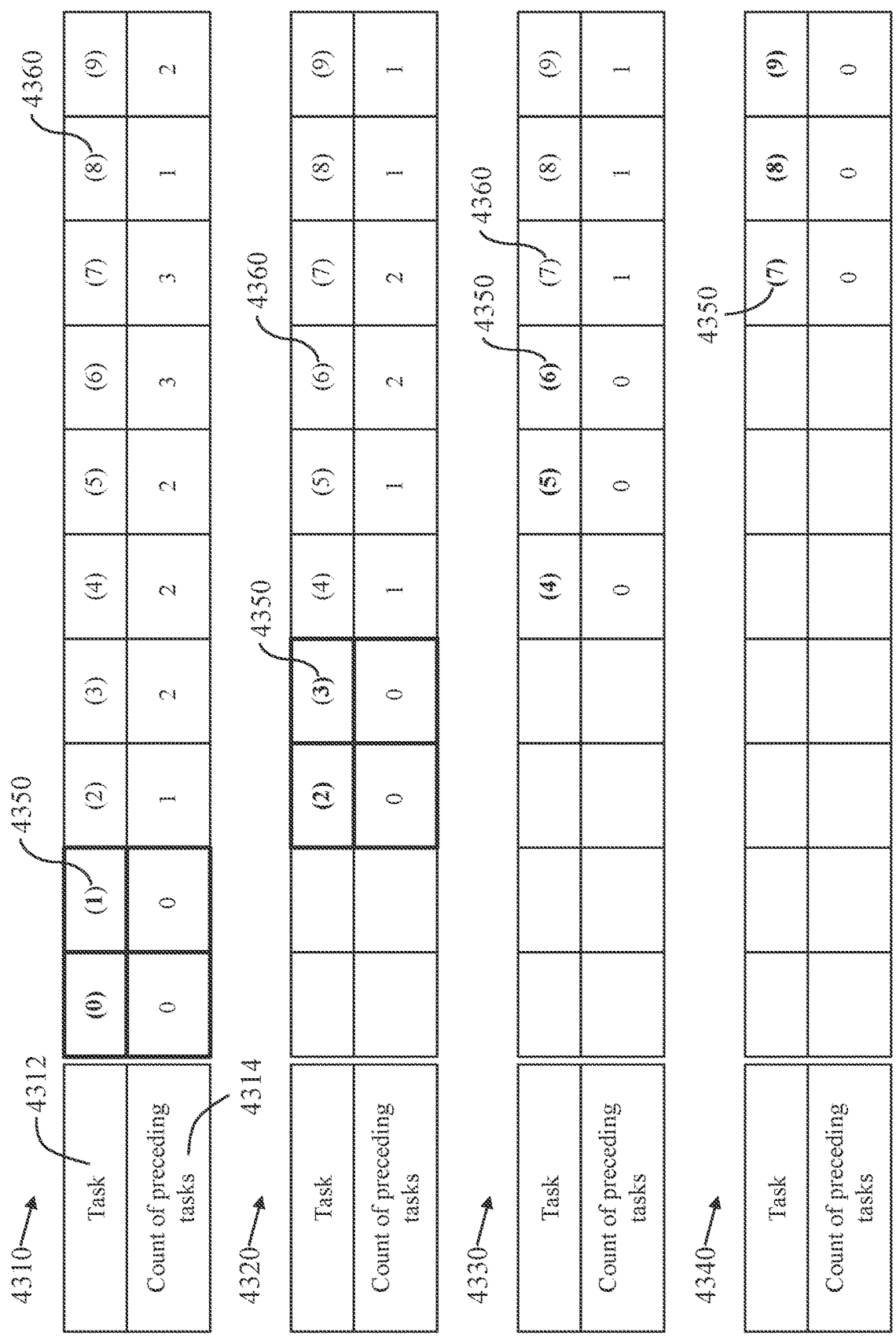
FIG. 43 illustrates hierarchical sets of tasks.

FIG. 42 illustrates a process 4200 of sorting interdependent tasks into hierarchical sets of tasks. FIG. 43 illustrates intermediate results of process 4200. The process implements the steps described below.

Step 4210: The placement engine receives a list of 10 tasks indexed as (0) to (9) and indications of tasks interdependence as described above with reference to FIG. 40.

Step 4220: For each pending task determine a dependency count and generate a record of succeeding tasks. Thus, based on the received interdependence indications, the dependency counts and records of succeeding tasks of pending tasks (0) to (9) are determined as described above with reference to FIG. 40.

Step 4230: The current layer is set as S=0

Steps 4240. 4250, 4260, 4270, and 4280 are recursively implemented until all tasks are entered into respective layers.

Initial Execution

Step 4240: An identifier of each free task is entered in a set of tasks of layer S. At this point, S=0. Thus, the set of tasks of layer 0 includes tasks (0) and (1), each of which having a dependency count of zero as determined in step 4220.

Step 4250: The step determines whether all of the tasks have been entered in respective sets of tasks. At this point only two tasks of indices (0) and (1) have been entered in the set of tasks of the layer of index 0 (S=0).

Step 4260: The step requires identifying succeeding tasks of the set of tasks of the current layer and reducing the dependency count of each succeeding task by 1. At this point, tasks (0) and (1) have been entered in the set of tasks of the current layer.

The succeeding tasks of task (0) have been determined in step 4220 as tasks (2), (3), (6), and (7). The dependency count of tasks (2), (3), (6), and (7) are then reduced from 1, 2, 3, and 3 to 0, 1, 2, and 2, respectively.

The succeeding tasks of task (1) have been determined in step 4220 as tasks (3), (4), (5), and (9). The dependency count of tasks (3), (4), (5), and (9) are then reduced from 1, 2, 2 and 2 to 0, 1, 1, and 1, respectively.

Step 4270: The step requires removing tasks of the current layer (layer 0) from the list of pending tasks. Thus, the list of previous pending tasks {(0), (1), . . . , (9)} is reduced to pending tasks {(2), (3), . . . , (9)}. Thus, the pending tasks and corresponding dependency counts are as indicated in the table below.

| Task | (2) | (3) | (4) | (5) | (6) | (7) | (8) | (9) |
|---|---|---|---|---|---|---|---|---|
| Dependency count | 0 | 0 | 1 | 1 | 2 | 2 | 1 | 1 |

Step 4280: The step assigns a new layer S=1.

First Recursion

Step 4240: An identifier of each free task is entered in a set of tasks of layer S. At this point, S=1. Tasks (2), (3), (4), (5), (6), (7), (8), and (9) are pending as determined in step 4270. Thus, the set of tasks of layer 1 includes tasks (2) and (3), each of which having a dependency count of zero as determined in step 4260.

Step 4250: The step determines whether all of the tasks have been entered in respective sets of tasks. At this point four tasks of indices (0), (1), (2), and (3) have been entered in respective sets of tasks.

Step 4260: The step requires identifying succeeding tasks of the set of tasks of the current layer and reducing the dependency count of each succeeding task by 1. At this point, tasks (2) and (3) have been entered in the set of tasks of the current layer.

The succeeding tasks of task (2) have been determined in step 4220 as tasks (5), (6), and (7). The dependency count of tasks (5), (6), and (7) are then reduced from 1, 2, and 2 to 0, 1, and 1, respectively.

The succeeding tasks of task (3) have been determined in step 4220 as tasks (4) and (6). The dependency count of tasks (4) and (6) are then reduced from 1 and 1 to 0 and 0.

Step 4270: The step requires removing tasks of the current layer (layer 1) from the list of pending tasks. Thus, the list of previous pending tasks {(2), (3), . . . , (9)} is reduced to pending tasks {(4), (5), . . . , (9)}. Thus, the pending tasks and corresponding dependency counts are as indicated in the table below.

| Task | (4) | (5) | (6) | (7) | (8) | (9) |
|---|---|---|---|---|---|---|
| Dependency count | 0 | 0 | 0 | 1 | 1 | 1 |

Step 4280: The step assigns a new layer S=2.

Second Recursion

Step 4240: An identifier of each free task is entered in a set of tasks of layer S. At this point, S=2. Tasks (4), (5), (6), (7), (8), and (9) are pending as determined in step 4270. Thus, the set of tasks of layer 2 includes tasks (4), (5), and (6), each of which having a dependency count of zero as determined in step 4260.

Step 4250: The step determines whether all of the tasks have been entered in respective sets of tasks. At this point seven tasks of indices (0) to (7) have been entered in respective sets of tasks.

Step 4260: The step requires identifying succeeding tasks of the set of tasks of the current layer and reducing the dependency count of each succeeding task by 1. At this point, tasks (4), (5), and (6) have been entered in the set of tasks of the current layer.

The succeeding tasks of task (4) have been determined in step 4220 as tasks (7), (8), and (9). The dependency count of tasks (7), (8), and (9) are then reduced from 1, 1, and 1 to 0, 0, and 0.

Step 4270: The step requires removing tasks of the current layer (layer 2) from the list of pending tasks. Thus, the list of previous pending tasks {(4), (5), . . . , (9)} is reduced to pending tasks {(7), (8), and (9)}. Thus, the pending tasks and corresponding dependency counts are as indicated in the table below.

| Task | (7) | (8) | (9) |
|---|---|---|---|
| Dependency count | 0 | 0 | 0 |

Step 4280: The step assigns a new layer S=3

Third Recursion

Step 4240: An identifier of each free task is entered in a set of tasks of layer S. At this point, S=3. Tasks (7), (8), and (9) are pending as determined in step 4270. Thus, the set of tasks of layer 3 includes tasks (7), (8), and (9), each of which having a dependency count of zero as determined in step 4260.

Figure 45:
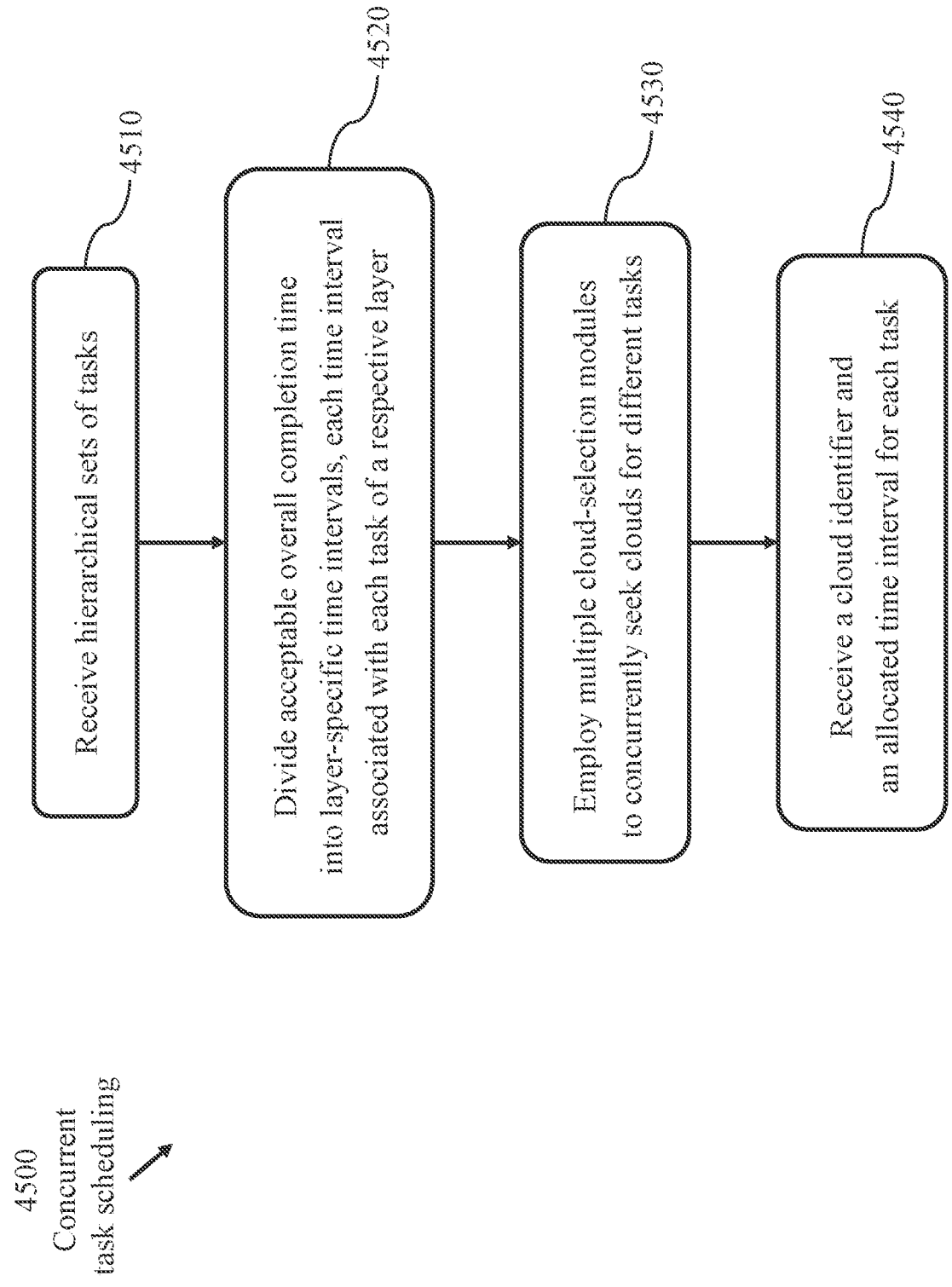
FIG. 45 illustrates a process of allocating for each set of tasks a respective slice of an overall time window and employing multiple cloud-selection modules to concurrently seek clouds for placement of individual tasks, in accordance with an embodiment of the present invention.

Step 4250: The step determines whether all of the tasks have been entered in respective sets of tasks. At this point all of the 10 tasks have been entered in respective sets of tasks. A process of assigning individual tasks to clouds illustrated in FIG. 45 is based on the sorted sets of tasks of layers 0 to 3.

FIG. 43 illustrates intermediate results of process 4200 of sorting tasks into hierarchical sets of tasks. A task of zero dependency count (reference 4350) is an unconstrained task which would be ready for placement. A task of a positive dependency count (reference 4360) waits until the dependency count reduces to zero due to placement of preceding tasks.

Array 4310 indicates an initial count 4314 of preceding tasks (i.e., a dependency count) of each of pending tasks (0) to (9). Each of task (0) and task (1) is unconstrained and assigned to respective available clouds of highest merit. Tasks (2) to (9) are then pending. Task (0) and task (1) form layer (0) of tasks.

Array 4320 indicates a dependency count of each of pending tasks (2) to (9). Each of task (2) and task (3) is unconstrained and assigned to respective available clouds of highest merit. Tasks (4) to (9) are then pending. Task (2) and task (3) form layer (1) of tasks.

Array 4330 indicates a dependency count of each of pending tasks (4) to (9). Each of task (2), task (4), and task (9) is unconstrained and assigned to respective available clouds of highest merit. Tasks (7) to (9) are then pending. Task (4), task (5), and task (6) form layer (2) of tasks.

Array 4340 indicates a dependency count of each of pending tasks (7) to (9). Each of task (7), task (8), and task (9) is unconstrained and assigned to respective available clouds of highest merit. All of the 10 tasks are then assigned. Task (7), task (8), and task (9) form layer (2) of tasks.

Figure 44:
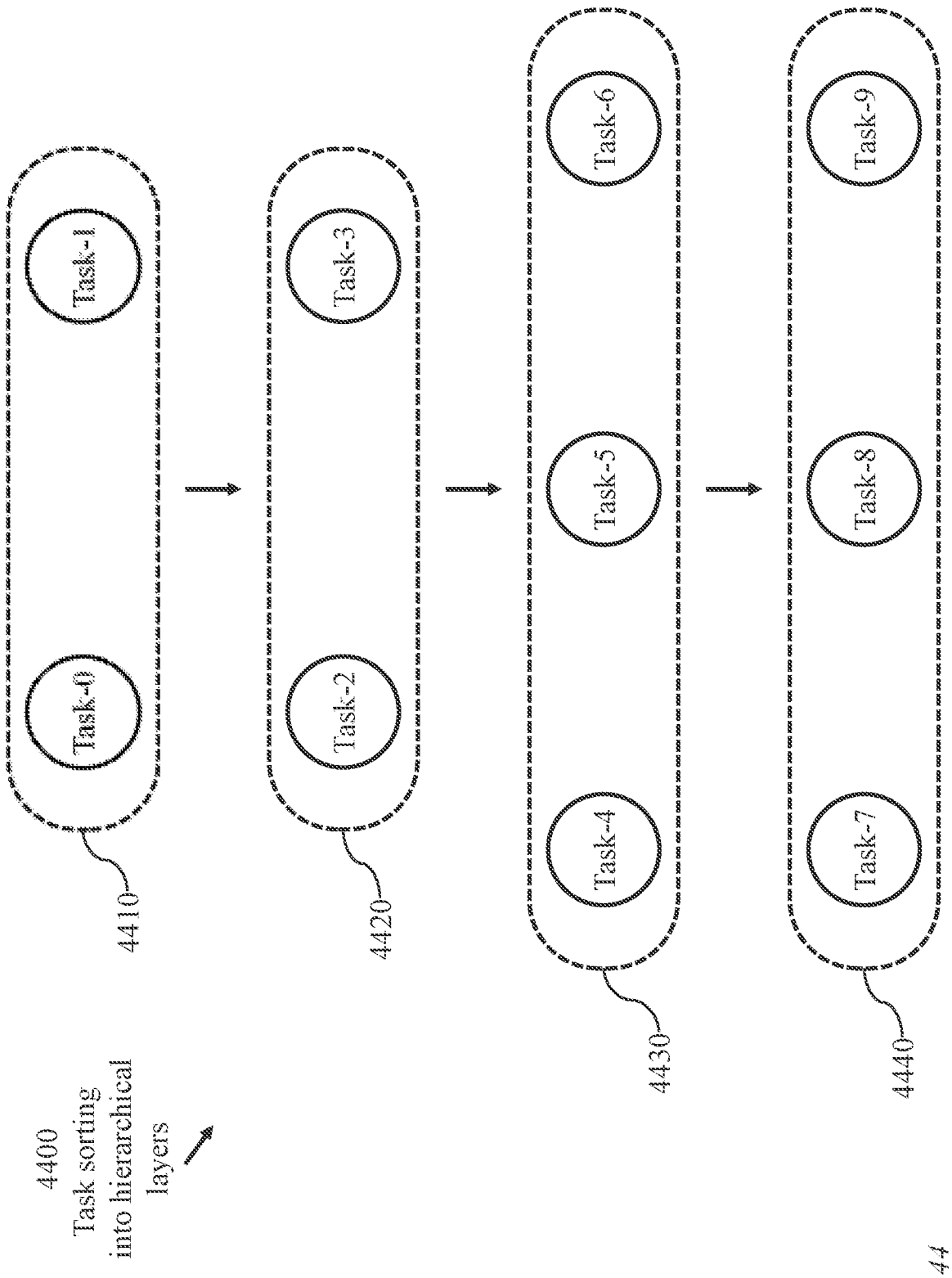
FIG. 44 illustrates sorting interdependent tasks into hierarchical sets of tasks, in accordance with an embodiment of the present invention.

FIG. 44 illustrates hierarchical sets 4400 of tasks determined from process 4200 and illustrated in FIG. 43. The set 4410 of layer-0 comprises independent root tasks for which host clouds may be sought concurrently. Each of sets 4420, 4430, and 4440 (of layer-1, layer-2, and layer-3, respectively) comprises tasks which are independent of each other and for which host clouds may be sought independently when respective dependency counts reduce to zero due to processing of tasks of preceding layers.

FIG. 45 illustrates a method 4500 of concurrent tasks assignments. The method is based on allocating for each set of tasks a respective slice of an overall time window and employing multiple cloud-selection modules to concurrently seek clouds for placement of individual tasks. Process 4510 receives a list of interdependent tasks sorted into hierarchical sets of tasks Process 4520 divides a predefined service-completion interval into time slices having a one-to-one correspondence to the hierarchical sets of tasks Process 4530 engages multiple cloud-selection modules for concurrent determination of task schedules. Process 4540 receives from each engaged cloud task-assignment information indicating either an allocated time interval for a respective task or failure to assign the respective task. The placement engine directs an assigned task to an alternative cloud to assign the task within a respective designated time slice.

Figure 46:
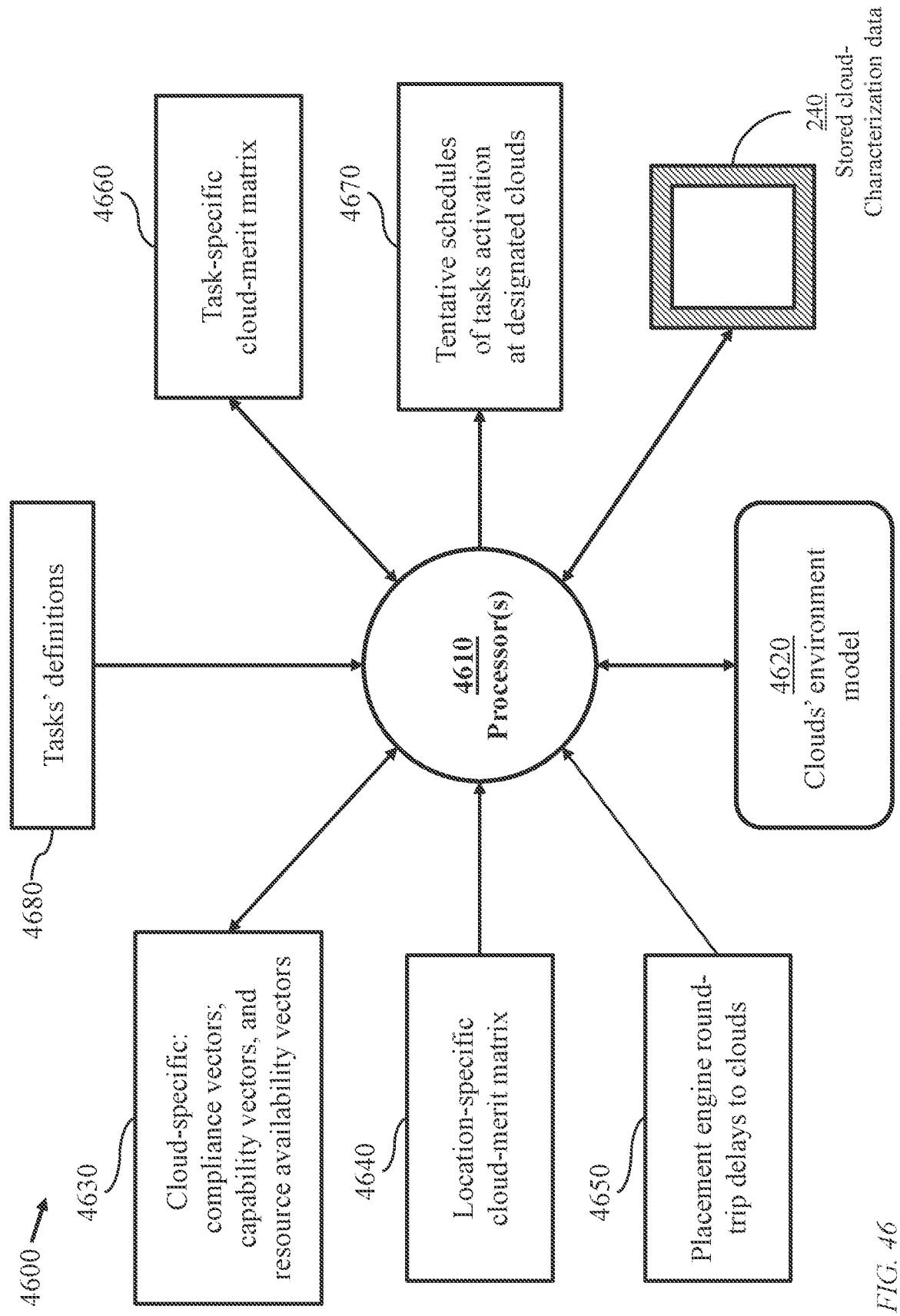
FIG. 46 illustrates use of a model of clouds' environment to produce a tentative schedule for tasks activation, in accordance with an embodiment of the present invention.

FIG. 46 illustrates a device 4600 coupled to a placement engine for predetermining task assignment schedules based on clouds' environment data. The method is based on using a software module implementing an analytical model of clouds' environment to produce a tentative schedule for tasks activation. The device comprises:
   (i) at least one hardware processor 4610;
   (ii) a memory device 4620 holding the software module;
   (iii) a storage medium 240 holding cloud characterization and state data;
   (iv) a memory device 4630 holding cloud-specific eligibility vectors which include a compliance vector 2630, a capability vector 2660, and a resource-availability vector 2690 associated with each cloud 120;

(v) a memory device 4640 holding client-location-specific cloud-merit matrix 2740;

(vi) a memory device 4650 holding round-trip propagation delay matrices between each placement engine and individual clouds;

(vii) a memory device 4660 holding task-specific cloud-merit matrix 2720;

(viii) a memory device 4670 holding Tentative schedules of tasks activation at designated clouds; and (ix) a buffer 4680 holding received service-definition data including definitions of individual tasks of a service.

A service may comprise multiple service components. The act of assigning (placing or scheduling) a service component to a cloud is herein referenced as a "task". The terms "multicomponent service" and "multitask service" are used synonymously.

Figure 47:
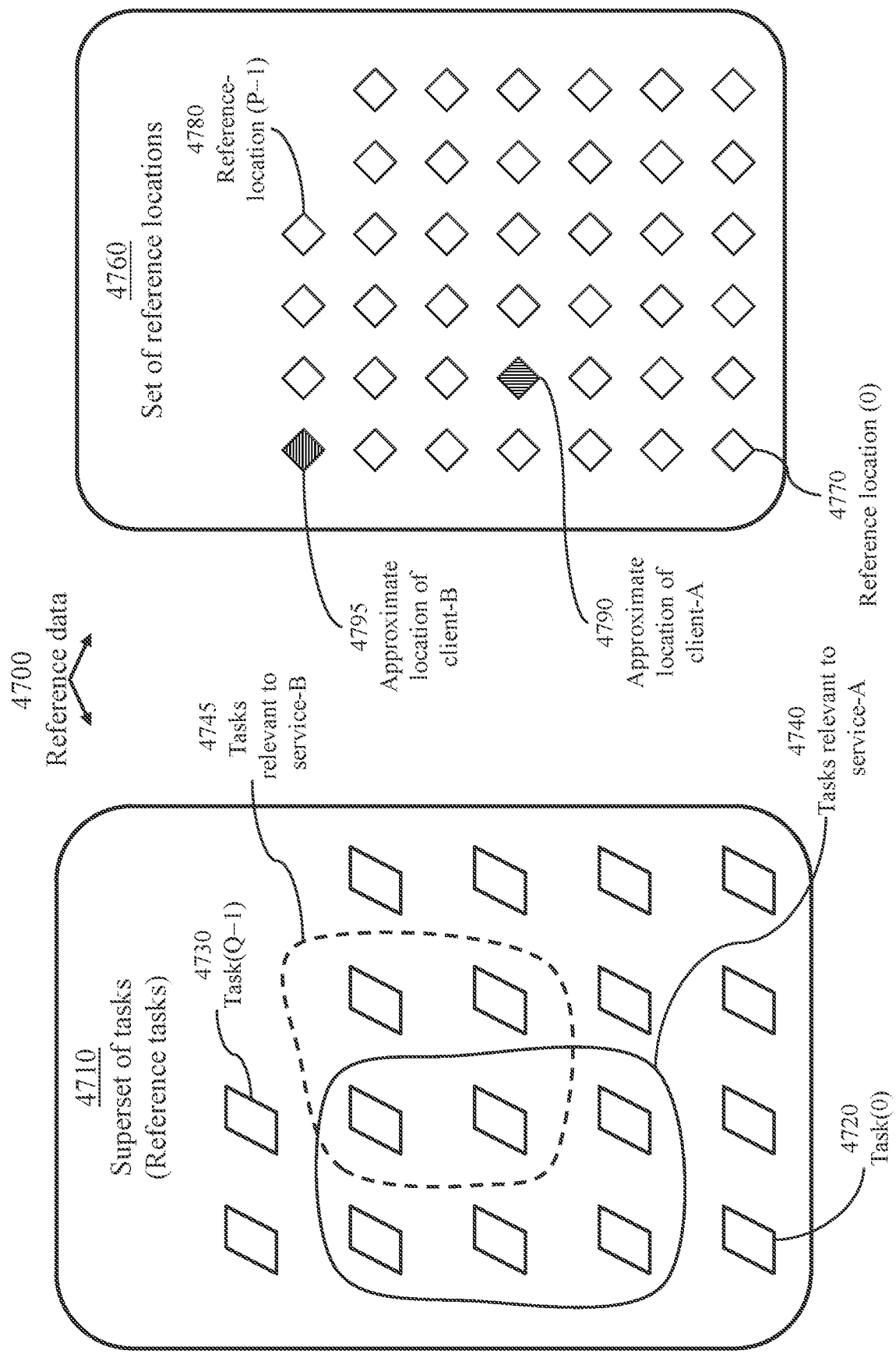
FIG. 47 illustrates reference data acquired at a service-placement engine.

FIG. 47 illustrates reference data 4700, acquired at service-placement engine, including a superset 4710 of service components (a superset of tasks) and a set 4760 of reference geographic locations of clients' facilities.

Referring to FIG. 28, the cloud merit, of any of the K clouds, for a specific service component (specific task) is based on definitions of the service component. The task-based cloud-merits may be determined for each service component (each task) of a superset of service components as illustrated in FIG. 28. The superset 4710 of service components comprises the Q service components (references 4720 to 4730) of FIG. 28. A specific service would comprise a set of service components within the superset. For example, service-A comprises six service components (reference 4740) while service-B comprises four service components (reference 4745) of the superset 4710 of 18 service components. As illustrated, two service components are common in service-A and service-B.

Referring to FIG. 29, the cloud merit, of any of the K clouds, is determined for each client location of a set of P reference locations, P>>1. With a relatively large number of well spread reference locations, the cloud-merit for a cloud location may be determined from the precomputed matrix of FIG. 29. The set 4760 of reference locations comprises the P locations (references 4770 to 4780) of FIG. 29. As illustrated, two reference locations 4790 and 4795 approximate the actual locations of client-A and client-B.

Distributed Service-Placement Engine

FIG. 2 illustrates a basic placement engine 160 comprising a cloud observation module 220, a storage medium 240, and a cloud-recommendation engine 260. The cloud-observation module acquires characterization data as well as time-varying occupancy state of a designated set of clouds. The acquired cloud-characterization data relates to a predefined set of characteristics.

FIG. 30 illustrates an enhanced service-placement engine 3000 similar to the basic service-placement engine 160 of FIG. 2 with the basic cloud-selection module 260 complemented with an inter-cloud coordination module 3025 to form an enhanced cloud-selection module 3020. The inter-cloud coordination module performs processes related to implementation of service tasks using multiple clouds as described with reference to FIG. 32 to FIG. 46.

In a large-scale service-placement system engaging a large number of clouds and serving a large number of clients, the use of a centralized placement engine 160 or 3000 has several disadvantages. A single cloud-observation module 220 collecting information from a large number of clouds distributed over a wide geographical area may result in a large proportion of service-placement decisions being made based on stale cloud-state data. A cloud is a shared service facility with a fluctuating workload. Updating cloud-state data is a time-sensitive function which determines admission, or otherwise, of service-placement requests. The function is better performed using geographically distributed multiple placement engines.

In accordance with one embodiment, the enhanced placement engine 3000 is constructed as two standalone hardware units. One unit, labeled a "cloud observer" (reference 4830), comprises a cloud-observation module 220 coupled to a respective network interface (not illustrated). The other unit, labeled a "service-placement unit" (reference 4840), comprises cloud-data storage medium 240, enhanced cloud-selection module 3020, and network interface 210.

Figure 48:
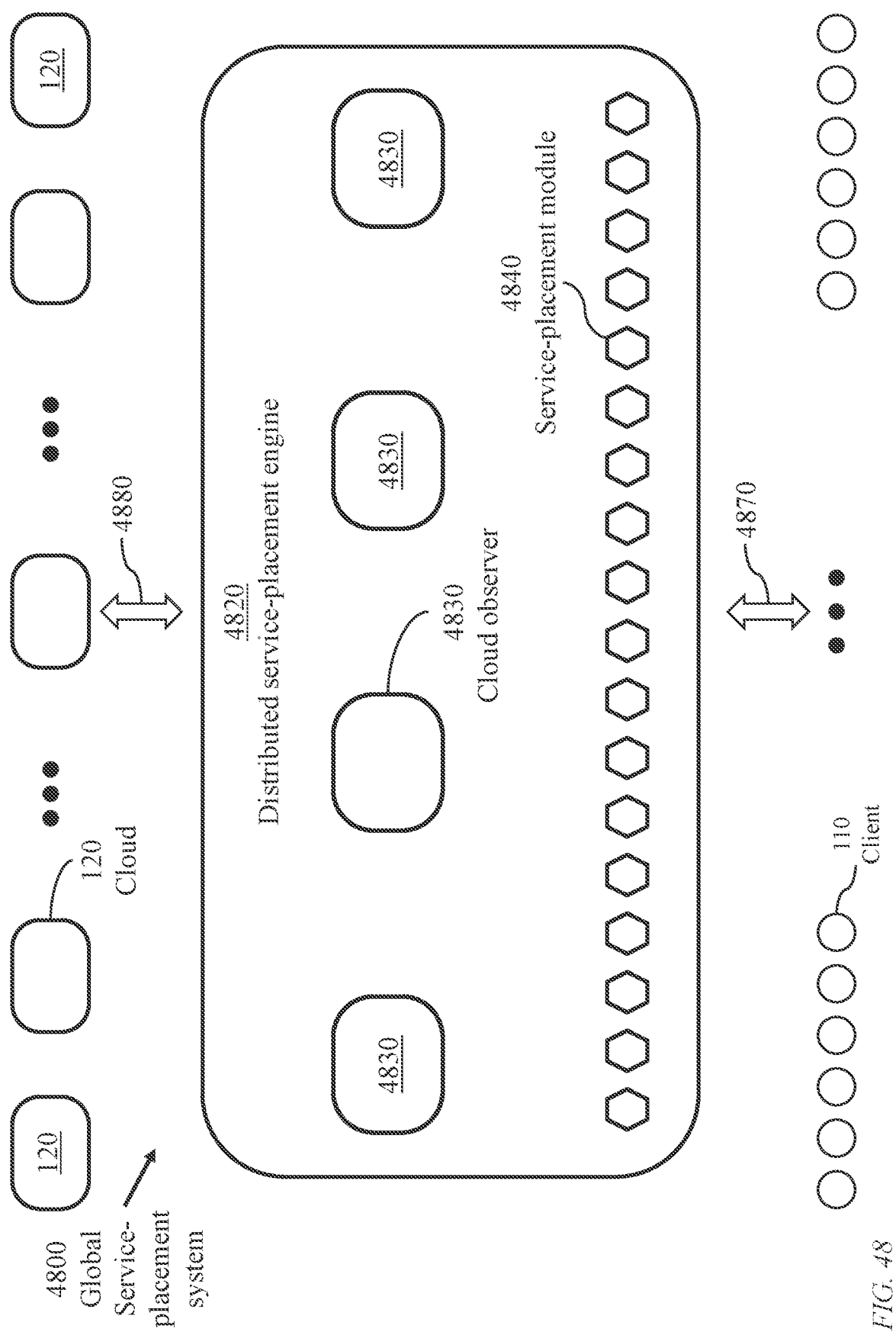
FIG. 48 illustrates a global service-placement system employing a distributed service-placement engine comprising multiple cloud-monitoring modules and service-placement modules, in accordance with an embodiment of the present invention.
Figure 49:
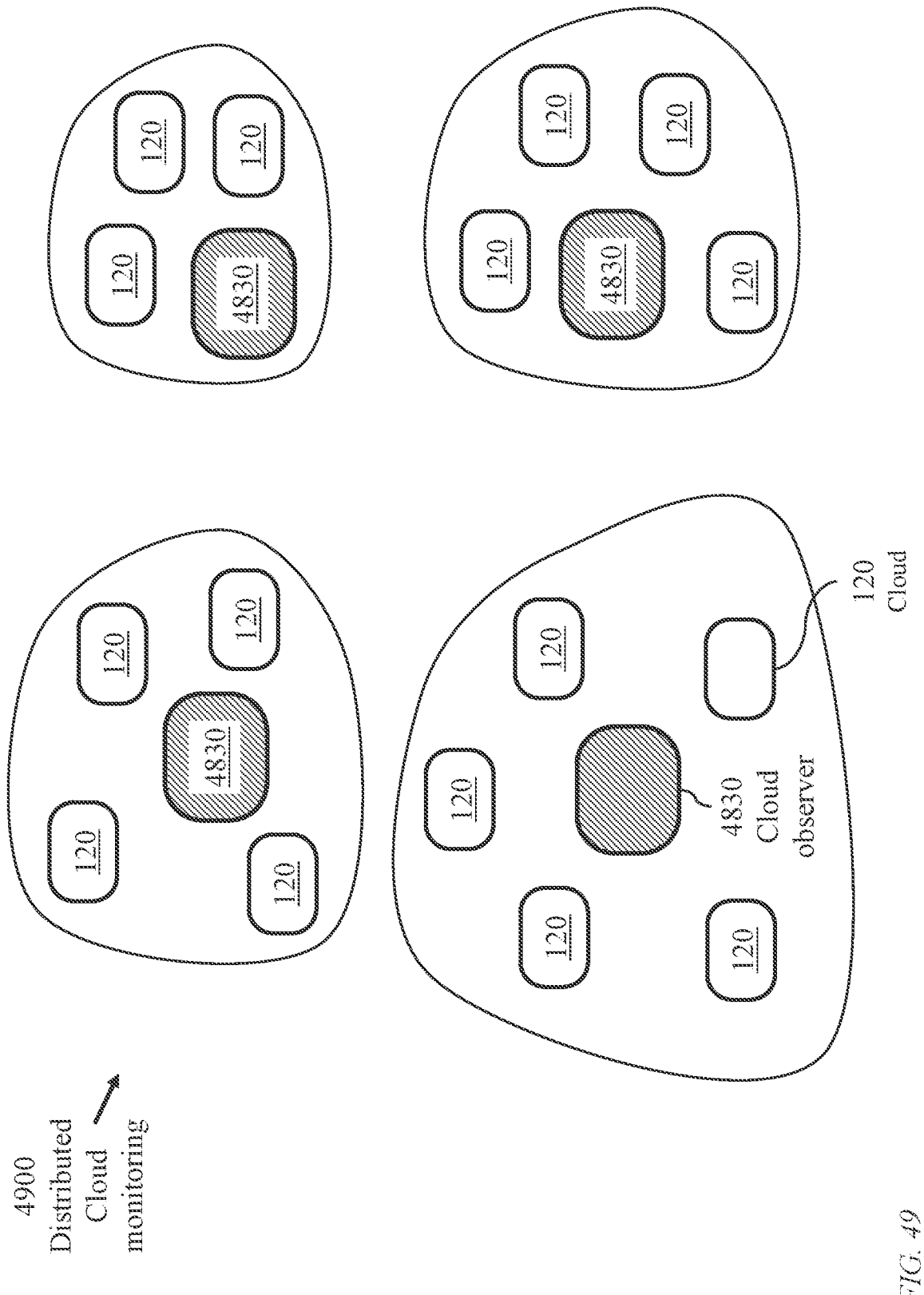
FIG. 49 illustrates use of multiple cloud modules each dedicated to a respective subset of the set clouds.

FIG. 48 illustrates a global service-placement system 4800 comprising a distributed service-placement engine 4820 coupled to a plurality of clients 110 (links 4810) and a plurality of clouds 120 (links 4880). The distributed service-placement engine 4820 comprises a plurality of cloud-observers 4830 and a plurality of service-placement units 4840. Links 4810 connect the service-placement units 4840 to clients 110. Links 4880 connect the cloud observers 4830 to the clouds for acquisition of cloud information FIG. 49 illustrates an arrangement 4900 for distributed cloud observation employing multiple cloud observers 4830 where each cloud observer is dedicated to a respective subset of the set clouds.

Figure 50:
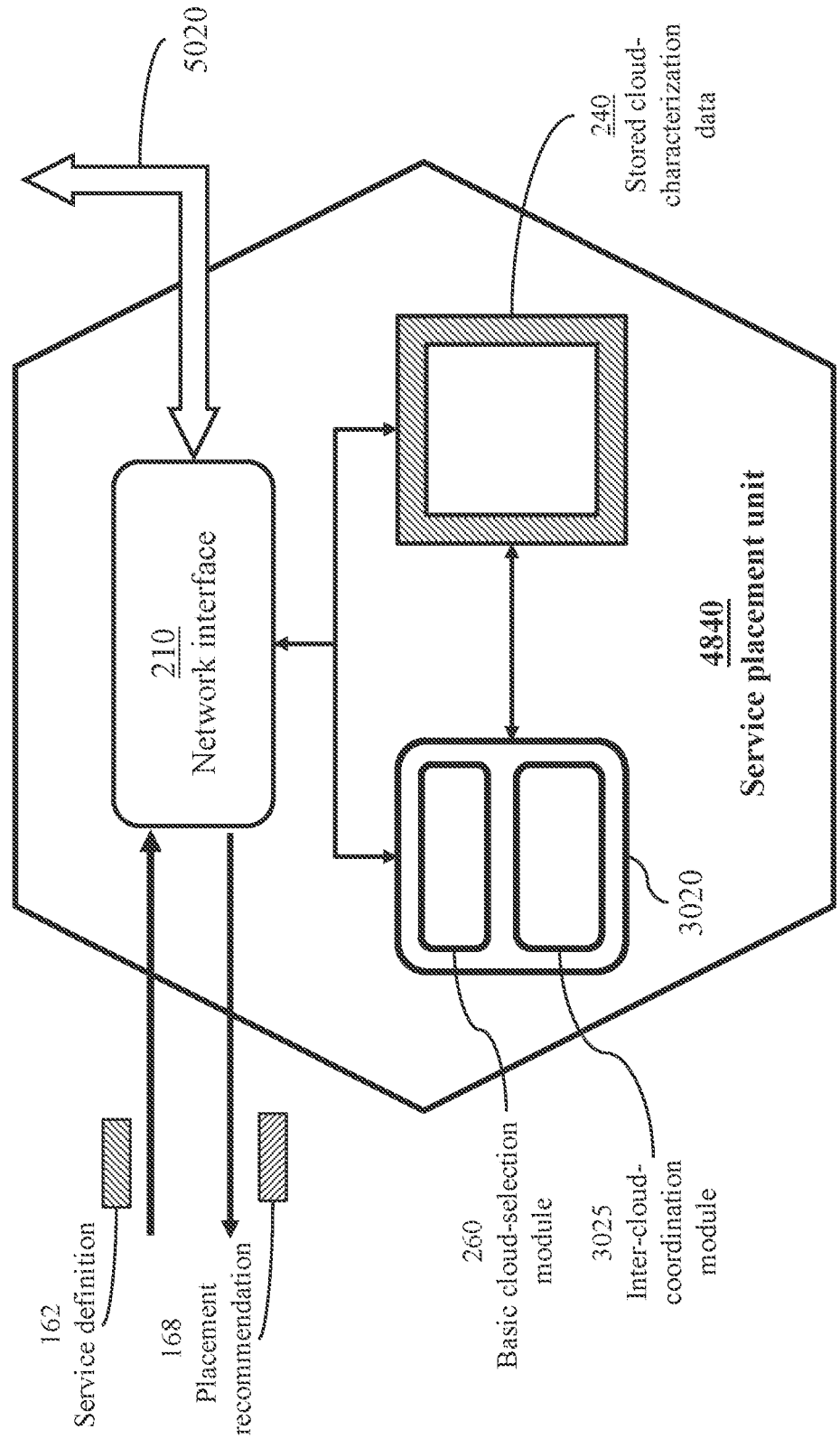
FIG. 50 illustrates a service placement module of the distributed service-placement engine, in accordance with an embodiment of the present invention.

FIG. 50 illustrates connectivity 5000 a service placement unit 4840. As described above, the service-placement unit 4840 comprises storage medium 240, which maintains cloud characterization data and cloud's state data, enhanced cloud-selection module 3020, and network interface 210. The network interface 210 communicates with clients 110 through links 4810 to acquire service definition data 162 and deliver placement decisions 168, and communicates with cloud observers 4830 through a transport medium 5020 to acquire cloud-characterization data and cloud-state data.

Figure 51:
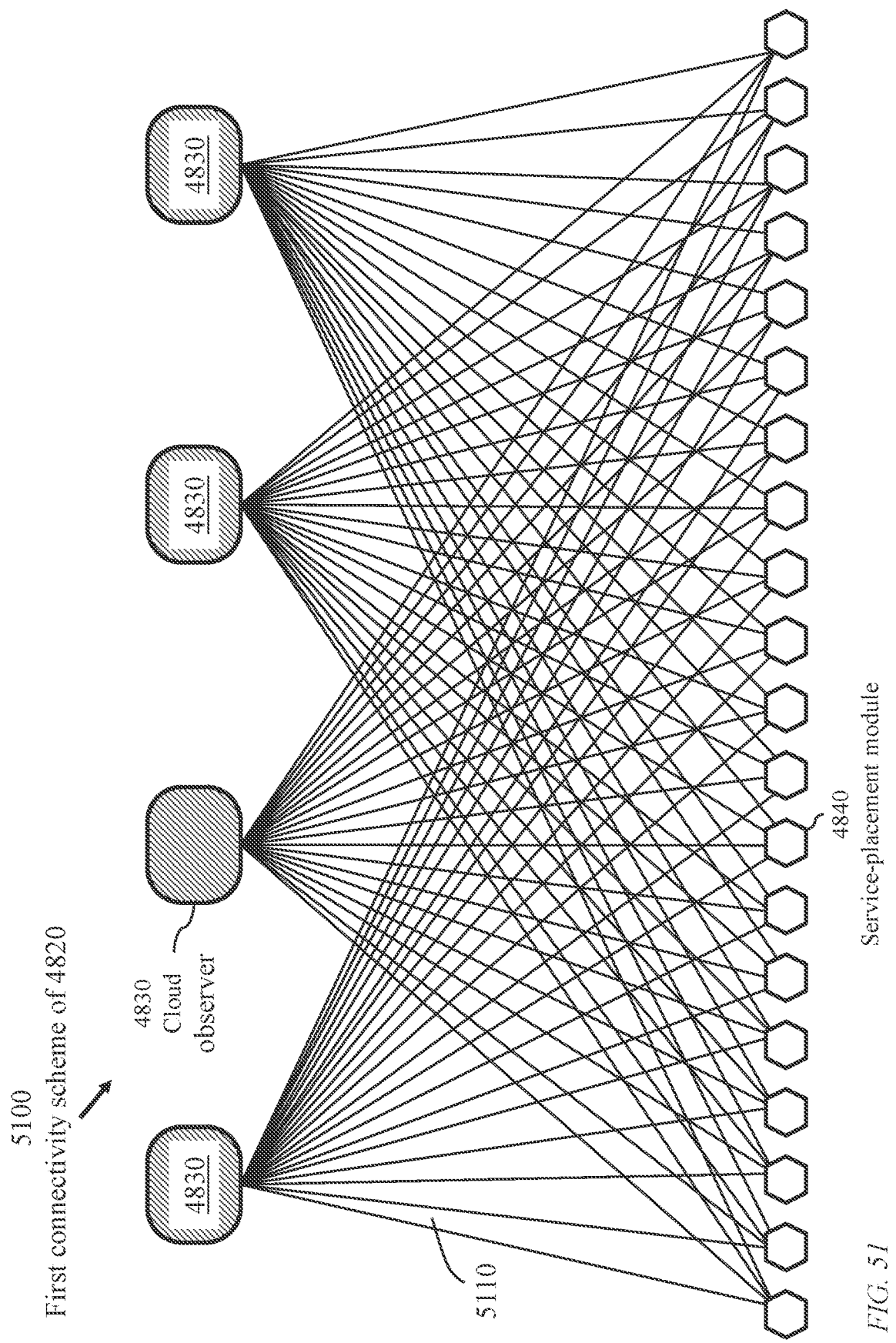
FIG. 51 illustrates a first exemplary connectivity of cloud-monitoring modules to service-placement modules of the distributed service-placement engine, in accordance with an embodiment of the present invention.

FIG. 51 illustrates a first exemplary connectivity scheme 5100 of cloud observers 4830 to service-placement units 4840 of the distributed service-placement engine 4820. Each cloud observer 4830 is communicatively coupled to a respective set of clouds through channels 5120 to acquire cloud characteristics and state. Each cloud observer 4830 has a channel 5110 to each service-placement unit 4840 to communicate updates of cloud information acquired at a cloud observer. Thus, transport medium 5020 comprises a number of channels 5110, equal to the number of cloud observers, which may be effected through a network.

Figure 52:
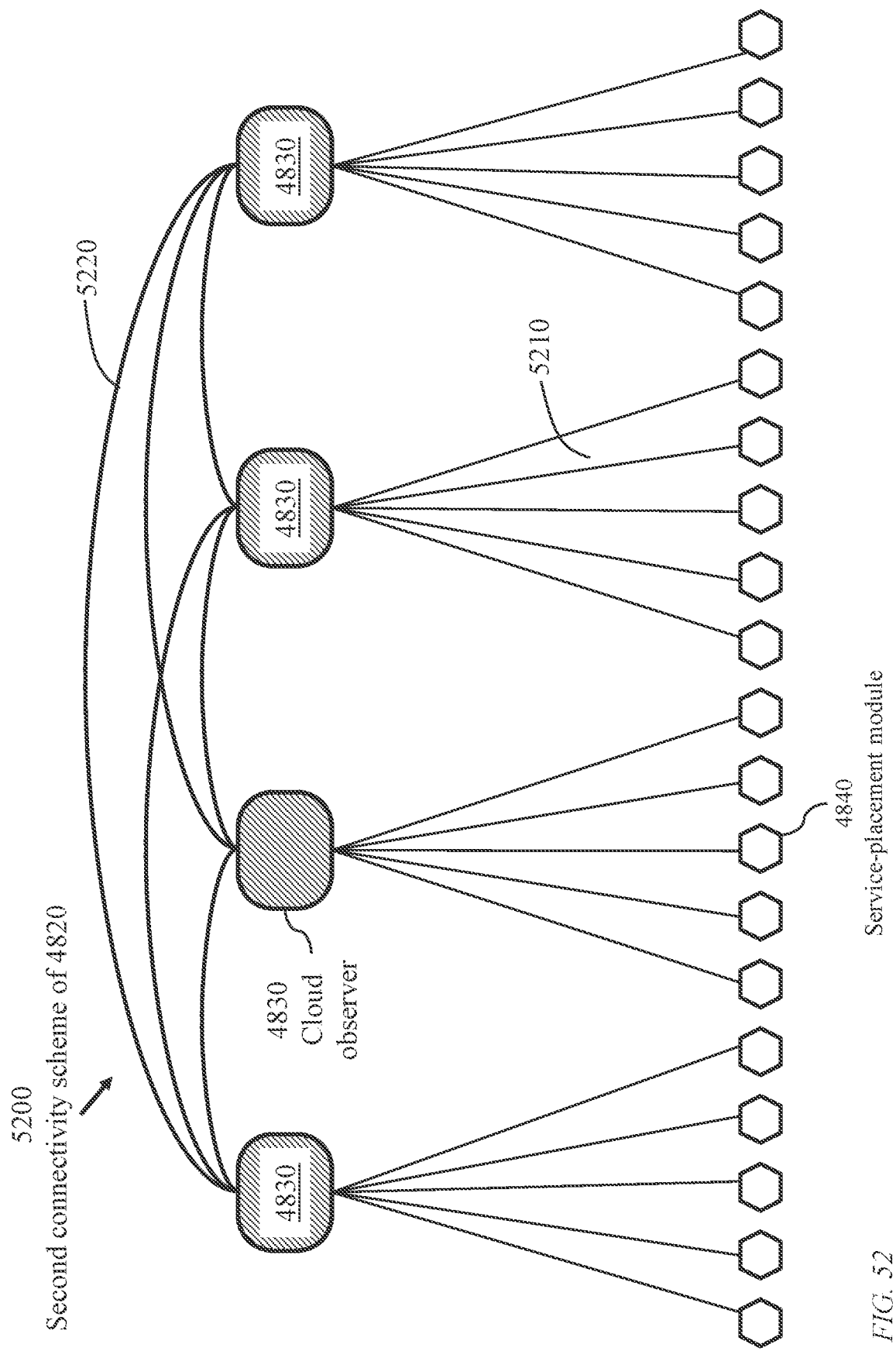
FIG. 52 illustrates a second exemplary connectivity of cloud-monitoring modules to service-placement modules of the distributed service-placement engine, in accordance with an embodiment of the present invention.

FIG. 52 illustrates a second exemplary connectivity scheme 5200 of cloud-observers 4830 to service-placement units of the distributed service-placement engine 4820. Each cloud observer 4830 is communicatively coupled to each other cloud observer 4830 through a dual channel 5220 to exchange cloud characteristics and state data. Thus, each cloud observer 4830 possesses available cloud data from each cloud 110. Each cloud observer 4830 has a channel 5210 to each service-placement unit 4840 carrying cloud-monitoring data of all clouds. Thus, each service-placement unit 4840 receives cloud information through a single channel 5210.

Figure 53:
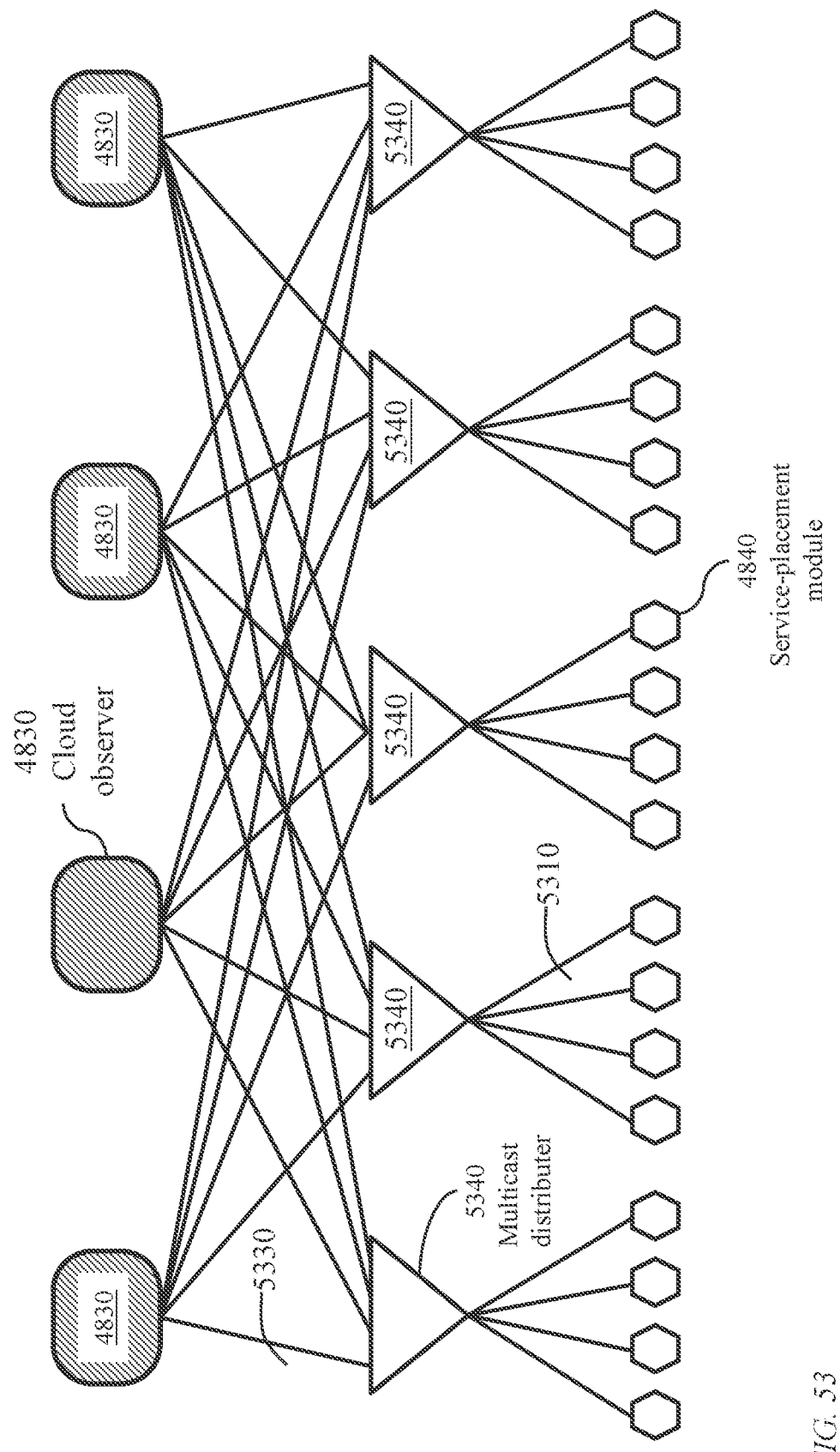
FIG. 53 illustrates a third exemplary connectivity of cloud-monitoring modules to service-placement modules of the distributed service-placement engine, in accordance with an embodiment of the present invention.

FIG. 53 illustrates a third exemplary connectivity scheme 5300 of cloud observers 4830 to service-placement units 4840 of the distributed service-placement engine 4820 through multicast units 5340. Each cloud observer 4830 has a channel 5330 to each multicast unit 5340 carrying updates of cloud information. Each multicast unit 5340 combines updates of cloud information received from the cloud observers 4830 and broadcasts the combined updates to a respective set of service-placement units 4840 through channels 5310. Thus, each service-placement unit 4840 receives cloud information through a single channel 5310.

An advantage of the connectivity schemes 5200 and 5300 is the reduced number of interconnecting channels. With a number L of cloud observers, a number U of service-placement units 4840, and a number M of multicast units 5340, the number of directional channels (one-way channels) within the distributed service-placement engine 4820 is determined as:

L×U for the connectivity scheme of FIG. 51,
(L×(L−1)+U) for the connectivity scheme of FIG. 52, and
(L×M+U) for the connectivity scheme of FIG. 53.

With L=8, L=128, and M=16, for example, the number of directional channels for the connectivity schemes 5100, 5200, and 5300, would be 1024, 184, and 256, respectively.

System Administrator

The service-placement system, whether based in a centralized service-placement engine (FIG. 30) or a geographically distributed service-placement engine (FIG. 48) relies on information relevant to available clouds and envisaged service requirements. Such information may be acquired from an administrator of the service-placement system or from some external sources.

The information comprises:

(a) identifiers of individual clouds of the plurality of clouds;
(b) identifiers of individual reference client locations and a distance or propagation delay between each reference location and each cloud;
(c) definitions of individual cloud characteristics of a superset of cloud characteristics of interest; and
(d) definitions of individual service components of a superset of service components.

A client provides a significance vector of each cloud characteristic while a cloud provides characteristics valuation from which a merit vector is computed as illustrated in FIG. 14. The cloud observer acquires characteristics valuation, determines a merit vector for each cloud, and determines for each service component a respective component-specific (task specific) cloud merit for each cloud based on the significance vector for the service component/client type and the merit vector.

Example of Service Content

The structure of a service to be assigned to clouds is illustrated below. The service may be partitioned into multiple service components (multiple tasks) which may be assigned to different clouds. The components of a service definition may be described in a number of different formats. The placement engine can have a pluggable module to understand different formats. Examples include: proprietary formats, Terraform templates, Cloudformation Templates, ARM template, GCP deployment templates, etc.

| Service description |
|---|
| ```<br><?xml version="1.0"?><br><PublishedService><br>    <id>140</id><br>    <type>PUBLISHED_SERVICE</type><br>    <appliedPlacementAttributes><br>        <allowedValues>Required</allowedValues><br>        <placementAttribute><br>            <displayName>BTI VM Support</displayName><br>            <id>112</id><br>            <type>ATTRIBUTE</type><br>        </placementAttribute><br>    </appliedPlacementAttributes><br>    <categories><br>        <id>24</id><br>        <name>Automated Installs</name><br>        <serviceCount>2</serviceCount><br>    </categories><br>    <cloudTemplateDeployType>INCREMENTAL</cloudTemplateDeployType><br>    <completionWorkflowId>0</completionWorkflowId><br>    <deployType>STANDALONE_VMS</deployType><br>    <description>Application built from the specified branch, installed against SQL server</description><br>    <externalRouterStaticallyAssigned>true</externalRouterStaticallyAssigned><br>    <fenced>false</fenced><br>    <highlyAvailable>false</highlyAvailable><br>    <iconId>26</iconId><br>    <name>Application Branch Installation</name><br>    <namingFormat>BTI#{uniqueNumber[2]}</namingFormat><br>    <publishState>PUBLISHED</publishState><br>    <resourceSummary><br>        <totalCategorizedCosts/><br>        <totalCost>5250.0</totalCost><br>        <totalCpu>1</totalCpu><br>        <totalCpuCost>1000.0</totalCpuCost><br>        <totalDisk>52428800</totalDisk><br>        <totalDiskCost>1250.0</totalDiskCost><br>        <totalExtraCost>0.0</totalExtraCost><br>        <totalMemory>6144</totalMemory><br>        <totalMemoryCost>3000.0</totalMemoryCost><br>        <totalOsCost>0.0</totalOsCost><br>        <totalSupportCost>0.0</totalSupportCost><br>``` |

| Service description |
|---|

```
        </resourceSummary>
        <serviceComponents>
            <completionWorkflow>
                <displayName>BranchTestVM</displayName>
                <id>257</id>
                <type>WORKFLOW_DEFINITION</type>
            </completionWorkflow>
            <customizationSpecName/>
            <description>Microsoft Windows 8 (64-bit)</description>
            <group>1</group>
            <id>355</id>
            <linkedClone>true</linkedClone>
            <name>Application Test Install</name>
            <namingFormat>BranchTest#{uniqueNumber[3]}</namingFormat>
            <pushMemoryMetrics>false</pushMemoryMetrics>
            <ref>
                <displayName>BTI Base</displayName>
                <id>28606757</id>
                <type>VIRTUALMACHINE</type>
            </ref>
            <service>
                <displayName>Application Branch Installation</displayName>
                <id>140</id>
                <type>PUBLISHED_SERVICE</type>
            </service>
            <serviceComponentSettings>
                <formElements xmlns:xsi="http://www.w3.org/2001/XMLSchema-instance"
xsi:type="wsRequestFormHeaderElement">
                    <formType>HEADER</formType>
                    <label>Branch Name</label>
                    <mandatoiy>false</mandatory>
                    <value/>
                    <tagName>H3</tagName>
                </formElements>
                <formElements>
                    <formType>TEXT</formType>
                    <label>A test installer will be produced from the specified branch, and then installed against
a newly provisioned SQL Server 2014.</label>
                    <mandatory>false</mandatory>
                    <value/>
                </formElements>
                <formElements xmlns:xsi="http://www.w3.org/2001/XMLSchema-instance"
xsi:type="wsRequestFormTextFieldElement">
                    <formType>TEXT_FIELD_INPUT</formType>
                    <label>BranchName</label>
                    <mandatory>true</mandatory>
                    <value/>
                    <maxChars>200</maxChars>
                    <numOfLines>1</numOfLines>
                    <password>false</password>
                    <uuid>f202d0a2-debb-4253-8cb6-7eb6b3c856ab</uuid>
                </formElements>
                <groups>
                    <id>105</id>
                    <description>group policy for build and test installer in vsphere</description>
                    <enumerated>false</enumerated>
                    <name>BTI</name>
                    <portalEditable>true</portalEditable>
                    <subList>false</subList>
                    <groupType>EXPIRY_GROUP</groupType>
                    <permanent>false</permanent>
                </groups>
                <groups>
                    <id>113</id>
                    <description/>
                    <enumerated>false</enumerated>
                    <name>Do Not Rightsize</name>
                    <portalEditable>true</portalEditable>
                    <subList>false</subList>
                    <groupType>RIGHTSIZING_GROUP</groupType>
                    <permanent>false</permanent>
                </groups>
                <groups>
                    <id>93</id>
                    <description>Used to shutdown PV systems that get left running but are used
periodically</description>
                    <enumerated>false</enumerated>
```

| Service description |
|---|

```xml
                <name>Nightly Shutdown 8pm</name>
                <portalEditable>true</portalEditable>
                <subList>false</subList>
                <groupType>POWER_SCHEDULE_GROUP</groupType>
                <permanent>false</permanent>
            </groups>
            <id>355</id>
            <requestAttributes>
                <attributeName>Purpose</attributeName>
                <value>Host an application installation built from branch</value>
            </requestAttributes>
            <requestAttributes>
                <attributeName>Long Term Snapshots</attributeName>
                <value>No</value>
            </requestAttributes>
            <resources xmlns:xsi="http://www.w3.org/2001/XMLSchema-instance"
xsi:type="wsCpuResource">
                <managementServerType>UNKNOWN</managementServerType>
                <resourceType>CPUResource</resourceType>
                <cpuCount>1</cpuCount>
            </resources>
            <resources xmlns:xsi="http://www.w3.org/2001/XMLSchema-instance"
xsi:type="wsChefResource">
                <managementServerType>UNKNOWN</managementServerType>
                <resourceType>ChefResource</resourceType>
                <chefOrganization>development</chefOrganization>
                <environment>_default</environment>
                <serverId>12</serverId>
            </resources>
            <resources xmlns:xsi="http://www.w3.org/2001/XMLSchema-instance"
xsi:type="wsMemoryResource">
                <managementServerType>UNKNOWN</managementServerType>
                <resourceType>MemoryResource</resourceType>
                <memoryInMB>6144</memoryInMB>
            </resources>
            <resources xmlns:xsi="http://www.w3.org/2001/XMLSchema-instance"
xsi:type="wsNetworkResource">
                <managementServerType>UNKNOWN</managementServerType>
                <resourceType>NetworkResource</resourceType>
                <networkAdapters>
                    <label>Adapter 1</label>
                    <networkZoneName/>
                </networkAdapters>
            </resources>
            <resources xmlns:xsi="http://www.w3.org/2001/XMLSchema-instance"
xsi:type="wsStorageResource">
                <managementServerType>UNKNOWN</managementServerType>
                <resourceType>StorageResource</resourceType>
                <disks>
                    <diskSizeInKB>41943040</diskSizeInKB>
                    <label>Hard disk 1</label>
                    <locked>true</locked>
                    <operation>NO_CHANGE</operation>
                    <storageTierName>Cloud</storageTierName>
                </disks>
                <disks>
                    <diskSizeInKB>10485760</diskSizeInKB>
                    <label>Hard disk 2</label>
                    <locked>true</locked>
                    <operation>NO_CHANGE</operation>
                    <storageTierName>Cloud</storageTierName>
                </disks>
            </resources>
            Resources xmlns:xsi="http://www.w3.org/2001/XMLSchema-instance"
xsi:type="wsPuppetResource">
                <managementServerType>UNKNOWN</managementServerType>
                <resourceType>PuppetResource</resourceType>
                <environment>production</environment>
            </resources>
        </serviceComponentSettings>
        <serviceProperties>
            <entry>
                <key>RootDeviceType</key>
                <value xmlns:xsi="http://www.w3.org/2001/XMLSchema-instance"
xmlns:xs="http://www.w3.org/2001/XMLSchema" xsi:type="xs:string">unknown</value>
            </entry>
            <entry>
```

| Service description |
| --- |
| ```
            <key>DiskSpaceCommited</key>
            <value xmlns:xsi="http://www.w3.org/2001/XMLSchema-instance"
xmlns:xs="http://www.w3.org/2001/XMLSchema" xsi:type="xs:long">53687091200</value>
        </entry>
        <entry>
            <key>Memory</key>
            <value xmlns:xsi="http://www.w3.org/2001/XMLSchema-instance"
xmlns:xs="http://www.w3.org/2001/XMLSchema" xsi:type="xs:int">6144</value>
        </entry>
        <entry>
            <key>Disks</key>
            <value xmlns:xsi="http://www.w3.org/2001/XMLSchema-instance" xsi:type="arrayList"/>
        </entry>
        <entry>
            <key>GuestOS</key>
            <value xmlns:xsi="http://www.w3.org/2001/XMLSchema-instance"
xmlns:xs="http://www.w3.org/2001/XMLSchema" xsi:type="xs:string">Microsoft Windows 8
(64-bit)</value>
        </entry>
        <entry>
            <key>DiskSpaceConsumed</key>
            <value xmlns:xsi="http://www.w3.org/2001/XMLSchema-instance"
xmlns:xs="http://www.w3.org/2001/XMLSchema" xsi:type="xs:long">52428800</value>
        </entry>
        <entry>
            <key>NumCPU</key>
            <value xmlns:xsi="http://www.w3.org/2001/XMLSchema-instance"
xmlns:xs="http://www.w3.org/2001/XMLSchema" xsi:type="xs:int">1</value>
        </entry>
        <entry>
            <key>NumNIC</key>
            <value xmlns:xsi="http://www.w3.org/2001/XMLSchema-instance"
xmlns:xs="http://www.w3.org/2001/XMLSchema" xsi:type="xs:int">1</value>
        </entry>
    </serviceProperties>
    <targetType>VIRTUALMACHINE</targetType>
    <template>true</template>
    <useDefaultNamingFormat>false</useDefaultNamingFormat>
  </serviceComponents>
  <serviceDeployable>true</serviceDeployable>
  <serviceFormIncluded>true</serviceFormIncluded>
  <serviceType>SERVICE</serviceType>
  <startDeployedComponents>true</startDeployedComponents>
  <useDefaultNamingFormat>false</useDefaultNamingFormat>
  <useStaticComponentForms>false</useStaticComponentForms>
</PublishedService>
``` |

For convenience, a brief summary of the invention is also provided below.

A method of assigning a multitask service to at least one cloud of a plurality of clouds is provided. The method is implemented at a service placement engine employing at least one hardware processor. The method includes receiving, from a client, a set of service tasks, definition of each service task, and indications of tasks interdependence. A dependency count of each task of the set of service tasks is then determined based on the interdependence of tasks.

Free tasks, i.e., tasks of zero dependency count, are then identified and for each new free task, a procedure of assignment to a compatible cloud is activated. Upon receiving from a cloud confirmation of assignment of an individual task, and determining that at least one task of the set of service tasks has a positive dependency count, succeeding tasks of the individual task are identified and the dependency count of each of the succeeding tasks is reduced by 1. The procedure of assignment of a task is activated when the task becomes free (having a dependency count of zero).

Thus, the service-tasks assignments to respective compatible clouds are coordinated to observe the tasks interdependence. If any task cannot be assigned to any cloud, the multitask service is terminated.

The procedure of task assignment of a task to a cloud includes: (1) identifying a set of eligible clouds; (2) determining an overall cloud merit vector corresponding to the task and the client; (3) sorting the eligible clouds in descending order according to the overall cloud merit; and (4) sequentially communicating with the eligible clouds to request assignment of the task, starting with the cloud of highest merit, until the task is assigned.

Each cloud that satisfies specified compliance requirements, capability requirements, and resource-availability requirements is an eligible cloud.

The method further includes: acquiring from each cloud of the plurality of clouds respective cloud information; determining for each task a task-specific cloud merit of each cloud according to respective cloud information and definition of each service task; determining a proximity merit of each cloud according to a known location of the client, and determining the overall cloud merit vector according to the task-specific cloud merit and the proximity merit.

The definition of each service task comprises: metadata; software instructions; and input data. In the method described above, the set of service tasks may comprise: independent tasks, and/or individual tasks that are subject to respective temporal constraints, and/or interdependent tasks, and/or interdependent tasks, each task being subject to respective temporal constraints.

A service-placement engine is also provided. It includes a hardware processor for executing processor-readable instructions organized into:
  a cloud-observation module configured to monitor a set of clouds to acquire cloud information;
  a storage medium, coupled to said cloud-observation module, for maintaining acquired cloud information;
  an enhanced cloud-selection module, coupled to said storage medium, for assigning a client-specified service to at least one cloud of a plurality of clouds; and
  a network interface coupled to said cloud-observation module, said enhanced cloud-selection module, and a network for:
    controlling exchange of data between said client-observation module and any cloud of the plurality of clouds;
    receiving service definitions from a client of the service-placement engine; and communicating service-assignment information to said client.

In the service-placement engine described above, the enhanced cloud-selection module is configured to perform seamless assignments of individual service components of a service comprising multiple components to at least one cloud of the plurality of clouds. The enhanced cloud-selection module may be also configured to sort interdependent components of a service into hierarchical sets of tasks. The enhanced cloud-selection module may be also configured to allocate for each of said hierarchical sets of tasks a respective assignment time window.

A system of assigning a multitask service to at least one cloud of a plurality of clouds is also disclosed. The system includes a memory device having computer readable instructions stored thereon, for execution by a processor, causing the processor to:
  receive from a client a set of service tasks, definition of each service task, and indications of tasks interdependence;
  determine a dependency count of each task of the set of service tasks; designating new free tasks;
  start, for each new free task, a procedure of assignment to a compatible cloud;
  receive from a cloud confirmation of assignment of an individual task;
  while at least one task of the set of service tasks has a positive dependency count:
    identify succeeding tasks of the individual task;
    reduce the dependency count of each succeeding task by 1; and
    repeat said designate, start, receive, identify, and reduce;
thereby, the service tasks assignments to respective compatible clouds are coordinated to observe the tasks interdependence.

In the system described above, the computer readable instructions further cause the processor to terminate assigning the multitask service subject to an indication that said individual task has not been assigned.

The computer readable instructions further cause the processor to:
  identify a set of eligible clouds, of the plurality of clouds, each said eligible cloud satisfying specified compliance requirements, capability requirements, and resource-availability requirements;
  determine an overall cloud merit vector for said each new free task and said client;
  sort the eligible clouds in descending order according to said overall cloud merit; and sequentially communicate with the eligible clouds to request assignment of said each new free task, starting with the cloud of highest merit, until the task is assigned.

In the system described above, the computer readable instructions further cause the processor to:
  acquire from each cloud of the plurality of clouds respective cloud information;
  determine for said each task a task-specific cloud merit of said each cloud according to said respective cloud information and said definition of each service task;
  determine a proximity merit of said each cloud according to a known location of said client, and
  determine said overall cloud merit vector according to said task-specific cloud merit and said proximity merit.

In the system described above, the definition of each service task comprises: metadata; software instructions; and input data.

In the system described above, the respective cloud information comprises at one of the following: a compliance vector indicating compliance with individual service standards of a predefined list of standards; a capability vector indicating support of individual features of a predefined list of features; a resource-availability vector indicating projected availability of resources; and characterization data relevant to a predefined set of characteristics.

Thus, improved methods and systems for coordinated service placement in multiple clouds have been provided.

Processor-executable instructions causing respective hardware processors to implement the processes described above may be stored in processor-readable media such as floppy disks, hard disks, optical disks, Flash ROMS, non-volatile ROM, and RAM. A variety of processors, such as microprocessors, digital signal processors, and gate arrays, may be employed.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

It should be noted that methods and systems of the embodiments of the invention and data sets described above are not, in any sense, abstract or intangible. It should be noted that the currently described data-processing and data-storage methods cannot be carried out manually by a human analyst, because of the complexity and vast numbers of intermediate results generated for processing and analysis of even quite modest amounts of data. Instead, the methods described herein are necessarily carried out by electronic computing systems having processors on electronically or magnetically stored data, with the results of the data processing and data analysis digitally stored in one or more tangible, physical, data-storage devices and media.

Methods and systems of the present invention have tangible and practical advantages, providing more expedient and reliable coordinated service placement in multiple clouds.

The invention claimed is:
1. A method of assigning a multitask service to at least one cloud of a plurality of clouds, the method comprising:
  employing a hardware processor to execute instructions for:

receiving from a client a set of service tasks, a definition of each service task, and indications of interdependence of the set of service tasks;
determining a dependency count of each task of the set of service tasks;
designating free tasks from the set of service tasks;
identifying a set of clouds from the plurality of clouds, wherein each of the identified clouds satisfies specified compliance requirements, capability requirements, and resource-availability requirements at a predetermined time for at least one of the designated free tasks;
determining an overall cloud merit vector for each of the free tasks and for the client;
sorting the identified set of clouds in descending order according to said overall cloud merit;
sequentially communicating with the identified set of clouds to request assignment of each of the free tasks, starting with the cloud of highest cloud merit;
assigning free tasks to respective clouds from the identified set of clouds;
receiving from the cloud confirmation of assignment of at least one of the service tasks;
determining that at least one of the assigned service tasks has a positive dependency count:
identifying succeeding tasks of at least one of the assigned tasks;
reducing the dependency count of each succeeding task by 1;
coordinating the assigned service tasks to respective clouds to observe the interdependence of the tasks, and returning to the designating a free task from the set of service tasks step.

2. The method of claim 1 further comprising:
acquiring from each cloud of the plurality of clouds respective cloud information;
determining for said each task a task-specific cloud merit of said each cloud according to said respective cloud information and said definition of each service task;
determining a proximity merit of said each cloud according to a known location of said client, and
determining said overall cloud merit vector according to said task-specific cloud merit and said proximity merit.

3. The method of claim 1 wherein said definition of each service task comprises: metadata; software instructions; and input data.

4. The method of claim 2 wherein said respective cloud information comprises at least one of the following:
a compliance vector indicating compliance with individual service standards of a predefined list of standards;
a capability vector indicating support of individual features of a predefined list of features;
a resource-availability vector indicating projected availability of resources; and
characterization data relevant to a predefined set of characteristics.

5. The method of claim 1, wherein the set of service tasks comprises independent tasks.

6. The method of claim 1, wherein the set of service tasks comprises interdependent tasks.

7. The method of claim 1, wherein the set of service tasks comprises interdependent tasks, each of the interdependent tasks being subject to respective predetermined temporal constraints.

8. A system of assigning a multitask service to at least one cloud of a plurality of clouds, comprising:
a memory device having computer readable instructions stored thereon, for execution by a processor, causing the processor to:
receive from a client a set of service tasks, a definition of each service task, and indications of interdependence of the set of service tasks;
determine a dependency count of each task of the set of service tasks;
designating free tasks from the set of service tasks;
identify a set of clouds from the plurality of clouds; wherein each of the identified clouds satisfies specified compliance requirements, capability requirements, and resource-availability requirements at a predetermined time for at least one of the designated free tasks;
determine an overall cloud merit vector for each of the free tasks and for the client;
sort the identified set of clouds in descending order according to said overall cloud merit;
sequentially communicate with the identified set of clouds to request assignment of each of the free tasks, starting with the cloud of highest cloud merit;
assign free tasks to respective clouds from the identified set of clouds;
receive from the cloud confirmation of assignment of at least one of the service tasks;
determine that at least one of the assigned service tasks has a positive dependency count:
identify succeeding tasks of at least one of the assigned tasks;
reduce the dependency count of each succeeding task by 1;
coordinate the assigned service tasks to respective clouds to observe the interdependence of the tasks, and to return to the designating a free task from the set of service tasks step.

9. The system of claim 8 wherein the computer readable instructions further cause the processor to:
acquire from each cloud of the plurality of clouds respective cloud information;
determine for said each task a task-specific cloud merit of said each cloud according to said respective cloud information and said definition of each service task;
determine a proximity merit of said each cloud according to a known location of said client, and
determine said overall cloud merit vector according to said task-specific cloud merit and said proximity merit.

10. The system of claim 8 wherein said definition of each service task comprises: metadata; software instructions; and input data.

11. The system of claim 9 wherein said respective cloud information comprises at one of the following:
a compliance vector indicating compliance with individual service standards of a predefined list of standards;
a capability vector indicating support of individual features of a predefined list of features; a resource-availability vector indicating projected availability of resources; and
characterization data relevant to a predefined set of characteristics.

* * * * *